US008184636B2

(12) United States Patent
Sunahara

(10) Patent No.: US 8,184,636 B2
(45) Date of Patent: May 22, 2012

(54) INFORMATION PROCESSING DEVICE AND METHOD, AND COMPUTER READABLE MEDIUM FOR PACKETIZING AND DEPACKETIZING DATA

(75) Inventor: Sei Sunahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 12/301,682

(22) PCT Filed: Mar. 31, 2008

(86) PCT No.: PCT/JP2008/056325

§ 371 (c)(1),
(2), (4) Date: Nov. 20, 2008

(87) PCT Pub. No.: WO2008/120777

PCT Pub. Date: Oct. 9, 2008

(65) Prior Publication Data

US 2009/0201949 A1    Aug. 13, 2009

(30) Foreign Application Priority Data

Mar. 30, 2007    (JP) ................................ 2007-094015

(51) Int. Cl.
*G06K 9/60* (2006.01)

(52) U.S. Cl. ................... 370/394; 370/473; 382/232

(58) Field of Classification Search .................. 370/389, 370/392, 394, 470, 471, 473, 474; 382/232, 382/248; 386/330, 331
See application file for complete search history.

(56) References Cited

U.S. PATENT DOCUMENTS 5,880,856 A    3/1999    Ferriere
5,991,445 A *  11/1999   Kato .............................. 382/232
6,101,284 A    8/2000    Matsubara et al.
(Continued)

FOREIGN PATENT DOCUMENTS

JP    5 153550    6/1993
(Continued)

OTHER PUBLICATIONS

Sweldens, W., "The Lifting Scheme: A Custom-Design Construction of Biorthogonal Wavelets", Applied and Computational Harmonic Analysis, vol. 3, No. 2, pp. 186-200, (1996).

(Continued)

*Primary Examiner* — Chi Pham
*Assistant Examiner* — Curtis A Alia
(74) *Attorney, Agent, or Firm* — Oblon, Spivak, McClelland, Maier & Neustadt, L.L.P.

(57) ABSTRACT

The present invention relates to an information processing device and method, and program, whereby unnecessary standby time can be reduced in depacketizing processing, and processing can be performed easily and at high speed. A common header creating unit 203 creates common headers which are headers added in common to each packet created, based on a precinct header 171 which the data acquisition unit 201 has acquired, from the precinct thereof. A fragment processing unit 208 divides encoded data which the data acquisition unit 201 acquires into every packet size, in the event that the data size of the precinct is greater than the packet size. A packetizing unit 209 packetizes the payload supplied from the fragment processing unit 208 using header information supplied from each unit, and appropriately sets the value of flag information such as SFF and M included in the common headers of each packet that has been generated. The present invention can be applied to an encoding device, for example.

19 Claims, 44 Drawing Sheets

U.S. PATENT DOCUMENTS

| | | | |
|---|---|---|---|
| 6,259,735 B1 | 7/2001 | Aono et al. | |
| 6,339,658 B1 * | 1/2002 | Moccagatta et al. | 382/240 |
| 6,707,948 B1 | 3/2004 | Cosman et al. | |
| 6,795,498 B1 * | 9/2004 | Kato et al. | 375/240.01 |
| 6,813,314 B2 | 11/2004 | Aono et al. | |
| 6,847,468 B2 | 1/2005 | Ferriere | |
| 6,970,604 B1 * | 11/2005 | Chai | 382/240 |
| 7,031,386 B2 | 4/2006 | Yamamoto et al. | |
| 7,136,485 B2 * | 11/2006 | Wee et al. | 380/37 |
| 7,194,630 B2 * | 3/2007 | Iwamura et al. | 713/176 |
| 7,657,109 B2 * | 2/2010 | Gandolph et al. | 382/245 |
| 7,729,549 B2 * | 6/2010 | Yano | 382/234 |
| 2003/0054769 A1 | 3/2003 | Kalluri | |
| 2003/0091054 A1 | 5/2003 | Futenma et al. | |
| 2003/0190083 A1 | 10/2003 | Okada et al. | |
| 2003/0198391 A1 * | 10/2003 | Fukuhara et al. | 382/232 |
| 2004/0098748 A1 | 5/2004 | Bo et al. | |
| 2004/0141652 A1 | 7/2004 | Fukuhara et al. | |
| 2005/0084014 A1 * | 4/2005 | Wang et al. | 375/240.19 |
| 2006/0056706 A1 * | 3/2006 | Marcellin et al. | 382/232 |

FOREIGN PATENT DOCUMENTS

| | | |
|---|---|---|
| JP | 6 292179 | 10/1994 |
| JP | 9 130800 | 5/1997 |
| JP | 2000 59781 | 2/2000 |
| JP | 2001 25018 | 1/2001 |
| JP | 2002 359853 | 12/2002 |
| JP | 2003 163916 | 6/2003 |
| JP | 2003 283839 | 10/2003 |
| JP | 2004 166254 | 6/2004 |
| JP | 2004 194694 | 7/2004 |
| JP | 2005 12753 | 1/2005 |
| JP | 2005 503738 | 2/2005 |
| JP | 2005 167515 | 6/2005 |

OTHER PUBLICATIONS

Chrysafis, C. et al., "Line-Based, Reduced Memory, Wavelet Image Compression", IEEE Transactions on Image Processing, vol. 9, No. 3, pp. 378-389, (2000).

European Search Report issued Aug. 3, 2011, in Patent Application No. 08739439.1.

Eric Edwards, et al., "RTP Payload Format for JPEG 2000 Video Streams", Internet Draft, XP 2975111, Dec. 22, 2003. pages 1-18.

Series T: Terminals for Telematic Services, Information technology—JPEG 2000 image coding system: Core coding system, ITU-T International Telecommunication Union, No. T.800, XP 17403563, Aug. 29, 2002, 209 pages.

H. Schulzrinne, et al., "RTP: A Transport Protocol for Real-Time Applications", Network Working Group, Request for Comments: 1889 Category: Standards Track, XP 15007673, Jan. 1996, pp. 1-76.

"Series T: Terminals for Telematic Services, Information technology—JPEG 2000 image coding system: Wireless", ITU-T International Telecommunication Union, No. T-810, XP 17434903, May 29, 2006, pp. 1-58.

\* cited by examiner

FIG. 4
A
DIVISION LEVEL = 1
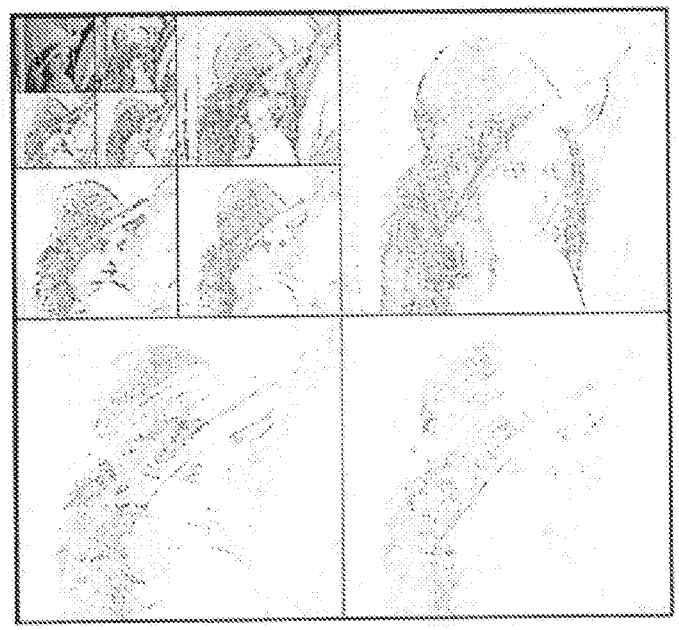
B
DIVISION LEVEL = 3

FIG. 8

| | 31 | 27,26 | 24,23 | 19,18 | 16,15 14,13,12 | 8,7 | 5,4,3,2,1,0 |
|---|---|---|---|---|---|---|---|
| Word 0 | Reserved | | PI [7:0] | Reserved | W C EF | CBD [4:0] | DL | WF | P D1 | SF |
| Word 1 | | FR [7:0] | AR [5:0] | DBSZ [3:0] | Full Time Stamp [45:32] | | 0 |
| Word 2 | | | Full Time Stamp [31:0] | | | | 0 |
| Word 3 | | V0 Start Position [12:0] | SD | H Start Position [12:0] | | 0 |
| Word 4 | | V Total Size [12:0] | TSD | H Total Size [12:0] | | VF | 0 |
| Word 5 | | V Size [12:0] | VSD | H Size [12:0] | | PXCS | 0 |
| Word 6 | | CTS [15:0] | | WT1 [15:0] | | BRT | 0 |
| Word 7 | | WT2 [15:0] | | WT3 [15:0] | | | |
| ... | | | | | | | |
| Word 24 | | WT36 [15:0] | | WT37 [15:0] | | | |
| Word 25 | | WT38 [15:0] | | WT39 [15:0] | | | |

| MSB | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| ET | | | | POS | | | | | | | | AT | | | | AID | | | | | | | | FF | | M | TS | NF | FT | CF | IF | X |
| | | | | | | | | | | | | TS | | | | | | | | | | | | | | F | | | | | | |

431

INFORMATION PROCESSING DEVICE AND METHOD, AND COMPUTER READABLE MEDIUM FOR PACKETIZING AND DEPACKETIZING DATA

TECHNICAL FIELD

The present invention relates to an information processing device and method, and program, and particularly relates to an information processing device and method, and program, whereby delay can be reduced at the time of packet transmission/reception.

BACKGROUND ART

Conventionally, streaming of video and audio via the Internet and so forth has been performed. At this time, in the event that packet loss or arrival delay occurs, there is the concern that data quality deterioration may occur. For example, in the case of an encoding method which takes inter-frame difference, such as with MPEG (Moving Picture Experts Group) or the H.26x family compression methods, if there is dropout of data of a certain frame due to packet loss, so-called error propagation, which affects the image quality of subsequent frames, occurs.

Also, with the MPEG method, the compression rate is raised by motion estimation, but performing motion estimation makes algorithms complicated, and the processing time increases proportionately to the square of the frame size, so encoding delay of several frames occurs in principle. In the event of performing bi-directional real-time communication, the delay time is very close to the allowed delay time of 250 ms, and is of an unignorable magnitude.

In contrast to these, intra-frame codecs such as represented by JPEG (Joint Photographic Experts Group) 2000 do not use inter-frame difference information, so delay such as described above does not occur. However, compression is performed in increments of frames, so there is the need to wait at least 1 frame until starting of encoding. There are 30 frames per second with common systems nowadays, so a wait time of around 16 ms is needed to starting of encoding.

There has been demand for further reducing of this delay, and reduction in delay at portions other than encoding and decoding has also become necessary.

As for one of processing delay, there is packetizing/depacketizing processing wherein RTP (Real-time Transport Protocol) packetizing and depacketizing is performed. Conventionally, at the time of performing depacketizing, processing is started after waiting for a certain amount of packets to accumulate, and accordingly delay has occurred. As for a reason for accumulating packets, there is a limit on the maximum size of a packet which can be transmitted over the Internet without being divided, and a series of data having a certain meaning is transmitted having been divided into multiple packets. At depacketizing as well, buffering is performed until the divided packets are all present, following which depacketizing is started, so delay increases, and also resources for the buffer are necessary.

That is to say, with the device at the reception side of encoded data, received packets are depacketized by a depacketizing processing unit, and extracted encoded data is decoded by a decoder, but at this time, there is the need to have a buffer at both the depacketizing processing and decoding processing, so there was the concern that the buffer memory capacity might increase.

On the other hand, various methods have been conceived for reducing the buffer memory capacity (e.g., Patent Document 1).

In Patent Document 1, at the same time as packets received by a relay device being accumulated in buffer memory for error correction, sequential transmission toward the downstream side is performed without waiting for the packets of the entire error correction computation block to arrive, and in the event that a missing packet is detected, this is restored by performing error correction computation, and the recovered packet is transmitted in a format following the packets sent ahead.

Patent Document 1: Japanese Unexamined Patent Application Publication No. 2005-12753

DISCLOSURE OF INVENTION

Technical Problem

However, in the case of the method described in the aforementioned Patent Document 1, buffer memory is necessary in the relay device as well, in order to perform error correction. That is to say, there has been the concern that the buffer memory capacity might increase, as described above. Also, in the case of the method described in Patent Document 1, the order of packets is changed if the relay device performs packet error correction. Accordingly, there is the need for rearranging at the time of depacketizing at reception device, so not only does depacketizing processing become complicated and delay time increase, but also a buffer is necessary for depacketizing processing. In the event of performing decoding of encoded data that has been packetized at the reception device and transmitted, a decoding buffer is also necessary besides this depacketizing buffer, so there has been the concern that not only the memory capacity but also the delay time might further increase.

The present invention has been proposed in light of such a conventional actual state, to enable reduction in delay time occurring when packetizing and transmitting/receiving data.

Technical Solution

One aspect of the preset invention is an information processing device for performing packetizing processing of adding header information to encoded data of image data encoded every predetermined increment and packetizing, including: creating means for creating the header information; dividing means for dividing the encoded data into a plurality of partial data, at every predetermined data amount determined beforehand; packetizing means for adding the header information created by the creating means to each of the plurality of partial data obtained by the encoded data having been divided by the dividing means, and packetizing; and flag setting means for setting, as to a head packet of the packets generated by the packetizing means of which the payload is the head partial data of the plurality of the partial data, a head flag indicating the head packet, included in header information, and setting, as to a final packet of which the payload is the end partial data of the plurality of the partial data, an end flag indicating the final packet, included in header information.

The encoded data may be encoded data which has been wavelet-transformed and entropy-encoded, in increments of precincts which are groups of lines including other subbands, necessary for generating one line worth of lowest band components of image data.

The encoded data may be supplied in the order of decoding.

Encoding means may be further included for encoding the image data every predetermined increment and generating the encoded data; wherein the dividing means divide the encoded data generated by the encoding means.

The encoding means may supply added information of the same format as with the header information; and the creating means create the header information using the added information supplied by the encoding means.

The encoding means may supply flag information indicating success or failure of the encoding, and the packetizing means perform packetizing using only the header information created by the creating means in the event that determination is made that the encoding has failed, based on the flag information.

An aspect of the present invention is also an information processing method of an information processing device for performing packetizing processing of adding header information to encoded data of image data encoded every predetermined increment and packetizing, including the steps of: creating the header information; dividing the encoded data into a plurality of partial data, at every predetermined data amount determined beforehand; adding the header information to each of the plurality of partial data obtained by the encoded data having been divided, and packetizing; and setting, as to a head packet of the packets generated of which the payload is the head partial data of the plurality of the partial data, a head flag indicating the head packet, included in header information, and setting, as to a final packet of which the payload is the end partial data of the plurality of the partial data, an end flag indicating the final packet, included in header information.

An aspect of the present invention is further a program for causing a computer to execute packetizing processing of adding header information to encoded data of image data encoded every predetermined increment and packetizing, the computer causing the computer to execute information processing including the steps of: creating the header information; dividing the encoded data into a plurality of partial data, at every predetermined data amount determined beforehand; adding the header information to each of the plurality of partial data obtained by the encoded data having been divided, and packetizing; and setting, as to a head packet of the packets generated of which the payload is the head partial data of the plurality of the partial data, a head flag indicating the head packet, included in header information, and setting, as to a final packet of which the payload is the end partial data of the plurality of the partial data, an end flag indicating the final packet, included in header information.

Another aspect of the present invention is an information processing device for performing depacketizing processing in which payload data is extracted from packets, including: acquisition means for acquiring the packets supplied externally; loss determining means for determining whether or not loss of a packet has occurred in the acquisition by the acquisition means, based on header information of the packets acquired by the acquisition means; and supplying means for extracting the payload data from the packets acquired by the acquisition means and supplying to a downstream processing unit in the event that determination has been made by the loss determining means that loss of the packets has not occurred, and discarding the packets acquired by the acquisition means in the event that determination has been made by the loss determining means that loss of the packets has occurred.

The loss determining means may determine that loss of the packets has occurred in the event that a sequence No. which is information indicating the order of packets, included in the header information, is not continuous with the sequence No. of the packet obtained the previous time.

Notification means may further be included for notifying the downstream processing unit in the event that the loss determining means has determined that loss of the packets has occurred.

Head determining means may further be included for determining whether or not a packet acquired by the acquisition means is the head packet of a group configured of a plurality of packets of which the sequence Nos. are continuous; wherein, in the event that the loss determining means determine that loss of the packets has not occurred, and also in the event that determination is made by the head determining means to be the head packet of the group, the supplying means further supply the header information also to the downstream processing unit.

In the event that the loss determining means determine that loss of the packets has occurred, the supplying means may discard the packets until determination is made by the head determining means that the head packet of a new group has been acquired by the acquisition means.

The payload data may be encoded data which has been wavelet-transformed and entropy-encoded, in increments of precincts which are groups of lines including other subbands, necessary for generating one line worth of lowest band components.

The encoded data may be supplied in the order of decoding.

At the downstream processing unit, decoding processing execution means may further be included for performing decoding processing for decoding the encoded data, which is the payload data supplied by the supplying means.

The decoding processing execution means may include: holding means for temporarily holding the encoded data supplied from the supplying means; decoding means for decoding the encoded data, held by the holding means, in the precinct increments; and wavelet inverse transformation means for performing wavelet inverse transformation as to coefficient data obtained by decoding by the decoding means.

Encoding success/failure determining means may further be included for determining whether the entropy encoding has succeeded or failed, based on header information of the packets acquired by the acquisition means; wherein the supplying means supply only the header information in the event that determination is made by the encoding success/failure determining means that the encoding has failed.

Another aspect of the present invention is also an information processing method of an information processing device for performing depacketizing processing in which payload data is extracted from packets, including the steps of: acquiring the packets supplied externally; determining whether or not loss of a packet has occurred, based on header information of the packets acquired; and extracting the payload data from the packets acquired and supplying to a downstream processing unit in the event that determination has been made that loss of the packets has not occurred, and discarding the packets acquired in the event that determination has been made that loss of the packets has occurred.

Another aspect of the present invention is further a program for causing a computer to execute depacketizing processing in which payload data is extracted from packets, the program causing the computer to execute information processing including the steps of: acquiring the packets supplied externally; determining whether or not loss of a packet has occurred, based on header information of the packets acquired; and extracting the payload data from the packets acquired and supplying to a downstream processing unit in the event that determination has been made that loss of the packets has not occurred, and discarding the packets acquired in the event that determination has been made that loss of the packets has occurred.

With one aspect of the present invention, header information is created, encoded data is divided into a plurality of partial data, at every predetermined data amount determined beforehand; the header information is added to each of the plurality of partial data obtained by the encoded data having been divided, and packetized; and a head flag indicating the head packet, included in header information, is set as to a head packet of the packets generated of which the payload is the head partial data of the plurality of the partial data, and an end flag indicating the final packet, included in header information, is set as to a final packet of which the payload is the end partial data of the plurality of the partial data.

With the other aspect of the present invention, externally supplied packets are acquired, whether or not loss of a packet has occurred at the time of acquisition is determined based on header information of the packets acquired; and in the event that determination has been made that loss of the packets has not occurred, the payload data is extracted from the packets acquired and supplied to a downstream processing unit, and in the event that determination has been made that loss of the packets has occurred, the packets acquired are discarded.

Advantageous Effects

According to the present invention, transmission/reception of packets can be performed. Particularly, the delay time occurring when packetizing and transmitting/receiving data can be reduced.

BRIEF DESCRIPTION OF DRAWINGS

FIG. 4 is an outlined line drawing for schematically explaining about wavelet transformation.

FIG. 8 is a diagram illustrating a configuration example of a picture header.

FIG. 18 is a diagram illustrating a configuration example of format information.

FIG. 19 is a diagram illustrating a configuration example of picture information.

FIG. 37 is a diagram illustrating a configuration example of segment information.

Figure 1:
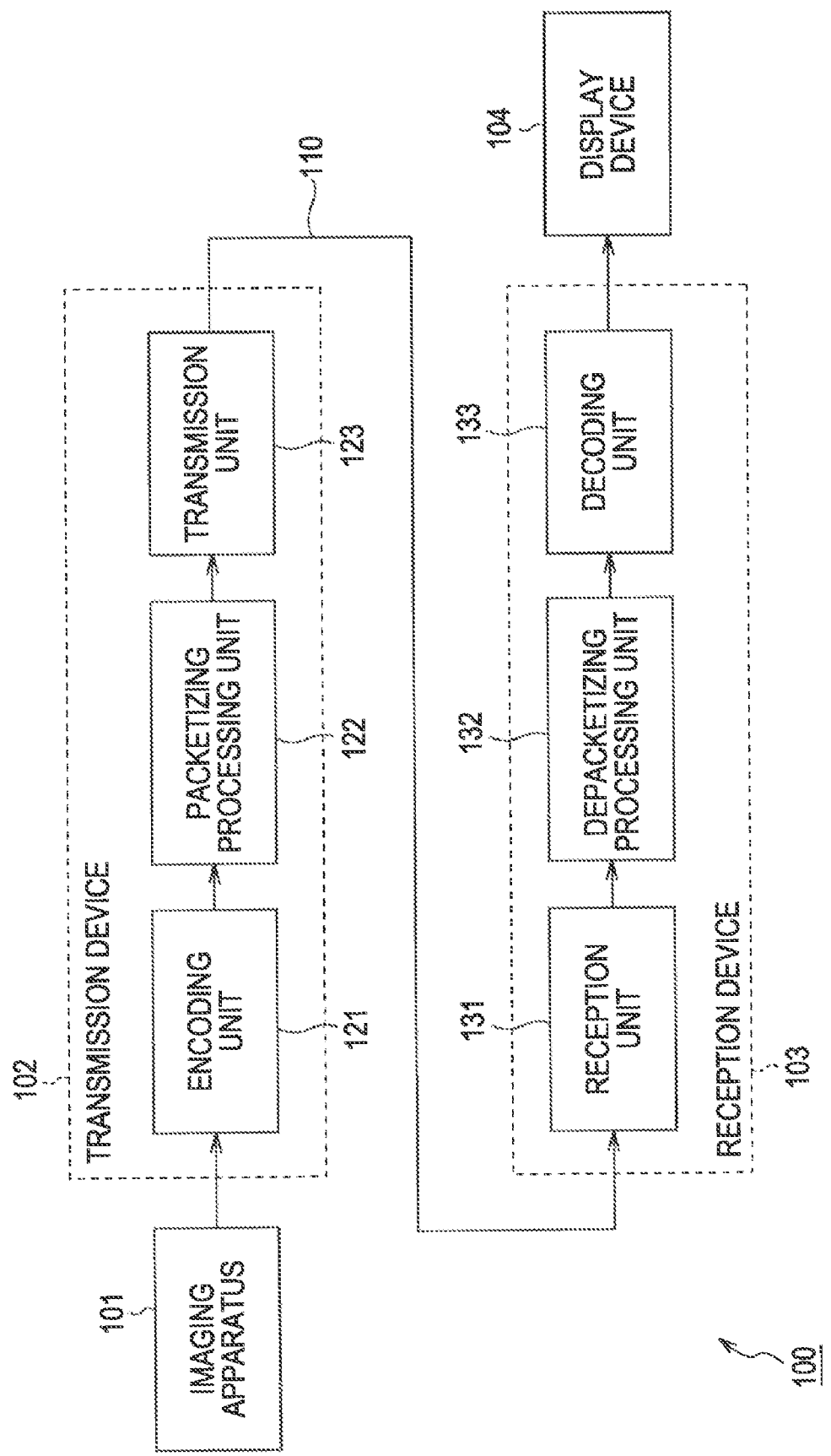
FIG. 1 is a block diagram illustrating a configuration example of a transmission system to which the present invention has been applied.

EXPLANATION OF REFERENCE NUMERALS 100 transmission system, 102 transmission device, 103 reception device, 110 line, 132 depacketizing unit, 133 decoding unit, 202 RTP header creating unit, 203 common header creating unit, 204 extended header creating unit, 205 picture information creating unit, 206 flag confirmation unit, 207 size confirmation unit, 208 fragment processing unit, 209 packetizing unit, 252 header information analyzing unit, 253 control mode transition unit, 254 control unit, 255 header supplying unit, 256 data supplying unit, 257 error notification unit, 258 control signal supplying unit, 351 control information obtaining unit, 352 decoding control unit, 353 decoding processing execution unit, 354 header obtaining unit, 355 data obtaining unit, 356 error notification obtaining unit, 357 discarding processing unit

BEST MODE FOR CARRYING OUT THE INVENTION

An embodiment of the present invention will be explained below.

FIG. 1 is a block diagram illustrating a configuration example of a transmission system to which the present invention has been applied.

In FIG. 1, the transmission system 100 is a data transmission system wherein an transmission device 102 performs compression encoding, packetizing, and transmission, of image data generated by an imaging apparatus 101, a reception device 103 receives, depacketizes, and decodes the transmitted packets, via a line 110, and a display device displays an image of the obtained image data.

The imaging apparatus 101 has an imaging device using a CCD (Charge Coupled Device) or CMOS (Complementary Metal Oxide Semiconductor) or the like, which images a subject, converts the imaged image into image data of digital data, and supplies the acquired image data to the transmission device 102.

The transmission device 102 has an encoding unit 121, a packetizing processing unit 122, and a transmission unit 123. The transmission device 102 encodes the image data supplied from the imaging apparatus 101 with a predetermined method at the encoding unit 121, packetizes encoded data obtained by the encoding at the packetizing processing unit 122, and sends out the generated packets to the line 110 from the transmission unit 123 with a predetermined communication method.

The line 110 connects the transmission device 102 and reception device 103, and is an arbitrary transmission medium for transmitting packets sent out from the transmission device 102 to the reception device 103.

The reception device 103 has a reception unit 131, a depacketizing processing unit 132, and a decoding unit 133. The reception device 103 receives packets transmitted over the line 110 at the reception unit 131, extracts the encoded data from the received packets at the depacketizing processing unit 132, and at the decoding unit 133 decodes the extracted encoded data with a decoding method corresponding to the encoding unit 121 of the transmission device 102 and outputs the obtained baseband image data to the display device 104.

The display device 104 has a display, and displays the image data supplied from the reception device 103 on the display thereof.

This transmission system 100 in FIG. 1 is a system wherein delay time due to packetizing processing by the packetizing processing unit 122 and delay time due to depacketizing processing by the depacketizing processing unit 132 are reduced, and delay time from being imaged at the imaging apparatus 101 to that image being displayed on the display device 104 can be reduced.

With the transmission system 100 in FIG. 1, an imaging apparatus 101 is shown as a device for providing image data which the transmission device 102 transmits, but any device will suffice as long as a device which can provide image data. Also, a display device 104 is shown as a device which uses the image data received by the reception device 103, but any device will suffice as long as a device which can use image data.

Also, while only image data will be described as data which is transmitted, other data, such as audio data, for example, may be transmitted along with the image data.

The packet transmission method which the transmission device 102 carries out may be unicasting wherein transmission is only to the reception device 103, or may be multicasting wherein transmission is to multiple devices including the reception device 103, or may be broadcasting wherein transmission is to an unspecified number of devices.

The line 110 may be of any form as long as being capable of transmitting packets, and may be cable, or may be wireless, or may be that including the both. Also, while the line 110 is shown by one arrow in FIG. 1, this may be a dedicated or general-purpose transmission cable, or may include one or multiple communication networks such as a LAN (Local Area Network) or the Internet for example, or may include a communication relay device of some sort. Further, the number of lines (channels) of the line 110 may be any number.

Next, details of the parts of the transmission device 102 and reception device 103 shown in FIG. 1 will be described.

Figure 2:
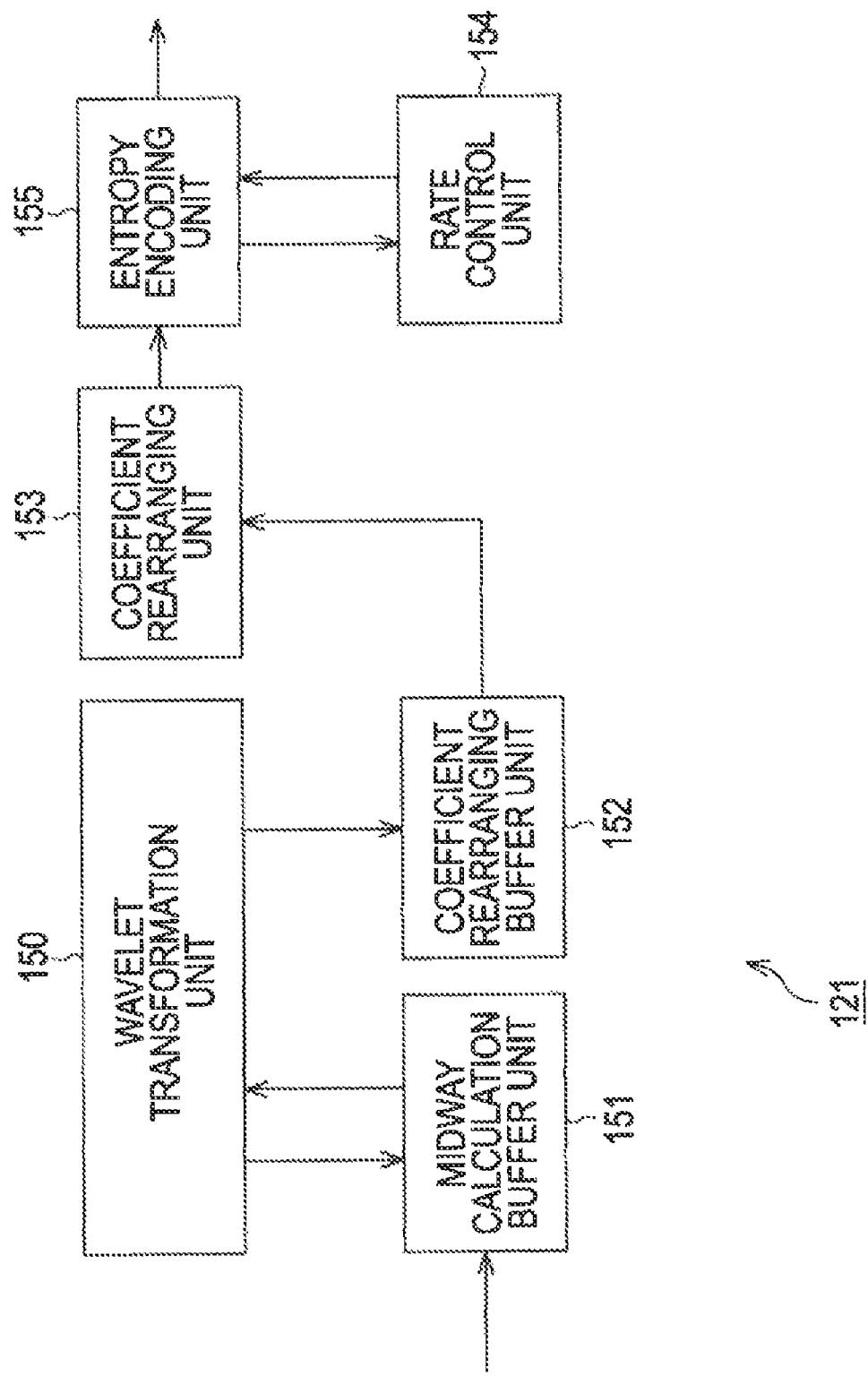
FIG. 2 is a block diagram illustrating a configuration example of an encoding unit in FIG. 1.

FIG. 2 is a block diagram illustrating an internal configuration example of the encoding unit 121 of the transmission device 102 in FIG. 1. In FIG. 2, the encoding unit 121 has a wavelet transformation unit 150, a midway calculation buffer unit 151, a coefficient rearranging buffer unit 152, a coefficient rearranging unit 153, a rate control unit 154, and an entropy encoding unit 155.

The image data input to the encoding unit 121 is temporarily stored in the midway calculation buffer unit 151. The wavelet transformation unit 150 subjects the image data stored in the midway calculation buffer unit 151 to wavelet transformation. That is to say, the wavelet transformation unit 150 reads out the image data from the midway calculation buffer unit 151, subjects this to filter processing using an analysis filter to generate the coefficient data of lowband components and highband components, and stores the generated coefficient data in the midway calculation buffer unit 151. The wavelet transformation unit 150 includes a horizontal analysis filter and vertical analysis filter, and subjects an image data group to analysis filter processing regarding both of the screen horizontal direction and screen vertical direction. The wavelet transformation unit 150 reads out the coefficient data of the lowband components stored in the midway calculation buffer unit 151 again, subjects the read coefficient data to filter processing using the analysis filter to further generate the coefficient data of highband components and lowband components. The generated coefficient data is stored in the midway calculation buffer unit 151.

The wavelet transformation unit 150 repeats this processing, and when the division level reaches a predetermined level, reads out the coefficient data from the midway calculation buffer unit 151, and writes the read coefficient data in the coefficient rearranging buffer unit 152.

The coefficient rearranging unit 153 reads out the coefficient data written in the coefficient rearranging buffer unit 152 in a predetermined order, and supplies this to the entropy encoding unit 155. The entropy encoding unit encodes the supplied coefficient data using a predetermined entropy encoding method such as Huffman encoding, arithmetic coding, or the like, for example.

The entropy encoding unit 155 operates synchronously with the rate control unit 154, and is controlled such that the bit rate of the compression encoded data to be output is a generally constant value. That is to say, based on encoded data information from the entropy encoding unit 155, the rate control unit 154 supplies, to the entropy encoding unit 155, control signals for effecting control so as to end encoding processing by the entropy encoding unit 155 at the point that the bit rate of the data compression encoded by the entropy encoding unit 155 reaches the target value or immediately before reaching the target value. At the point that the encoding processing ends in accordance with the control signal supplied from the rate control unit 154, the entropy encoding unit 155 outputs the encoded data.

Note that an arrangement wherein the entropy encoding unit 155 first performs quantization as to the coefficient data read out from the coefficient rearranging unit 153, and subjects the obtained quantized coefficients to source coding processing such as Huffman encoding, arithmetic coding, or the like, allows expectation for further improvement in compression efficiency. Any method may be used for this quantization, and using general means, i.e., a technique wherein coefficient data W is divided by quantization step size $\Delta$ as shown in the following Expression (1), for example, is sufficient.

$$\text{Quantized coefficient} = W/\Delta \tag{1}$$

The quantization step size $\Delta$ at this time is calculated at the rate control unit 154, for example.

The entropy encoding unit 155 supplies the encoded data acquired by encoding to the packetizing processing unit 122.

Figure 3:
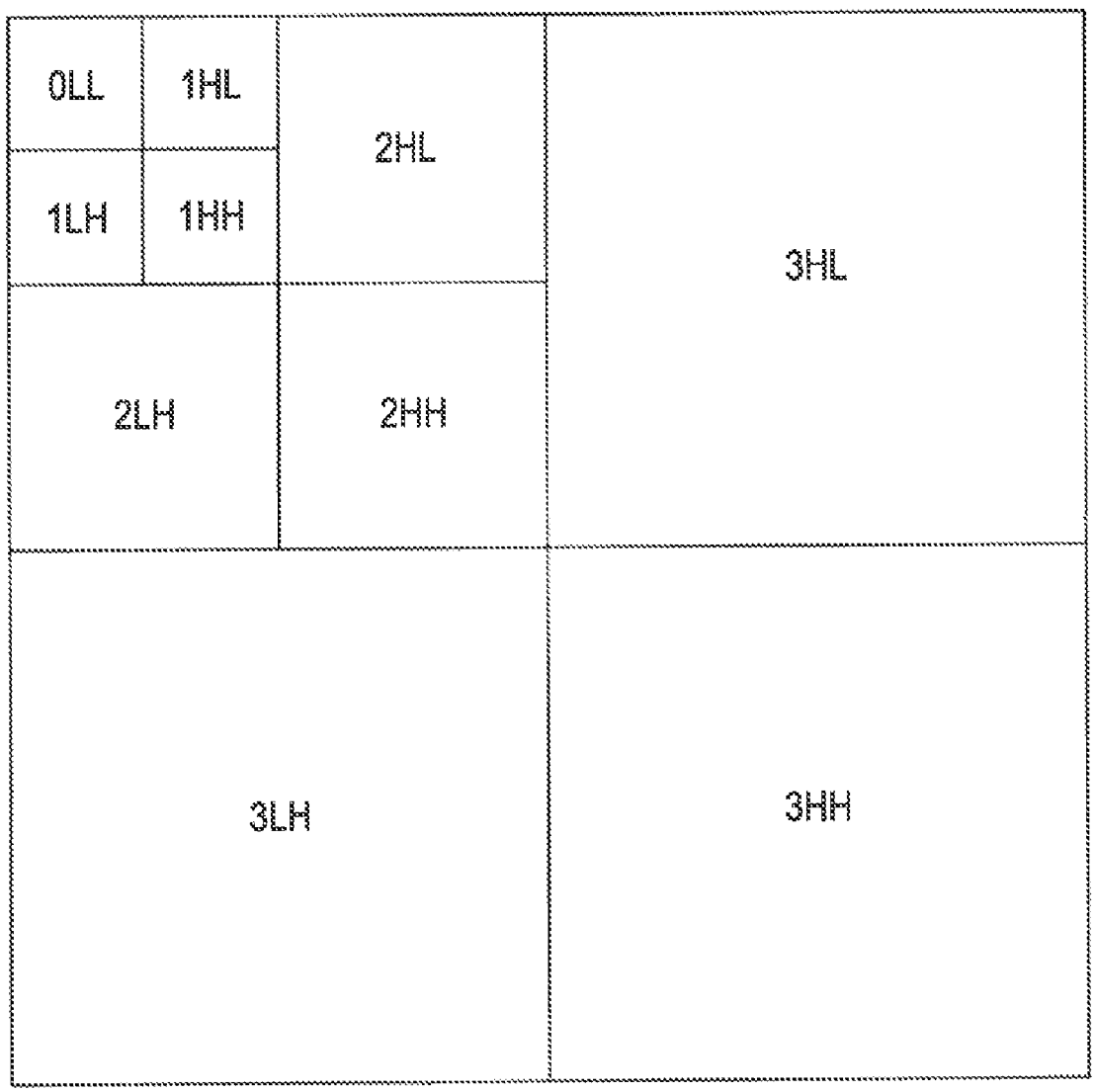
FIG. 3 is an outlined line drawing for schematically explaining about wavelet transformation.

Next, description will be made in more detail regarding the processing performed by the wavelet transformation unit 150 in FIG. 2. First, wavelet transformation will be described schematically. With wavelet transformation as to image data, as schematically illustrated in FIG. 3, processing for dividing image data into a high spatial frequency band and a low spatial frequency band is repeated recursively as to a low spatial frequency band obtained as a result of division. Thus, low spatial frequency band data is driven into a smaller region, thereby enabling effective compression encoding.

Now, FIG. 3 is an example of a case wherein dividing processing of the lowest band component region of image data into lowband component regions L and highband component regions H is repeated three times, thereby obtaining division level=3 indicating the total number of hierarchical division levels. In FIG. 3, "L" and "H" represent a lowband component and highband component respectively, and with regard to the order of "L" and "H", the front side indicates a band which is a division result in the horizontal direction, and the rear side indicates a band which is a division result in the vertical direction. Also, a numeral before "L" and "H" indicates the division level of the region thereof, where the lower the component band level is, the smaller the value representing it is.

Also, as can be understood from the example shown in FIG. 3, the processing is performed in a stepwise manner from the right lower region to the left upper region of the screen, thereby driving lowband components into a small region. That is to say, with the example shown in FIG. 3, the right lower region of the screen is set to a region 3HH including the least lowband components (including the most highband components), and the left upper region obtained by the screen being divided into four regions is further divided into four regions, and of the four divided regions, the left upper region is further divided into four regions. The leftmost upper corner region is set to a region 0LL including the most lowband components.

The reason why transformation and division are repeatedly performed as to lowband components is because the energy of the screen concentrates on lowband components. This can also be understood from a situation wherein as the division level proceeds from a state of division level=1 of which an example is shown in A in FIG. 4 to a state of division level=3 of which an example is shown in B in FIG. 4, sub-bands are formed such as shown in B in FIG. 4. For example, the division level of wavelet transformation shown in FIG. 3 is 3, and as a result thereof, ten sub-bands are formed.

The wavelet transformation unit 150 usually performs the processing such as described above using a filter bank made up of a lowband filter and highband filter. Note that a digital filter usually has impulse response of multiple tap lengths, i.e., a filter coefficient, so there is the need to subject input image data or coefficient data to buffering as much as filter processing can be performed beforehand. Also, similarly, even in a case wherein wavelet transformation is performed with multiple stages, there is the need to subject the wavelet transformation coefficient generated at the previous stage to buffering as much as filter processing can be performed.

A method employing a 5×3 filter will be described as a specific example of wavelet transformation. This method employing a 5×3 filter is also employed with JPEG 2000 standard, and is an excellent method in that wavelet transformation can be performed with few filter taps.

Impulse response of a 5×3 filter (Z transform expression) is, as shown in the following Expressions (2) and (3), configured of a lowband filter $H_0(z)$ and a highband filter $H_1(z)$. According to Expressions (2) and (3), it can be found that the lowband filter $H_0(z)$ is five taps, and the highband filter $H_1(z)$ is three taps.

$$H_0(z) = (-1 + 2z^{-1} + 6Z^{-2} + 2Z^{-3} - z^{-4})/8 \tag{2}$$

$$H_1(z) = (-1 + 2z^{-1} - Z^{-2})/2 \tag{3}$$

According to these Expression (2) and Expression (3), the coefficients of lowband components and highband components can be calculated directly. Here, employing a lifting (Lifting) technique enables computation of filter processing to be reduced.

Figure 5:
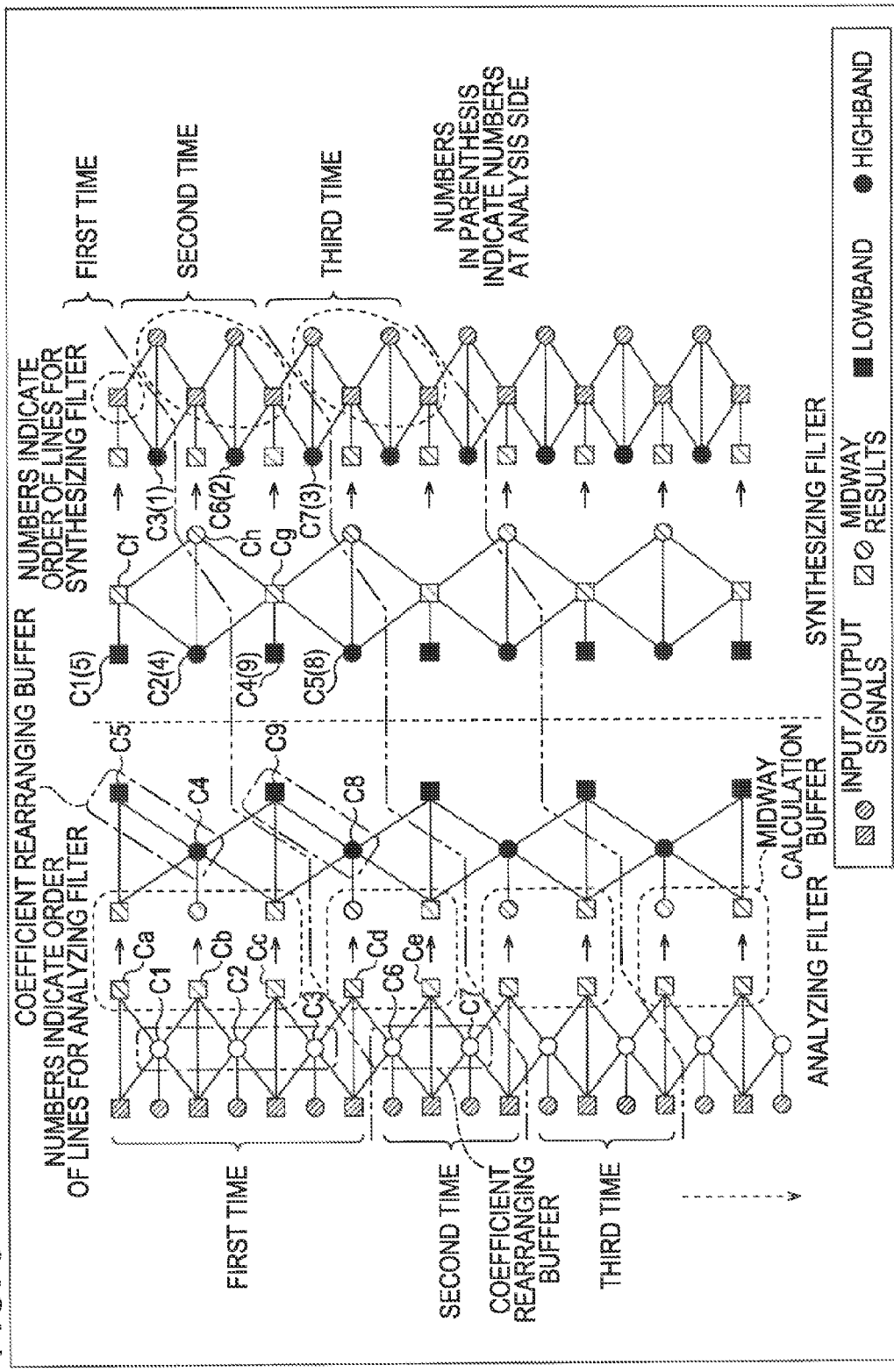
FIG. 5 is an outlined line drawing illustrating an example of performing filtering by lifting with a 5×3 filter, to division level=2.

Next, this wavelet transformation method will be described more specifically. FIG. 5 illustrates an example wherein filter processing according to lifting of a 5×3 filter is executed up to division level=2. Note that, in FIG. 5, the portion shown as analysis filters at the left side of the drawing is the filters of the wavelet transformation unit 150. Also, the portion shown as synthesis filters at the right side of the drawing is the filters of a wavelet inverse transformation unit in a later-described decoding device.

Note that with the following description, for example, let us say that with the pixel of the left upper corner of the screen as the head at a display device or the like, pixels are scanned from the left edge to the right edge of the screen, thereby making up one line, and scanning for each line is performed from the upper edge to the lower edge of the screen, thereby making up one screen.

In FIG. 5, the left edge column illustrates that pixel data disposed at corresponding positions on the line of original image data is arrayed in the vertical direction. That is to say, the filter processing at the wavelet transformation unit 150 is performed by pixels on the screen being scanned vertically using a vertical filter. The first through third columns from the left edge illustrate division level=1 filter processing, and the fourth through sixth columns illustrate division level=2 filter processing. The second column from the left edge illustrates highband component output based on the pixels of the original image data of the left edge, and the third column from the left edge illustrates lowband component output based on the original image data and highband component output. The division level=2 filter processing is performed as to the output of the division level=1 filter processing, such as shown in the fourth through sixth columns from the left edge.

With the division level=1 filter processing, highband component coefficient data is calculated based on the pixels of the original image data as a first stage of the filter processing, lowband component coefficient data is calculated based on the highband component coefficient data calculated at the first stage of the filter processing, and the pixels of the original image data. An example of the division level=1 filter processing is illustrated at the first through third columns at the left side (analysis filter side) in FIG. 5. The calculated highband component coefficient data is stored in the coefficient rearranging buffer unit 152 in FIG. 2. Also, the calculated lowband component coefficient data is stored in the midway calculation buffer unit 151 in FIG. 2.

In FIG. 5, the coefficient rearranging buffer unit 152 is represented as the portion surrounded with single dot broken lines, and the midway calculation buffer unit 151 is represented as the data surrounded with dotted lines.

The division level=2 filter processing is performed based on the results of the division level=1 filter processing held at the midway calculation buffer unit 151. With the division level=2 filter processing, the coefficient data calculated as lowband component coefficients at the division level=1 filter processing is regarded as coefficient data including lowband components and highband components, the same filter processing as that of the division level=1 is performed. The highband component coefficient data and lowband component coefficient data calculated by the division level=2 filter processing is stored in the coefficient rearranging buffer unit 152.

With the wavelet transformation unit 150, the filter processing such as described above is performed each in the horizontal direction and vertical direction of the screen. For example, first, the division level=1 filter processing is performed in the horizontal direction, and the generated coefficient data of highband components and lowband components is stored in the midway calculation buffer unit 151. Next, the coefficient data stored in the midway calculation buffer unit 151 is subjected to the division level=1 filter processing in the vertical direction. According to the processing in the horizontal and vertical directions at the division level=1, there are formed four regions of a region HH and region HL of the coefficient data each obtained by further dividing highband components into highband components and lowband components, and a region LH and region LL of the coefficient data each obtained by further dividing lowband components into highband components and lowband components.

Subsequently, at the division level=2, the lowband component coefficient data generated at the division level=1 is subjected to filter processing regarding each of the horizontal direction and vertical direction. That is to say, at the division level=2, the region LL formed by being divided at the division level=1 is further divided into four regions, a region HH, region HL, region LH, and region LL are formed within the region LL.

The wavelet transformation unit 150 is configured so as to perform filter processing according to wavelet transformation in a stepwise manner by dividing the filter processing into processing in increments of several lines regarding the vertical direction of the screen, i.e., dividing into multiple times. With the example shown in FIG. 5, at first processing equivalent to processing from the first line on the screen, seven lines are subjected to filter processing, and at second processing and thereafter equivalent to processing from the eighth line, filter processing is performed every four lines. The number of lines is based on the number of lines necessary for generating one line worth of the lowest band components after the region is divided into two of highband components and lowband components.

Note that, hereafter, a line group including other sub-bands, which is necessary for generating one line worth of the lowest band components (one line worth of coefficient data of the lowest band component sub-band), will be referred to as a precinct (or line block). Here, a line indicates one row worth of pixel data or coefficient data formed within a picture, field, or each sub-band corresponding to the image data before wavelet transformation. That is to say, a precinct (or line block) indicates, with the original image data before wavelet transformation, a pixel data group equivalent to the number of lines necessary for generating one line worth of the lowest band component sub-band coefficient data after wavelet transformation, or a coefficient data group of each sub-band obtained by subjecting the pixel data group thereof to wavelet transformation.

According to FIG. 5, a coefficient C5 obtained as a filter processing result at the division level=2 is calculated based on a coefficient C4 and a coefficient $C_a$ stored in the midway calculation buffer unit 151, and a coefficient C4 is calculated based on the coefficient $C_a$, coefficient $C_b$, and coefficient $C_c$ stored in the midway calculation buffer unit 151. Further, the coefficient $C_c$ is calculated based on the coefficient C2 and coefficient C3 stored in the coefficient rearranging buffer unit 152, and the pixel data of the fifth line. Also, the coefficient C3 is calculated based on the pixel data of the fifth through seventh lines. Thus, in order to obtain the coefficient C5 which is a lowband component at the division level=2, the pixel data of the first through seventh lines is needed.

On the other hand, with the second filter processing and on, the coefficient data already calculated at the filter processing so far and stored in the coefficient rearranging buffer unit 152 can be employed, so necessary number of lines can be suppressed to be less.

That is to say, according to FIG. 5, of the lowband component coefficients obtained as filter processing results at the division level=2, a coefficient C9, which is the next coefficient of the coefficient C5, is calculated based on the coefficient C4 and coefficient C8, and the coefficient $C_c$ stored in the midway calculation buffer unit 151. The coefficient C4 has been already calculated at the above-mentioned first filter processing, and stored in the coefficient rearranging buffer unit 152. Similarly, the coefficient $C_c$ has been already calculated at the above-mentioned first filter processing, and stored in the midway calculation buffer unit 151. Accordingly, with the second filter processing, only the filter processing to calculate the coefficient C8 is newly performed. This new filter processing is performed further using the eighth line through eleventh line.

Thus, with the second filter processing and on, the data calculated at the filter processing so far and stored in the midway calculation buffer unit 151 and coefficient rearranging buffer unit 152 can be employed, whereby each processing can be suppressed to processing every four lines.

Note that in a case wherein the number of lines on the screen is not identical to the number of lines for encoding, the lines of the original image data are copied using a predetermined method so that the number of lines matches the number of lines for encoding, thereby performing filter processing.

Thus, the filter processing whereby one line worth of the lowest band component coefficient data can be obtained is performed in a stepwise manner by being divided into multiple times (in increments of precinct) as to the lines of the entire screen, whereby a decoded image can be obtained with low delay at the time of sending encoded data.

In order to perform wavelet transformation, a first buffer employed for executing wavelet transformation itself, and a second buffer for storing coefficients generated during the time of executing processing, until a predetermined division level is obtained, are needed. The first buffer corresponds to the midway calculation buffer unit 151, and is shown surrounded with the dotted lines in FIG. 5. Also, the second buffer corresponds to the coefficient rearranging buffer unit 152, and is shown surrounded with the single dot broken lines in FIG. 5. The coefficients stored in the second buffer are employed at the time of decoding, so these are to be subjected to entropy encoding processing of the subsequent stage.

Next, the processing of the coefficient rearranging unit 153 in FIG. 2 will be described. As described above, the coefficient data calculated at the wavelet transformation unit 150 is stored in the coefficient rearranging buffer unit 152, the order thereof is rearranged by the coefficient rearranging unit 153, and the rearranged coefficient data is read out and sent to the entropy encoding unit 155 in increments of coding units.

As already described above, with wavelet transformation, coefficients are generated from the highband component side to the lowband component side. In the example in FIG. 5, at the first time, the highband component coefficient C1, coefficient C2, and coefficient C3 are sequentially generated at the division level=1 filter processing, from the pixel data of the original image. The division level=2 filter processing is then performed as to the lowband component coefficient data obtained at the division level=1 filter processing, whereby lowband component coefficient C4 and coefficient C5 are sequentially generated. That is to say, the first time, coefficient data is generated in the order of coefficient C1, coefficient C2, coefficient C3, coefficient C4, and coefficient C5. The generating order of the coefficient data is always in this order (the order from highband to lowband) based on the principle of wavelet transformation.

Conversely, on the decoding side, in order to immediately decode with low delay, generating and outputting an image from lowband components is necessary. Therefore, rearranging the coefficient data generated on the encoding side from the lowest band component side to the highband component side and supplying this to the decoding side is desirable.

Further detailed description will be given with the example in FIG. 5. The right side of FIG. 5 shows a synthesis filter side performing wavelet inverse transformation. The first-time synthesizing processing (wavelet inverse transformation processing) including the first line of output image data on the decoding side is performed employing the lowest band component coefficient C4 and coefficient C5, and coefficient C1, generated at the first-time filter processing on the encoding side.

That is to say, with the first-time synthesizing processing, coefficient data is supplied from the encoding side to the decoding side in the order of coefficient C5, coefficient C4, and coefficient C1, whereby on the decoding side, synthesizing processing as to the coefficient C5 and coefficient C4 are performed to generate the coefficient $C_f$ by synthesizing level=2 processing which is synthesizing processing corresponding to the division level=2, and stores the coefficient $C_f$ in the buffer. Synthesizing processing as to the coefficient $C_f$ and the coefficient C1 is then performed with the synthesizing level=1 processing which is synthesizing processing corresponding to the division level=1, whereby the first line is output.

Thus, with the first-time synthesizing processing, the coefficient data generated on the encoding side in the order of coefficient C1, coefficient C2, coefficient C3, coefficient C4, and coefficient C5 and stored in the coefficient rearranging buffer unit 152 is rearranged to the order of coefficient C5, coefficient C4, coefficient C1, and so forth, and supplied to the decoding side.

Note that with the synthesis filter side shown on the right side of FIG. 5, the coefficients supplied from the encoding side are referenced with a number of the coefficient on the encoding side in parentheses, and shows the line order of the synthesis filter outside the parentheses. For example, coefficient C1 (5) shows that on the analysis filter side on the left side of FIG. 5 this is coefficient C5, and on the synthesis filter side is on the first line.

The synthesizing processing at the decoding side by the coefficient data generated with the second-time filter processing and thereafter on the encoding side can be performed employing coefficient data supplied from the synthesizing in the event of synthesizing processing from the previous time or from the encoding side. In the example in FIG. 5, the second-time synthesizing processing on the decoding side which is performed employing the lowband component coefficient C8 and coefficient C9 generated with the second-time filter processing on the encoding side further requires coefficient C2 and coefficient C3 generated at the first-time filter processing on the encoding side, and the second line through the fifth line are decoded.

That is to say, with the second-time synthesizing processing, coefficient data is supplied from the encoding side to the decoding side in the order of coefficient C9, coefficient C8, coefficient C2, coefficient C3. On the decoding side, with the synthesizing level=2 processing, a coefficient $C_g$ is generated employing coefficient C8 and coefficient C9, and coefficient C4 supplied from the encoding side at the first-time synthesizing processing, and the coefficient $C_g$ is stored in the buffer. A coefficient $C_h$ is generated employing the coefficient $C_g$ and the above-described coefficient C4, and coefficient $C_f$ generated by the first-time synthesizing processing and stored in the buffer, and the coefficient $C_h$ is stored in the buffer.

With the synthesizing level=1 processing, synthesizing processing is performed employing the coefficient $C_g$ and coefficient $C_h$ generated at the synthesizing level=2 processing and stored in the buffer, the coefficient C2 supplied from the encoding side (shows as coefficient C6 (2) with the synthesis filter), and coefficient C3 (shows as coefficient C7 (3) with the synthesis filter), and the second line through fifth line are decoded.

Thus, with the second-time synthesizing processing, the coefficient data generated on the encoding side in the order of coefficient C2, coefficient C3, (coefficient C4, coefficient C5), coefficient C6, coefficient C7, coefficient C8, coefficient C9 is rearranged and supplied to the decoding side in the order of coefficient C9, coefficient C8, coefficient C2, coefficient C3, and so forth.

Thus, with the third synthesizing processing and thereafter as well, similarly, the coefficient data stored in the coefficient rearranging buffer unit 152 is rearranged in a predetermined order and supplied to the decoding unit, wherein the lines are decoded in four-line increments.

Note that with the synthesizing processing on the decoding side corresponding to the filter processing including the lines at the bottom end of the screen on the encoding side (hereafter called the last time), the coefficient data generated in the processing up to then and stored in the buffer are all to be output, so the number of output lines increases. With the example in FIG. 5, eight lines are output during the last time.

Note that the rearranging processing of coefficient data by the coefficient rearranging unit 153 sets the readout addresses in the event of reading the coefficient data stored in the coefficient rearranging buffer unit 152, for example, into a predetermined order.

Figure 6:
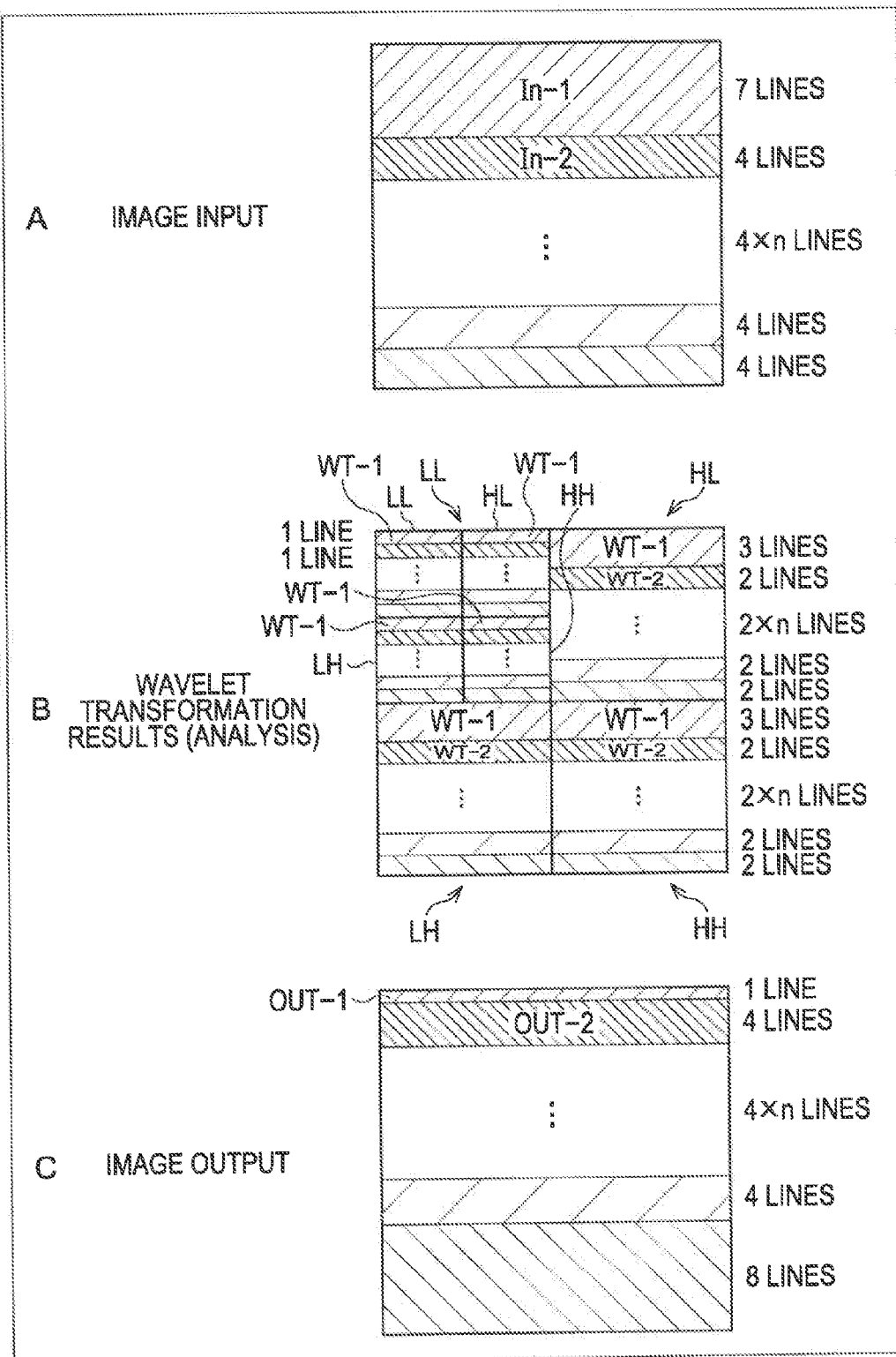
FIG. 6 is an outlined line drawing schematically illustrating the flow of wavelet transformation and wavelet inverse transformation according to the present invention.

The above processing will be described in further details with reference to FIG. 6. FIG. 6 is an example of performing filter processing by wavelet transformation up to the division level=2, employing a 5×3 filter. With the wavelet transformation unit 150, as one example is shown in A in FIG. 6, the first-time filter processing is performed on the first line through the seventh line of the input image data in each of the horizontal and vertical directions (In-1 in A in FIG. 6).

With the division level=1 processing of the first-time filter processing, the coefficient data for three lines worth of the coefficient C1, coefficient C2, and coefficient C3 is generated, and as an example shown in B in FIG. 6, are each disposed in the region HH, region HL, and region LH formed with the division level=1 (WT-1 in B in FIG. 6).

Also, the region LL formed with the division level=1 is further divided into four with the filter processing in the horizontal and vertical directions by the division level=2. With the coefficient C5 and coefficient C4 generated with the division level=2, one line is disposed in the region LL by the coefficient C5 by the division level=1, and one line is disposed in each of the region HH, region HL, and region LH, by the coefficient C4.

With the second-time filter processing and thereafter by the wavelet transformation unit 150, filter processing is performed in increments of four lines (In-2 . . . in A in FIG. 6), coefficient data is generated in increments of two lines at the division level=1 (WT-2 in B in FIG. 6) and coefficient data is generated in increments of one line at the division level=2.

With the example of the second time in FIG. 5, coefficient data worth two lines of the coefficient C6 and coefficient C7 is generated at the division level=1 filter processing, and as one example is shown in B in FIG. 6, is disposed following the coefficient data which is generated at the first-time filter processing of the region HH, region HL, and region LH formed with the division level 1. Similarly, within the region LL by the division level=1, the coefficient C9 worth one line generated with the division level=2 filter processing is disposed in the region LL, and the coefficient C8 worth one line is disposed in each of region HH, region HL, and region LH.

In the event of decoding the data subjected to wavelet transformation as in B in FIG. 6, as one example is shown in C in FIG. 6, the first line by the first-time synthesizing processing on the decoding side is output (Out-1 in C in FIG. 6) as to the first-time filter processing by the first line through the seventh line on the encoding side. Thereafter, four lines at a time are output on the decoding side (Out-2 . . . in C in FIG. 6) as to the filter processing from the second time until before the last time on the encoding side. Eight lines are output on the decoding side as to the filter processing for the last time on the encoding side.

The coefficient data generated by the wavelet transformation unit 150 from the highband component side to the lowband component side is sequentially stored in the coefficient rearranging buffer unit 152. With the coefficient rearranging unit 153, when coefficient data is accumulated in the coefficient rearranging buffer unit 152 until the above-described coefficient data rearranging can be performed, the coefficient data is rearranged in the necessary order for synthesizing processing and read from the coefficient rearranging buffer unit 152. The read out coefficient data is sequentially supplied to the entropy encoding unit 155.

Figure 7:
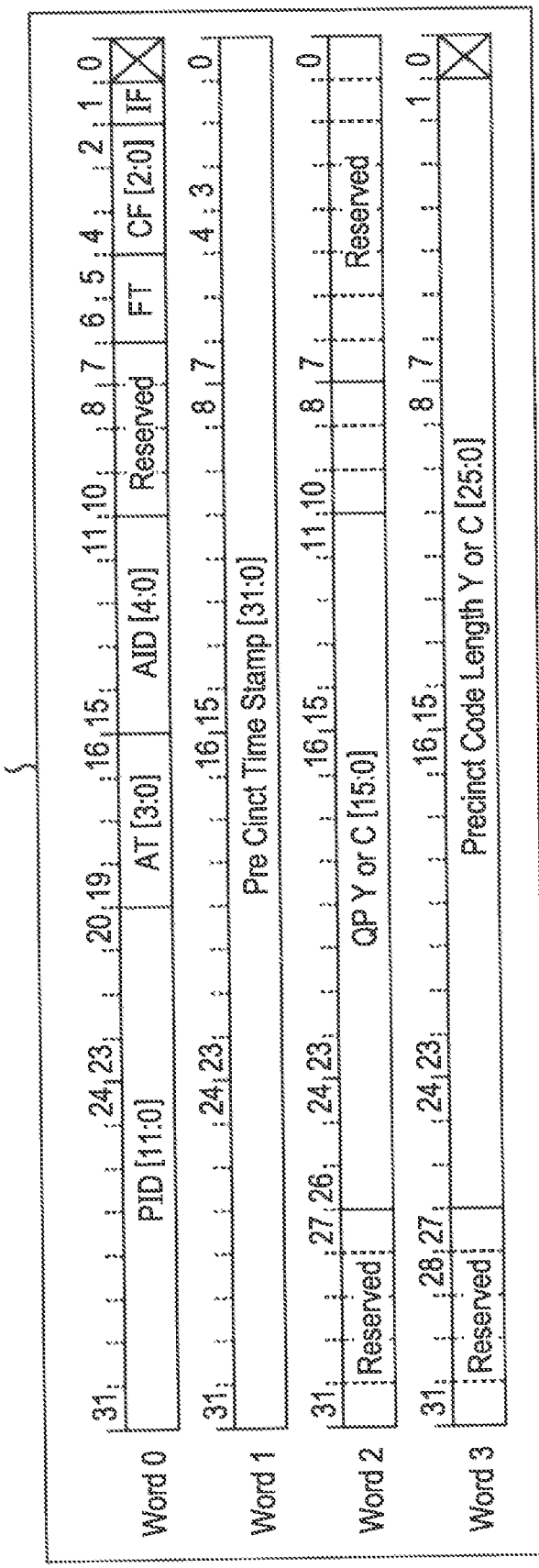
FIG. 7 is a diagram illustrating a configuration example of a precinct header.

The image data encoded in increments of precincts as describe above (encoded data) is supplied to the packetizing processing unit 122. At this time, the entropy encoding unit 155 supplies information relating to that image data to the packetizing processing unit 122 as header information (precinct header), in increments of precincts. FIG. 7 illustrates a configuration example of the precinct header.

As shown in FIG. 7, a precinct header 171 is made up of 4 words (32×4 bits) worth of data, and includes information such as PID, AT, AID, FT, CF, IF, precinct time stamp, quantization coefficient, and precinct code length.

The PID (Precinct ID) is 12-bit information indicating the No. of a precinct as counted from the head of the picture. The AT (Align Unit Type) is 4-bit information indicating the attributes of an alight unit configured within a precinct. An align unit is encoded data within the precinct that has been divided into predetermined data increments, such as encoding increments or the like, for example. That is to say, a precinct is configured of 1 or multiple align units. The AID (Align Unit ID) is 5-bit information indicating the No. of an align unit as counted from the head of the precinct. The FT (Field Type) is 2-bit flag information indicating which field the picture is, progressive or interlaced. The CF (Component Flag) is 3-bit information indicating that, of the components of luminance component Y, color difference component Cb, and color difference component Cr, multiple components have been put together in a single align unit or precinct.

The IF (Incomplete Flag) is 1-bit flag information indicating being an align unit or precinct regarding which encoding has failed for some reason. This failure range is limited to a payload indicated by the PID, AT, and AID.

The precinct time stamp (Precint Time Stamp) is information indicating the lower-order 32 bits of a time stamp of that precinct. The quantization coefficient (QP Y or C) is 16-bit information indicating the value of a quantization coefficient used for quantization of the luminance component Y or color difference component C. The precinct code length (Precinct Code Length Y or C) is 26-bit information indicating the data length of encoded data of the luminance component Y or color difference component C of that precinct.

Also, the entropy encoding unit 155 supplies information relating to that image data to the packetizing processing unit 122 as header information (picture header), in increments of pictures. FIG. 8 illustrates a configuration example of the picture header.

As shown in FIG. 8, a picture header 172 is made up of words (32×26 bits) worth of data, and includes information such as PI, w, CEF, CBD, DL, WF, PDI, SF, FR, AR, DBSZ, full time stamp, V0 start position, SD, H start position, VF, V total size, TSD, H total size, PXCS, V size, VSD, H size, BRT, CTS, and WTm.

The PI (Profile Indication) is 5-bit information for specifying a profile. The w is 1-bit flag information for indicating whether or not to include a weighting table, which is table information for setting a custom value of a weighting coefficient, in the packet. The CEF (Color Extension Flag) is 1-bit flag information for indicating whether or not to use an extended header for color information. The CBD (Component Bit Depth) is 5-bit information indicating the bit depth of the component. A value, where "8" has been subtracted from a value specified beforehand, is stored. The DL (DWT Level) is 3-bit information indicating the number of divisions of wavelet transformation (division levels). The WF (Wavelet Filter) is 2-bit information indicating the type of filter used for wavelet transformation. The PDI (Picture Discontinuity Indication) is 1-bit information indicating the continuity of a time stamp. The SF (Sampling Format) is 2-bit information indicating the color difference sampling method.

The FR (Frame Rate) is 1-bit information indicating the frame rate. The AR (Aspect Ratio) is 6-bit information indicating the pixel aspect ratio. The DBSZ (Decoder Buffer Size) is 4-bit information indicating the precinct buffer size at the decoder. The full time stamp (FTS (Full Time Stamp)) is 46-bit information indicating a full size time stamp.

The V0 start position (FFVS (First Field Vertical Start)) is 13-bit information indicating the vertical direction value pixel start position of the head field. The SD (Start Diff) is 2-bit information indicating the difference between the FFVS and the second field. The H start position (HS (Horizontal Start)) is 13-bit information indicating the valid pixel start position in the horizontal direction. The VF (Video Format) is 4-bit information indicating the video format of compressed signals.

The V total size (FFVTS (First Field Vertical Total Size)) is 13-bit information indicating the total number of pixels including the blank of the head field. The TSD (Total Size Diff) is 2-bit information indicating the difference between the FFVTS and the second field. The H total size (HTS (Horizontal Total Size)) is 13-bit information indicating the total number of pixels including the blank in the horizontal direction. The PXCS (Pixel Clock Scale) is 3-bit information indicating the scale of the clock.

The V size (FFVVS (First Field Vertical Valid Size)) is 13-bit information indicating the vertical direction value pixel size of the head field. The VSD (Valid Size Diff) is 2-bit information indicating the difference between the FFVVS and the second field. The H size (HVS (Horizontal Valid Size)) is 13-bit information indicating the value pixel size in the horizontal direction. The BRT (B Value Reset Timing) is 2-bit information indicating the reset timing of a B value.

The CTS (Custom Table Size) is 16-bit information indicating the size of a custom table. There are as many subsequent custom values as the number of specified values, with the size thereof being CTS×2 bytes. The WTm (Weighting Table m) is 16×m-bit information indicating the m'th weighting table.

Figure 9:
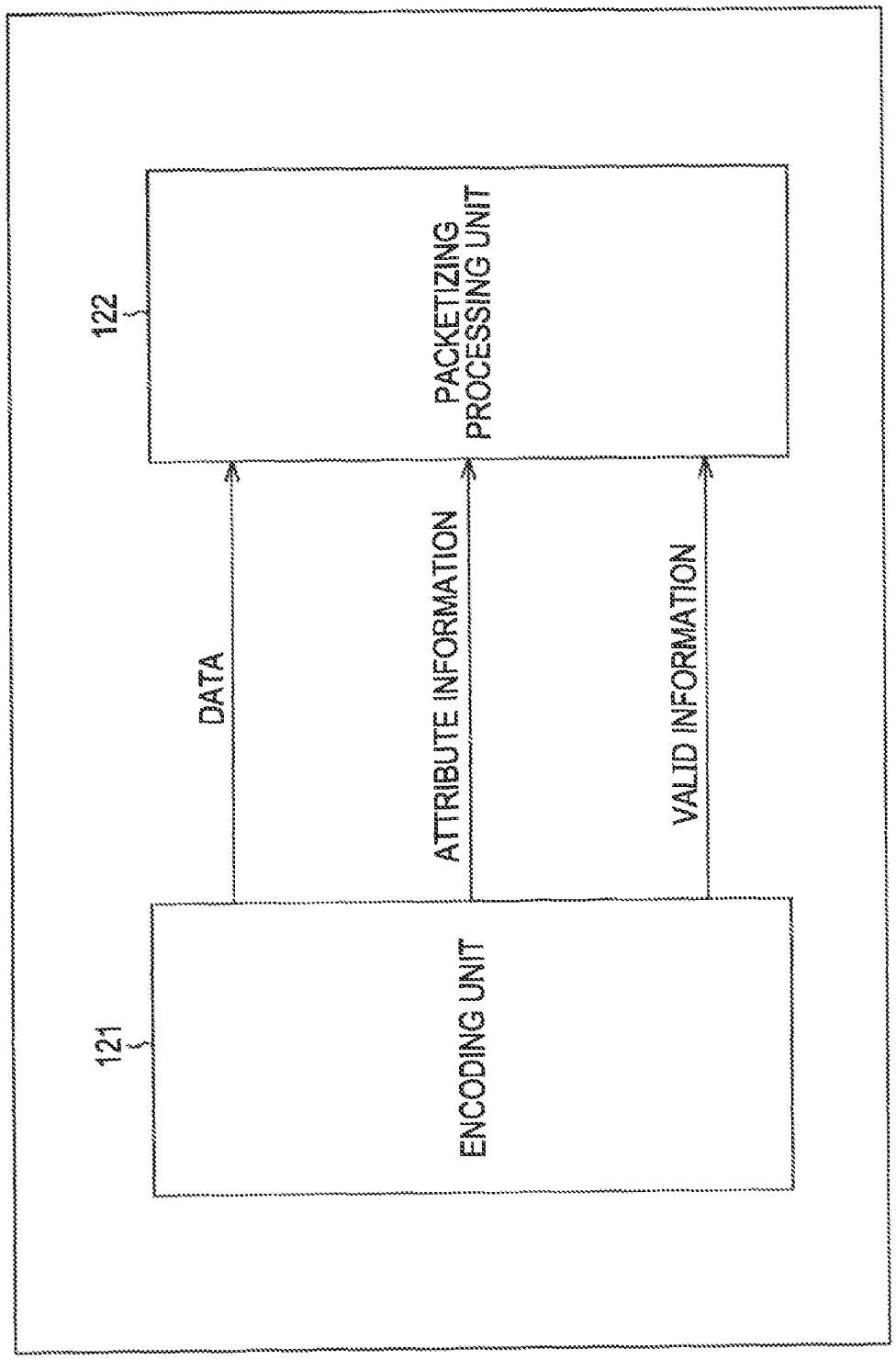
FIG. 9 is a diagram illustrating an example of information exchanged between an encoding unit and a packetizing processing unit.

Note that in reality, as shown in FIG. 9, attribute information, VALID information, and so forth, are also supplied from the encoding unit 121 to the packetizing processing unit 122, besides data. Attribute information is information indicating whether the data to be supplied is header or image data, indicating whether luminance component data or color difference component data, and so forth. VALID information is information for notifying the read timing of data.

The packetizing processing unit 122 perform packetizing processing as to encoded data supplied each predetermined data increment (precinct), based on the size of the data and a packet size separately specified.

Figure 10:
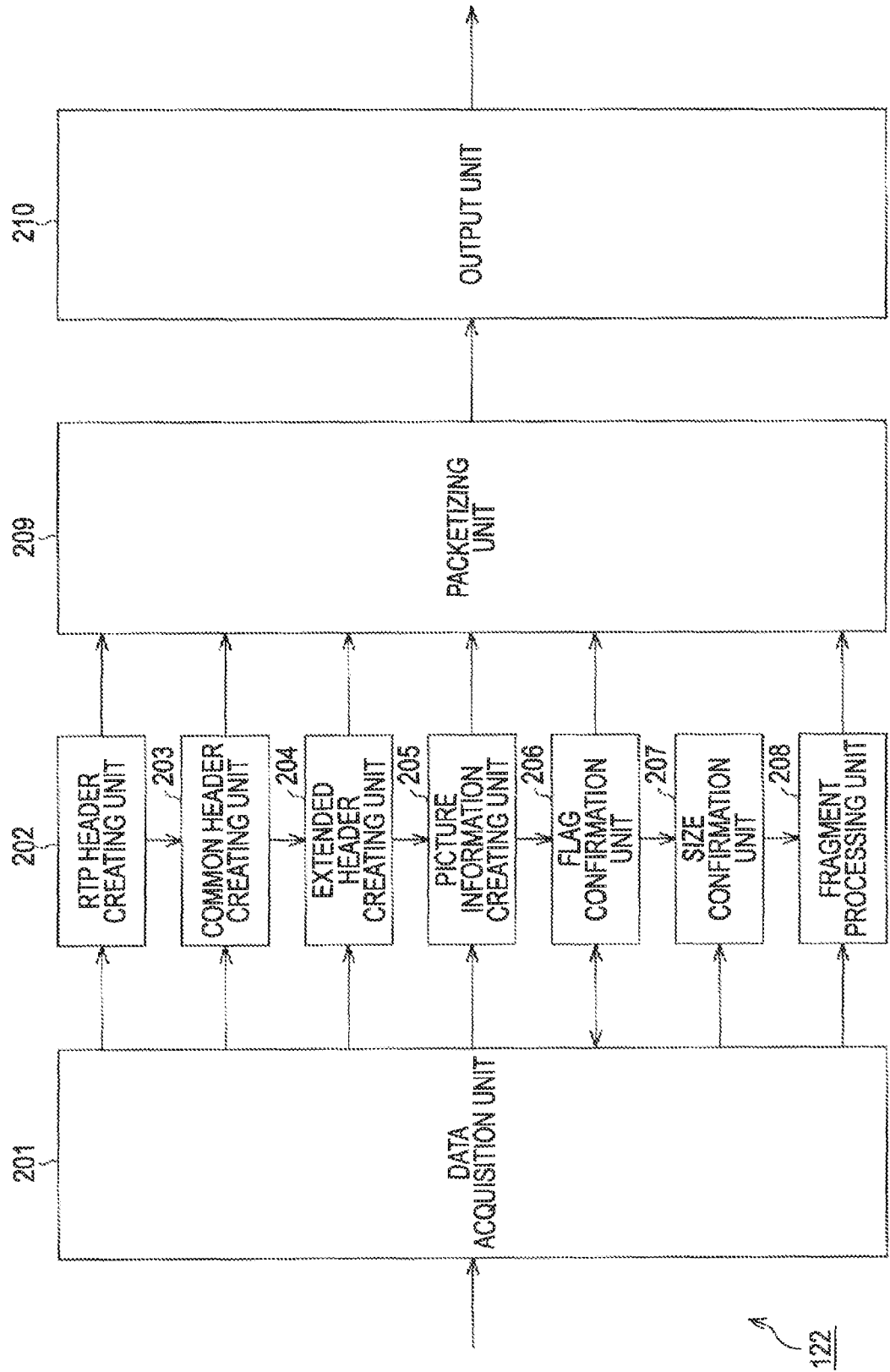
FIG. 10 is a block diagram illustrating a detailed configuration example of the packetizing processing unit shown in FIG. 1.

FIG. 10 is a block diagram illustrating an internal configuration example of the packetizing processing unit 122 in FIG. 1.

In FIG. 10, the packetizing processing unit 122 includes a data acquisition unit 201, an RTP (Real-time Transport Protocol) header creating unit 202, a common header creating unit 203, an extended header creating unit 204, a picture information creating unit 205, a flag confirmation unit 206, a size confirmation unit 207, a fragment processing unit 208, a packetizing unit 209, and an output unit 210.

The data acquisition unit 201 acquires encoded data and packets and the like supplied from the encoding unit 121 based on attributes information and VALID information and the like supplied along with the data. For example, upon obtaining a precinct header 171, the data acquisition unit 201 supplies this to the RTP header creating unit 202, common header creating unit 203, extended header creating unit, flag confirmation unit 206, and size confirmation unit 207. Also, upon obtaining a picture header 172 for example, the data acquisition unit 201 supplies this to the picture information creating unit 205. Further, upon acquiring encoded data for example, the data acquisition unit 201 supplies this to the fragment processing unit 208.

Upon the data acquisition unit 201 obtaining a precinct header, the RTP header creating unit 202 creates an RTP header which is a header of an RTP packet, based on the obtained precinct header. Details of RTP headers will be described later. The RTP header creating unit 202 supplies the created RTP header to the packetizing unit 209, and makes notification of ending of processing to the common header creating unit 203.

Upon receiving the notification from the RTP header creating unit 202, the common header creating unit 203 creates a common header, which is a common header attached to each packet created from that precinct, based on the precinct header 171 which the data acquisition unit 201 has obtained. A common header includes basic information relating to that precinct. Details of common headers will be described later. The common header creating unit 203 supplies the created common header to the packetizing unit 209, and makes notification of ending of processing to the extended header creating unit 204.

Upon receiving the notification from the common header creating unit 203, the extended header creating unit 204 creates information for an extended header in which is provided information not included in the common header as necessary, relating to that precinct, based on the precinct header 171 which the data acquisition unit 201 has obtained. Creating this extended header enables flexible and effective header creation for the transmitting party. While the contents of the information of the extended header are optionally, this may be, for example, information relating to quantization coefficients, information relating to size, and so forth. Details of extended headers will be described later. The extended header creating unit 204 supplies the created extended header to the packetizing unit 209, and makes notification of ending of processing to the picture information creating unit 205.

Upon receiving the notification from the extended header creating unit 204, and further the data acquisition unit 201 obtaining the picture header 172, the picture information creating unit 205 creates picture information including information relating to that picture, based on the picture header 172. Details of this picture information will be described later. The picture information creating unit 205 supplies the created picture information to the packetizing unit 209, causes the picture information to be inserted into the extended header, and notifies ending of the processing to the flag confirmation unit 206. Note that in the event that the data acquisition unit 201 has not obtained the picture header 172, the picture information creating unit 205 notifies ending of the processing to the flag confirmation unit 206 without creating picture information.

Upon receiving the notification from the picture information creating unit 205, the flag confirmation unit 206 makes reference to the IF included in the precinct header 171 which the data acquisition unit 201 has obtained, and determines whether or not to include encoded data in the packet, in accordance with the value of that flag. For example, in the event that "IF=1", the flag confirmation unit 206 determines that encoding of the data of that precinct has failed, causes the data acquisition unit 201 to discard (not acquire) that un-decodable encoded data, and further controls the packetizing unit 209 to packetize only with header information (so as to not include a payload). Also, in the event that "IF=0" for example, the flag confirmation unit 206 determines that encoding of that precinct has been successful, causes the packetizing unit 209 to packetize including a payload, and makes notification of ending of processing to the size confirmation unit 207.

Upon receiving the notification from the flag confirmation unit 206, the size confirmation unit 207 confirms whether or not the data size of the precinct is greater than a packet size set separately beforehand (maximum value of payload data size included in a single packet), based on the precinct code length included in the precinct header which the data acquisition unit 201 has obtained. For example, in the event that the data size of the precinct is greater than the packet size, the size confirmation unit 207 controls the fragment processing unit 208 to divide the encoded data which the data acquisition unit 201 acquires into each packet size. Conversely, in the event that the data size of the precinct is not greater than the packet size for example, the size confirmation unit 207 controls the fragment processing unit 208 so as to not divide the encoded data which the data acquisition unit 201 acquires.

The fragment processing unit 208 is controlled by the size confirmation unit 207 so as to divide the encoded data which the data acquisition unit 201 acquires into each packet size, in the event that the data size of the precinct is greater than the packet size, and to supply to the packetizing unit 209. That is to say, in this case, each time the data acquisition unit 201 acquires encoded data worth 1 packet size, taking into consideration the header portion as well, the fragment processing unit 208 supplies the 1 packet size worth of encoded data to the packetizing unit 209 as a payload.

Conversely, the fragment processing unit 208 is controlled by the size confirmation unit 207 so as to supply the encoded data which the data acquisition unit 201 acquires to the packetizing unit 209 without change, in the event that the data size of the precinct is not greater than the packet size. That is to say, in this case, the fragment processing unit 208 supplies the 1 precinct worth of encoded data which the data acquisition unit 201 acquires to the packetizing unit 209 as a payload.

The packetizing unit 209 packetizes the payload supplied from the fragment processing unit 208 using header information supplied form each portion. For example, in the event that encoded data of 1 precinct is to be divided into multiple payloads by the fragment processing unit 208, the packetizing unit 209 adds header information necessary for each to each payload, and packetizes each. Also, in the vent that the fragment processing unit 208 is not to divide the encoded data for example, the packetizing unit 209 adds header information necessary for the single payload supplied from the fragment processing unit 208, and packetizes. Further, in the event that the flag confirmation unit 206 instructs not to include a pay-load in the packet for example, the packetizing unit 209 performs packetizing with header information alone, based on that instruction.

Also, the packetizing unit 209 sets the values of flag information, such as SFF, M, etc., included on the common headers of the generated packets, as appropriate. The SFF (Start Fragment Flag) is flag information indicating whether or not that packet is a packet including the head portion of a precinct (head packet), and M (Marker) is flag information indicating whether or not a packet including the end portion of a precinct (final packet). These flag information are referred to at the time of depacketizing processing by the depacketizing processing unit 132.

For example, in the event of the fragment processing unit 208 dividing encoded data, the packetizing unit 209 sets to 1 the SFF of the packet of the head payload of the payload group generated by dividing the encoded data of a single precinct, and sets the M of the packet of the final payload to 1.

Also, in the event that the fragment processing unit 208 does not divide the encoded data for example, the packetizing unit 209 sets the SFF and M of the single generated packet each to 1.

By setting the flag information such as SFF and M in this way, the depacketizing processing unit 132 can easily tell whether that packet is a head packet of a precinct, a final packet, or another packet, by referring to this flag information. Accordingly, the depacketizing processing unit 132 can reduce the standby time as described later, and can reduce the delay time of depacketizing processing.

The packetizing unit 209 supplies the generated packet to the output unit 210.

The output unit 210 supplies the RTP packet supplied from the packetizing unit 209 to the transmission unit 123 (FIG. 1) and causes to be transmitted to the reception device 103 (FIG. 1).

Figure 11:
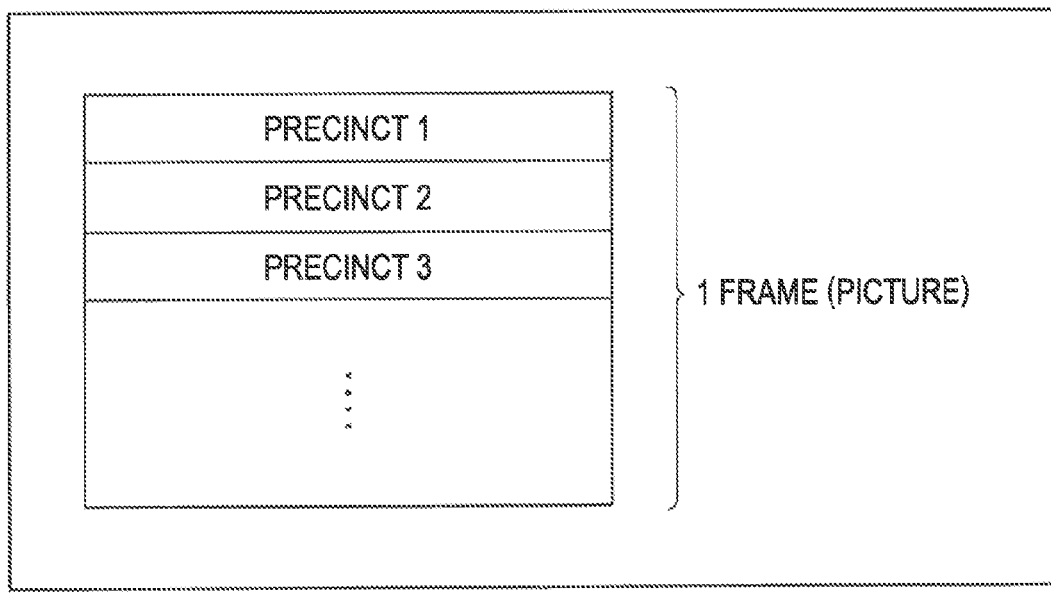
FIG. 11 is a schematic diagram for explaining an example of precincts.

As described above, the encoding unit 121 divides a single picture (frame or field) into multiple precincts, and performs encoding of each precinct, as shown in FIG. 11.

Figure 12:
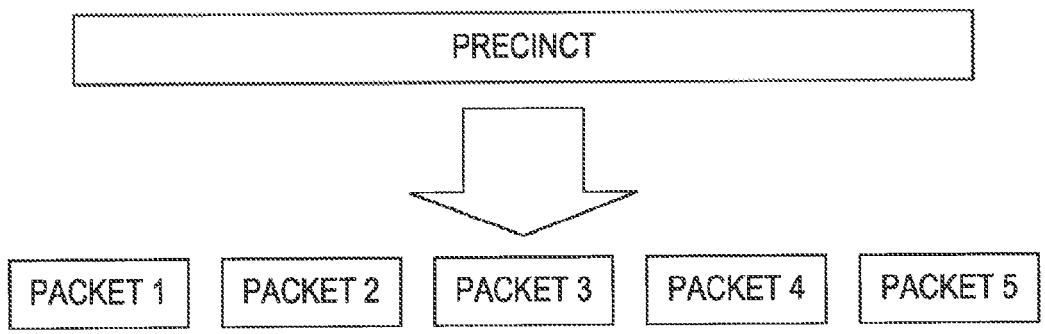
FIG. 12 is a schematic diagram for explaining an example of creating packets.

The packetizing processing unit 122 divides encoded data of a single precinct into each predetermined packet size and packetizes, as shown in FIG. 12. In the event that the data size of the precinct is not greater than the packet size, the generated packet is 1. In the example in FIG. 12, 5 packets are generated from encoded data of a single precinct.

An example of a transmission format of image data is shown below.

Figure 13:
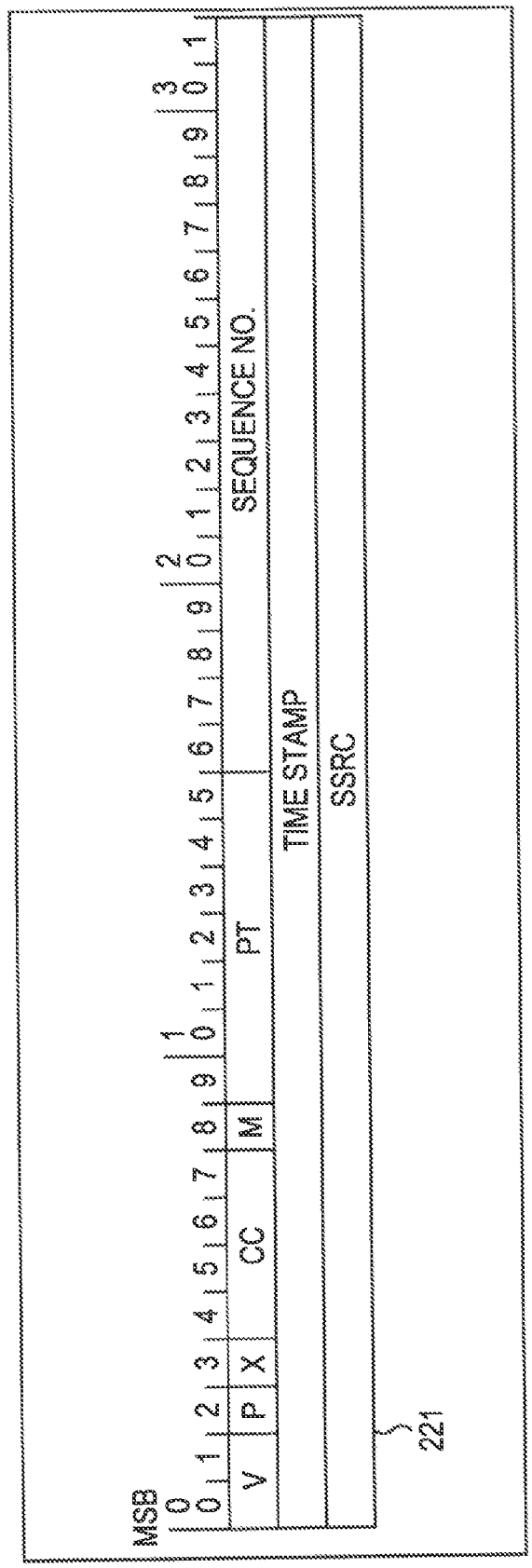
FIG. 13 is a schematic diagram for explaining a configuration example of an RTP header.

FIG. 13 illustrates the configuration of an RTP header which is header information of an RTP packet which the RTP header creating unit 202 creates. An RTP header 221 is provided with the fields of version No. (V), padding (P), whether or not there is an extended header (X), number of transmission sources (Counter) (CC), marker information (marker bit) (M), payload type (Payload type) (PT), sequence No., time stamp, and synchronization source (transmission source) identifier (SSRC (Synchronization Source Identifier)).

The version No. (V) is 2-bit information indicating the version No. of the RTP. The padding (P) is 1-bit flag information, indicating that one or more padding octets (embedded data) have been added at the end of the payload in the event that the value thereof is "1". Whether or not there is an extended header (X) is 1-bit flag information, indicating that an extended header has been added besides a fixed-length header in the event that the value thereof is "1" (there is header extension). The number of transmission sources (CC) is 4-bit information indicating the number of CSRC identifiers, indicating the number of identifiers of individual data sources in the event of single RTP-packetizing of data of multiple data sources as with a multipoint teleconference, for example.

Marker information (M) is 1-bit flag information, indicating an arbitrary event or the like in the payload, for example. The usage method of the marker information (M) is set in the payload type (PT) or the like, for example. The payload type (PT) is 7-bit information for specifying the format of the payload carried by that packet.

The sequence No. is 16-bit numerical information indicating the order of RTP data packets, with the initial value being randomly set, and the value of subsequent packets are incremented by "1". This sequence No. indicates the order of packets throughout the entire encoded data (image data) being transmitted.

The time stamp is 32-bit information indicating the sampling point-in-time of the first byte of the RTP packet. The sampling clock is determined by the data profile of the payload. For example, if we say that the sampling frequency of the audio signal is 8 kHz, the value of the time stamp is incremented by "1" every 125 μsec, so if we say that the RTP data packet is data of 20 msec, the value of the time stamp increases 160 for each packet. Note that the initial value is set randomly.

The synchronization source (transmission source) identifier (SSRC) is a 32-bit identifier indicating the transmission source of this packet. This information is generated randomly. In the event that the transport address changes, this SSRC identifier is also updated.

Figure 14:
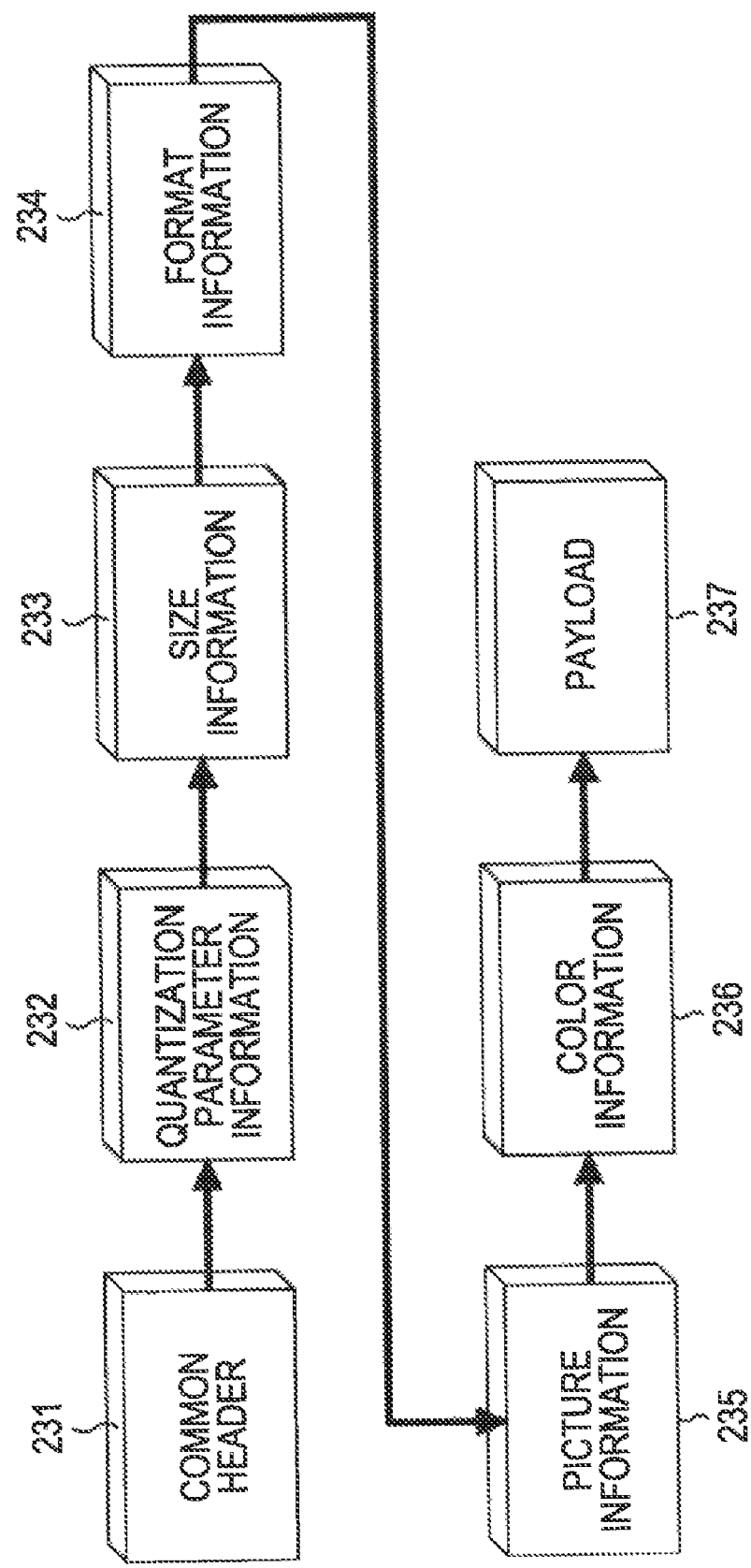
FIG. 14 is a schematic diagram for explaining a configuration example of an RTP payload header.

The common header creating unit 203, extended header creating unit 204, and picture information creating unit 205 generate various types of information included in the payload header following the RTP header. FIG. 14 illustrates a configuration example of a payload header. As shown in FIG. 14, a payload header is configured of a common header 231, quantization parameter information 232, size information 233, format information 234, picture information 235, and color information 236, and is added in front of a payload 237.

The common header 231 is header information including basic information relating to the precinct, created by the common header creating unit 203. This common header 231 is a mandatory header, and is added to all packets.

The quantization parameter information 232 is an extended header created by the extended header creating unit 204, and includes information relating to quantization coefficients. The size information 233 is an extended header created by the extended header creating unit 204, and includes information relating to data size. The format information 234 is an extended header created by the extended header creating unit 204, and includes information relating to the format of the data. The picture information 235 is an extended header created by the picture information creating unit 205, and includes information relating to the original image (that is, the image data which is encoded, packetized, and transmitted). The color information 236 is an extended header created by the extended header creating unit 204, and includes information relating to the color of the image data.

The quantization parameter information 232, format information 234, picture information 235, and color information 236, are attached to the head packet of a precinct (including cases of packets wherein fragmenting is not performed) as an extended header. The size information 233 is attached to any arbitrary packet as an extended header.

That is to say, in the event of adding size information to all packets, everything from the common header 231 through the payload 237 is included in the packet at the head of the precinct. On the other hand, only the common header 231 and the size information 233 and the payload 237 are included in packets other than the head packet of the precinct.

Details of each information will be described.

Figure 15:
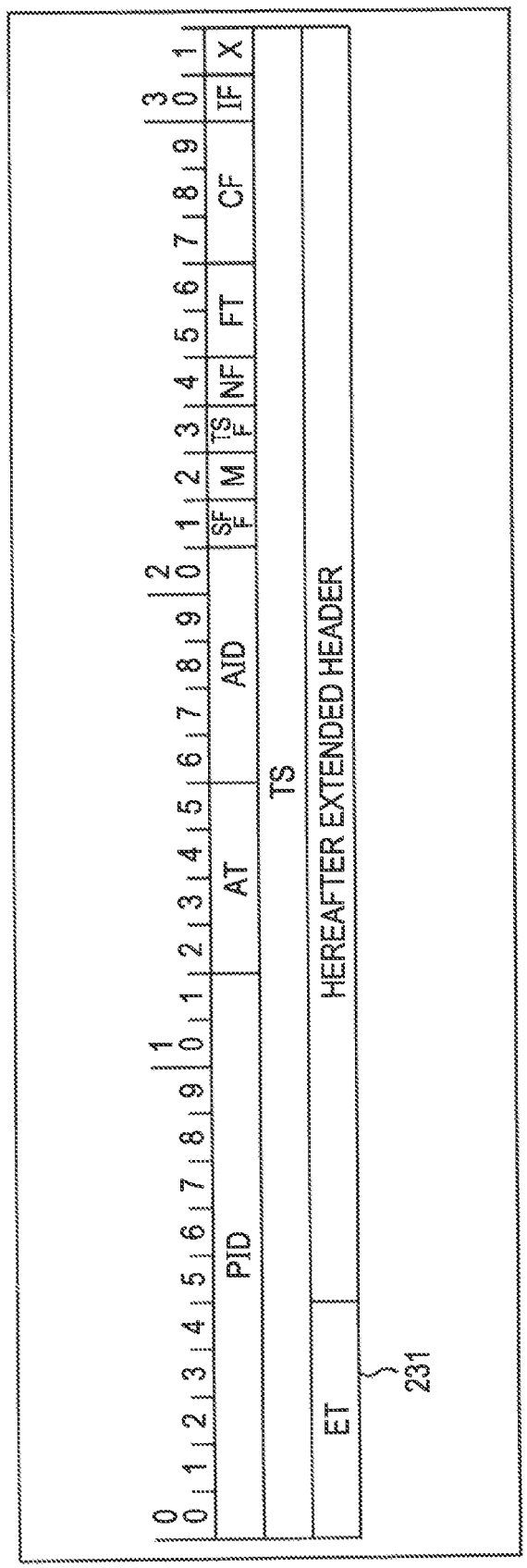
FIG. 15 is a diagram illustrating a configuration example of a common header.

FIG. 15 is a diagram illustrating a configuration example of a common header 231. As shown in FIG. 15, the common header 231 includes information of PID, AT, AID, SFF, M, TSF, NF, FT, CF, IF, X, and TS and so forth. That is to say, the first word (first tier from the top) and second word (second tier from the top) of the common header 231 have been created using the first word (Word 0) and second word (Word 1) of the precinct header 171 supplied from the encoding unit 121 with no change, and SFF, M, TSF, and NF have been added to the 4 bits which were an empty field (Reserved) in the first word.

The SFF (Start Fragment Flag) is 1-bit flag information indicating whether or not the head of the payload indicated by the PID, AT, and AID. That is to say, in the event that this packet is the packet at the head of the precinct (head packet), the value of this SFF is set to "1", and in other cases, is set to "0".

M (Marker) is 1-bit flag information indicating whether or not including the end potion of the payload indicated by the PID, AT, and AID. That is to say, in the event that this packet is the packet including the end portion of the precinct or align unit (final packet), the value of this M is set to "1", and in other cases, is set to "0".

TSF (Time Stamp Flag) is 1-bit flag information indicating whether or not including a time stamp in the common header. That is to say, in the event that the value of this TSF is "1", the second word (Word 1) of the precinct header 171 is attached to the second word of the common header 231.

NF (Next Flag) is 1-bit flag information indicating the presence of a subsequent payload. That is to say, in the event that a payload of multiple precincts or align units is attached to this packet and this header is not the last precinct or align unit in the packet, the value of this NF is set to "1".

TS (Time Stamp) is information indicating the lower-order 32 bits of the time stamp of the precinct to which the payload of this packet belongs, and corresponds to the second word (Word 1) of the precinct header 171.

Note that the third word (third tier from the top) shown in FIG. 15 shows an extended header attached continuing from the common header 231.

Figure 16:
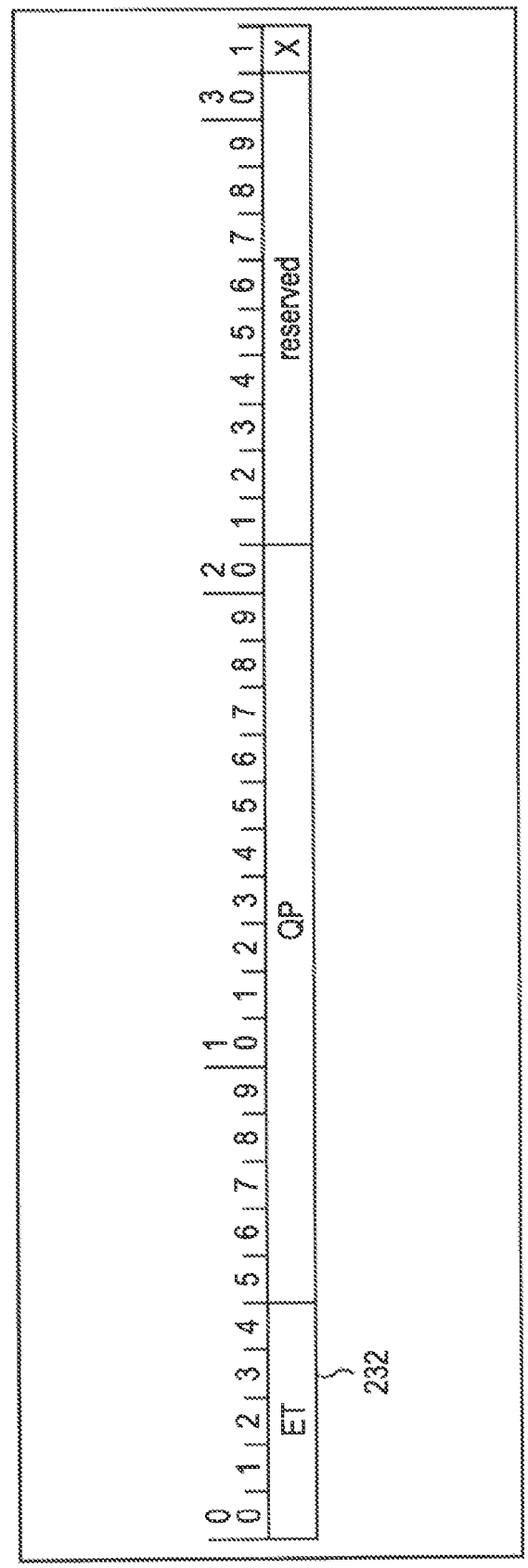
FIG. 16 is a diagram illustrating a configuration example of quantization parameter information.

FIG. 16 is a diagram illustrating a configuration example of the quantization parameter information 232 included in the extended header. As shown in FIG. 16, the quantization parameter information 232 is information including information such as ET, QP, and X. The extended header creating unit 204 creates this quantization parameter information 232 using the third word (Word 2) of the precinct header 171 supplied from the encoding unit 121.

The ET (Extension Type) is 5-bit information indicating the contents of the extended header. The specification value at the time of using this quantization parameter information 232 is arbitrary, but is "00011" for example. The QP (Quantize Parameter) is 16-bit information indicating the value of a quantization coefficient. The X (Extension) is a flag indicating whether or not to use the extended header.

Figure 17:
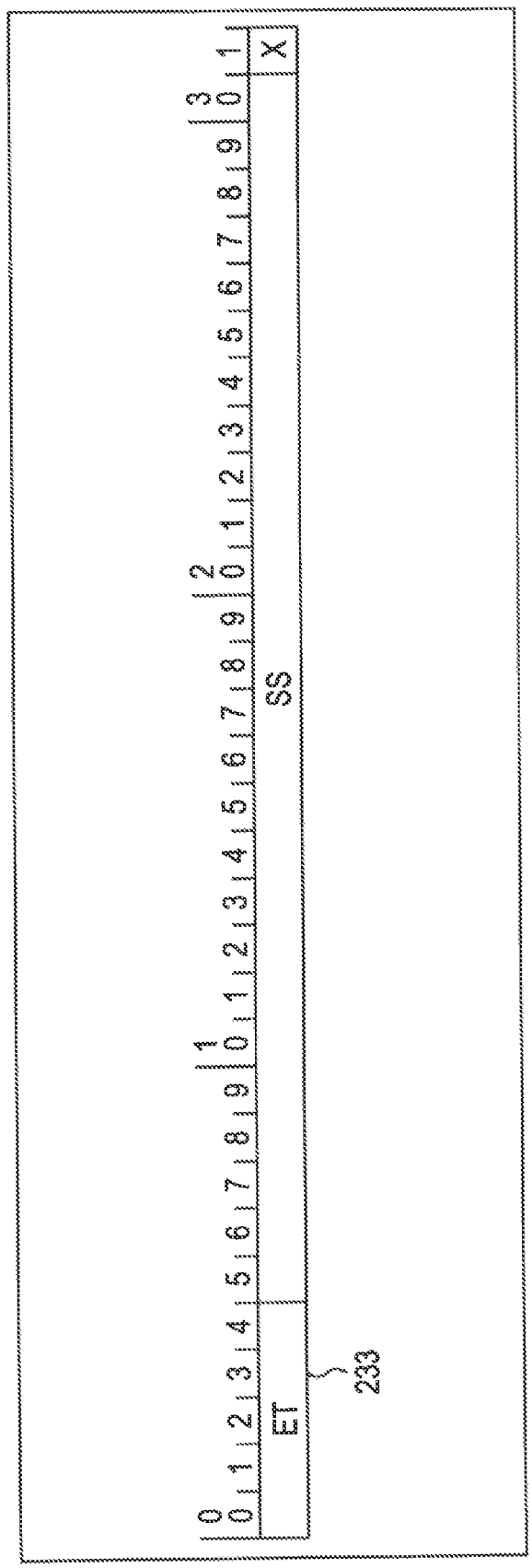
FIG. 17 is a diagram illustrating a configuration example of size information.

FIG. 17 is a diagram illustrating a configuration example of the size information 233 included in the extended header. As shown in FIG. 17, the size information 233 is information including information such as ET, SS, and X. The extended header creating unit 204 creates this size information 233 using the fourth word (Word 3) of the precinct header 171 supplied from the encoding unit 121.

The ET (Extension Type) is 5-bit information indicating the contents of the extended header. The specification value at the time of using this size information 233 is arbitrary, but is "00100" for example. The SS (Segment Size) is 26-bit information indicating the payload size of the segment in word length. The X (Extension) is a flag indicating whether or not to use the extended header.

As shown in FIG. 7, and FIG. 15 through FIG. 17, the encoding unit 121 supplies the precinct header 171 with the same format as the common header 231 and extended header (quantization parameter information 232 and size information 233), to the packetizing processing unit 122. Accordingly, the common header creating unit 203 and extended header creating unit 204 of the packetizing processing unit 122 can create common headers and extended headers easily and at high speed.

Figure 18:
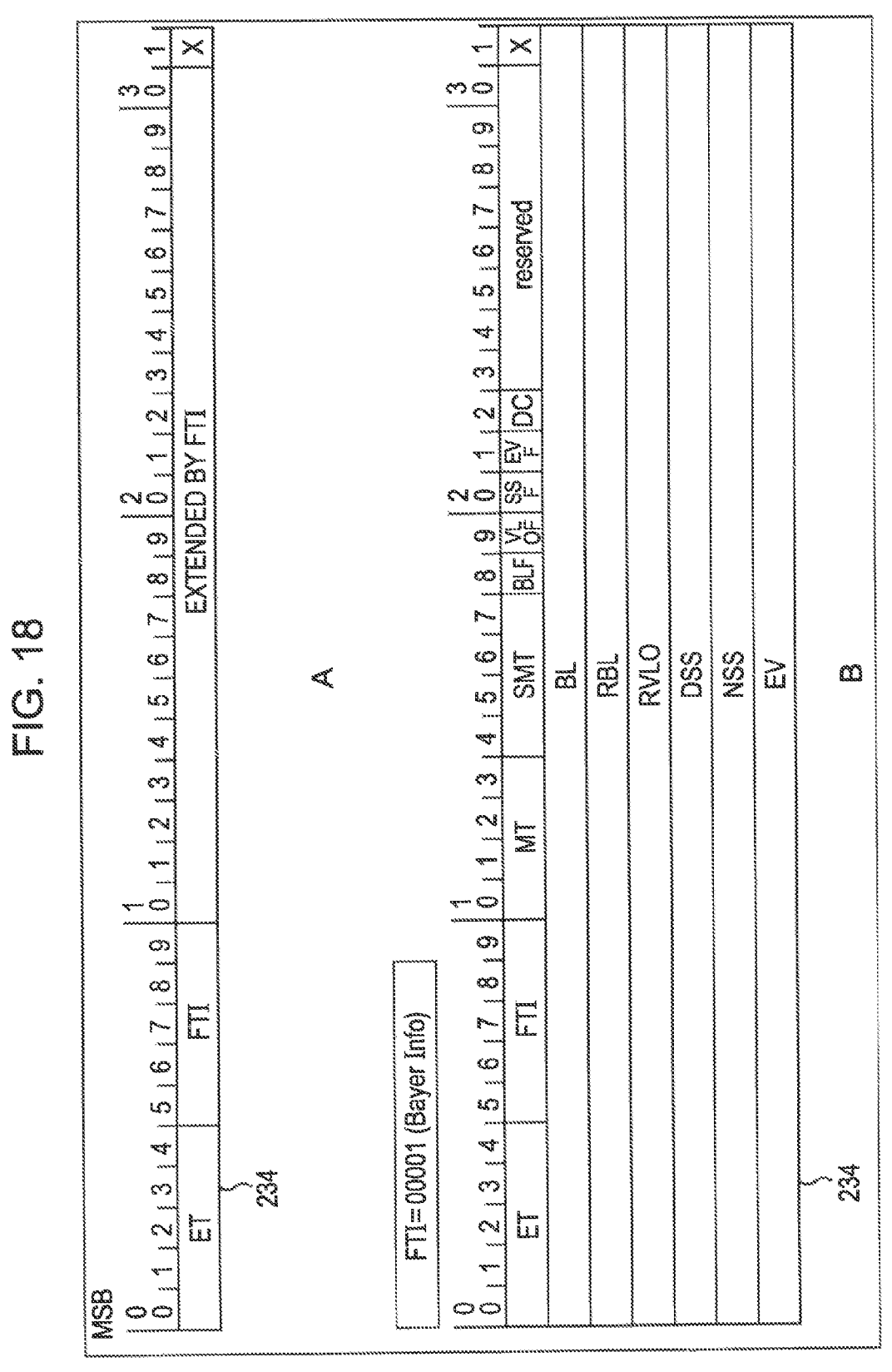

FIG. 18 is a diagram illustrating a configuration example of the format information 234 included in the extended header. As shown in A in FIG. 18, the format information 234 is basically information including ET, FTI, and X and so forth. The extended header creating unit 204 creates this format information 234 using information supplied from the encoding unit 121, for example.

The ET (Extension Type) is 5-bit information indicating the contents of the extended header. The specification value at the time of using this format information 234 is arbitrary, but is "00101" for example. The FTI (Format Type Identifier) is information indicating which format type the described information is related to. This value is arbitrary, but in the event that Bayer information is described for example, a value "00001" is set. The X (Extension) is a flag indicating whether or not to use the extended header.

B in FIG. 18 illustrates a configuration example of the format information 234 in a case wherein Bayer information is described. In this case, besides the ET, FTI, and X, the format information 234 includes information of MT, SMT, BLF, VLOF, SSF, EVF, DC, BL, RBL, RVLO, DSS, NSS, and EV and so forth.

The MT (Mosaic Type) is 4-bit information indicating the mosaic type of the payload. The SMT (Start Mosaic Type) is 4-bit queen indicating the first pixel information at the upper left of the frame. The BLF (Black Level Flag) is 1-bit flag information indicating the presence of black level information. The VLOF (Vertical Line Offset Flag) is 1-bit flag information indicating the presence of vertical line correction information. The SSF (Shutter Speed Flag) is 1-bit flag information indicating the presence of shutter speed information. The EVF (EV Flag) is 1-bit flag information indicating the presence of EV information. The DC (Defect Correction) is 1-bit flag information indicating whether or not to perform defect correction.

The BL (Black Level) is 32-bit flag information indicating a black level value. The RBL (Revised Black Level) is 32-bit information indicating a black level correction offset value. The BL and RBL exist only in the event that the value of the BLF is "1".

The RVLO (Revised Vertical Line Offset) is 32-bit information indicating a vertical line correction offset value. The RVLO only exists in the event that the value of VLOF is "1".

The DSS is 32-bit information indicating shutter speed numerator (unit is APEX). The NSS is 32-bit information indicating shutter speed denominator (unit is APEX). The DSS and NSS only exist in the event that the value of the SSF is "1".

EV is 32-bit information indicating the EV value. The EV only exists in the event that the value of EVF is "1".

Figure 19:
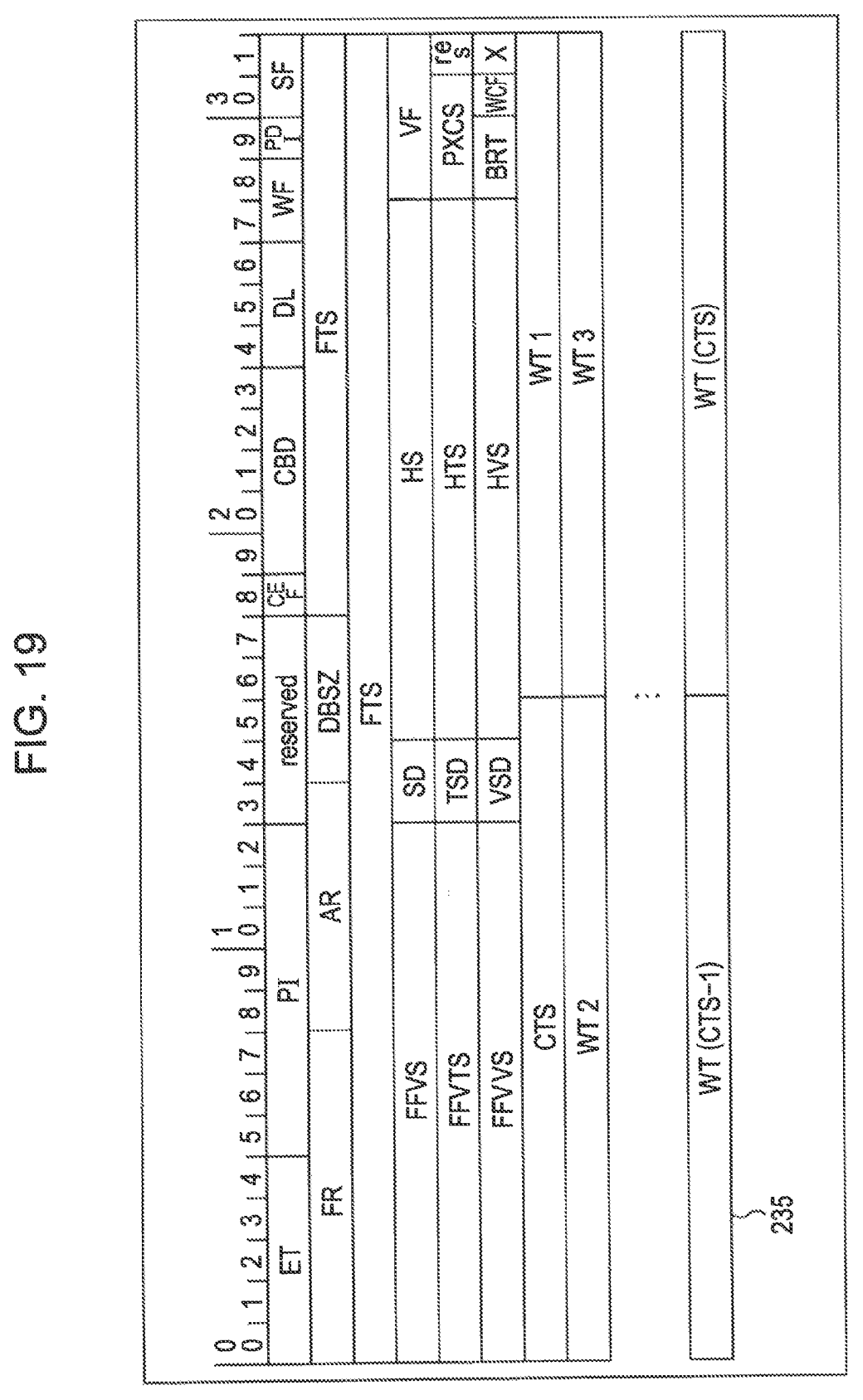

FIG. 19 is a diagram illustrating a configuration example of the picture information 235 included in the extended header. As shown in FIG. 19, the picture information 235 includes the information of ET, PI, CEF, CBD, DL, WF, PDI, SF, FR, AR, DBSZ, FTS, FFVS, SD, HS, VF, FFVTS, TSD, HTS, PXCS, FFVVS, VSD, HVS, BRT, WCF, X, CTS, and WTm and so forth. The picture information creating unit 205 creates this picture information 235 using the picture header 172 supplied from the encoding unit 121.

That is to say, the picture information 235 is that wherein ET has been added to an empty field (Reserved) in the first word (Word 0) and WCF and X have been added to an empty field (Reserved) in the sixth word (Word 5) of the picture header 172 supplied from the encoding unit 121.

The ET (Extension Type) is 5-bit information indicating the contents of the extended header. The specification value at the time of using this picture information 235 is arbitrary, but is "00010" for example. The WCF (Waighting Custom Flag) is a 1-bit information flag indicating whether to use a custom value for a weighting coefficient. The CTS exists only in the event that the value of this WCF is "1". The X (Extension) is a flag indicating whether or not to use the extended header following this header.

As shown in FIG. 8 and FIG. 19, the encoding unit 121 supplies the picture header 172 of the same format as the picture information 235 to the packetizing processing unit 122. Accordingly, the picture information creating unit 205 of the packetizing processing unit 122 can create picture information 235 easily and at high speed.

Figure 20:
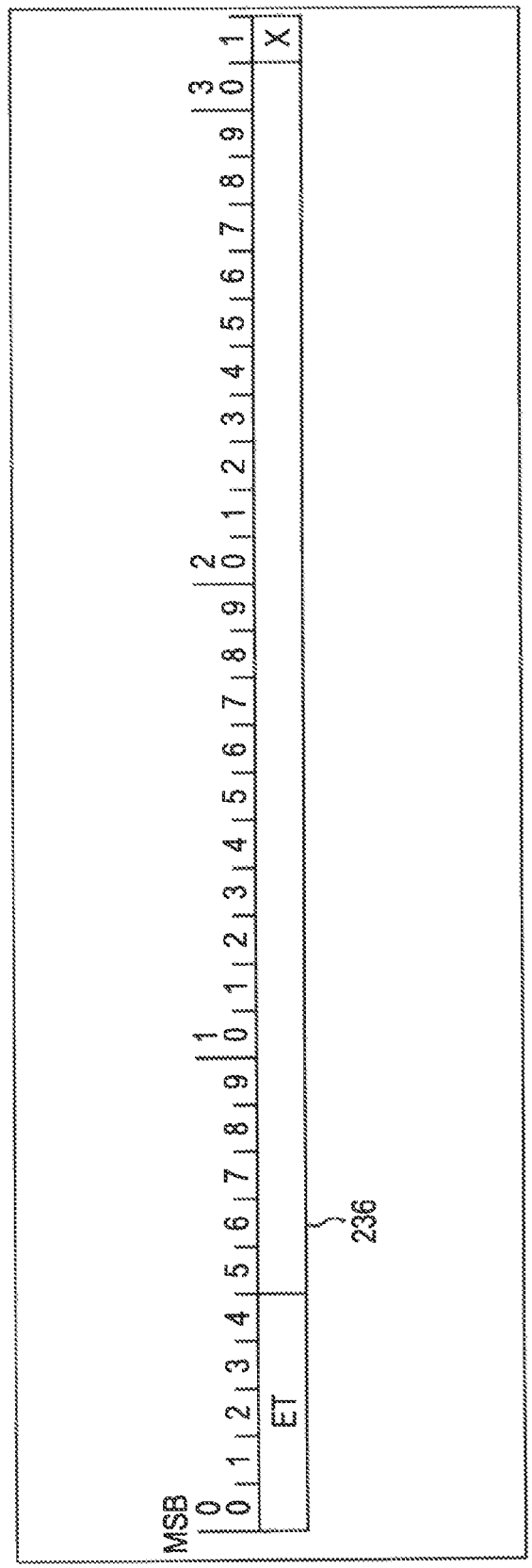
FIG. 20 is a diagram illustrating a configuration example of color information.

FIG. 20 is a diagram illustrating a configuration example of color information 236 included in an extended header. As shown in FIG. 20, the color information 236 includes information of ET and X and so forth. The extended header creating unit 204 creates this color information 236 using information supplied from the encoding unit 121 and so forth.

The ET (Extension Type) is 5-bit information indicating the contents of the extended header. The X (Extension) is a flag indicating whether or not to use the extended header.

The packetizing processing unit 122 packetizes encoded data for each precinct as described above, and supplies to the transmission unit 123. The transmission unit 123 sequentially transmits the packets to the reception device 103 via the line 110.

A packet sent out from the transmission unit 123 with a format such as above is supplied to the reception unit 131 of the reception device 103 via the line 110. Upon receiving the packet, the reception unit 131 supplies it to the depacketizing processing unit 132.

Figure 21:
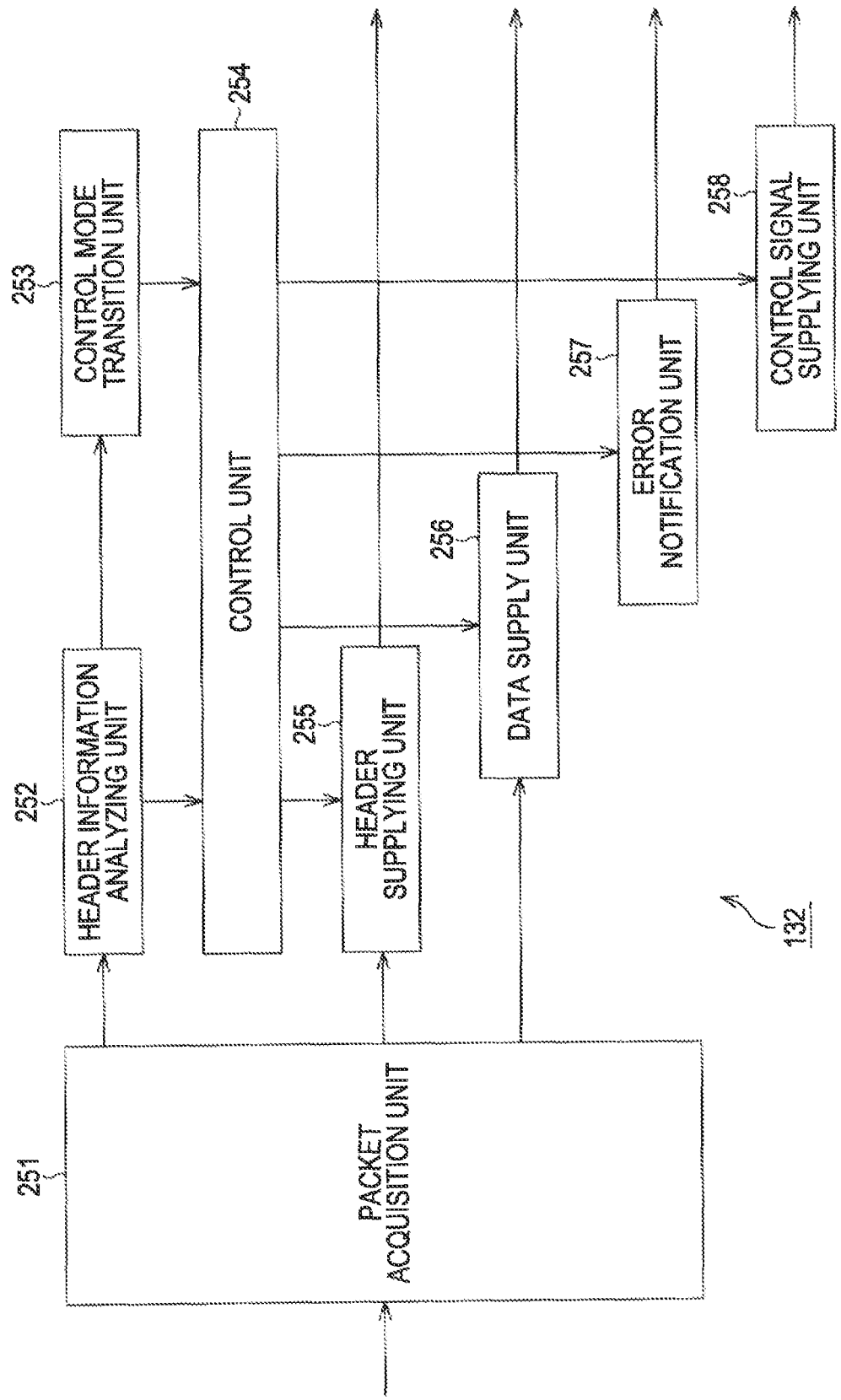
FIG. 21 is a block diagram illustrating a detailed configuration example of a depacketizing processing unit shown in FIG. 1.

FIG. 21 is a block diagram illustrating an internal configuration example of the depacketizing processing unit 132. As shown in FIG. 21, the depacketizing processing unit 132 has, for example, a packet acquisition unit 251, a header information analyzing unit 252, a control mode transition unit 253, a control unit 254, a header supplying unit 255, a data supply unit 256, an error notification unit 257, and a control signal supplying unit 258.

The packet acquisition unit 251 acquires packets supplied form the reception unit 131. At this time, upon acquiring information up to the RTP payload, the packet acquisition unit 251 sequentially supplies the already-acquired information to the header information analyzing unit 252 while continuing the acquisition. That is to say, the packet acquisition unit 251 supplies header information to the header information analyzing unit 252 before acquisition of the payload is completed. Also, the packet acquisition unit 251 also supplies header information to the header supplying unit 255, and also supplies the payload to the data supply unit 256.

The header information analyzing unit 252 analyzes the header information of the RTP packet which the packet acquisition unit 251 has acquired, i.e., the RTP header and payload header information, and supplies the analysis results to the control mode transition unit 253 and control unit 254.

The control mode transition unit 253 controls the operation mode of the control unit 254 based on the analysis results of the header information supplied from the header information analyzing unit 252, and causes transition as necessary.

The control unit 254 controls the operations of the header supplying unit 255, data supply unit 256, error notification unit 257, and control signal supplying unit 258, based on the analysis results supplied from the header information analyzing unit 252, in the control mode in which transition was made under control of the control mode transition unit 253.

The header supplying unit 255 is controlled by the control unit 254 to extract various types of information included in the payload header supplied from the packet acquisition unit 251, restores the precinct header 171 and picture header 172, and supplies to the decoding unit 133. The data supply unit 256 is controlled by the control unit 254 to supply the payload data supplied from the packet acquisition unit 251 to the decoding unit 133. The error notification unit 257 is controlled by the control unit 254 to notify errors such as occurrence of packet loss to the decoding unit 133. The control signal supplying unit 258 is controlled by the control unit 254 to supply various types of control information other than headers and data to the decoding unit 133.

Figure 22:
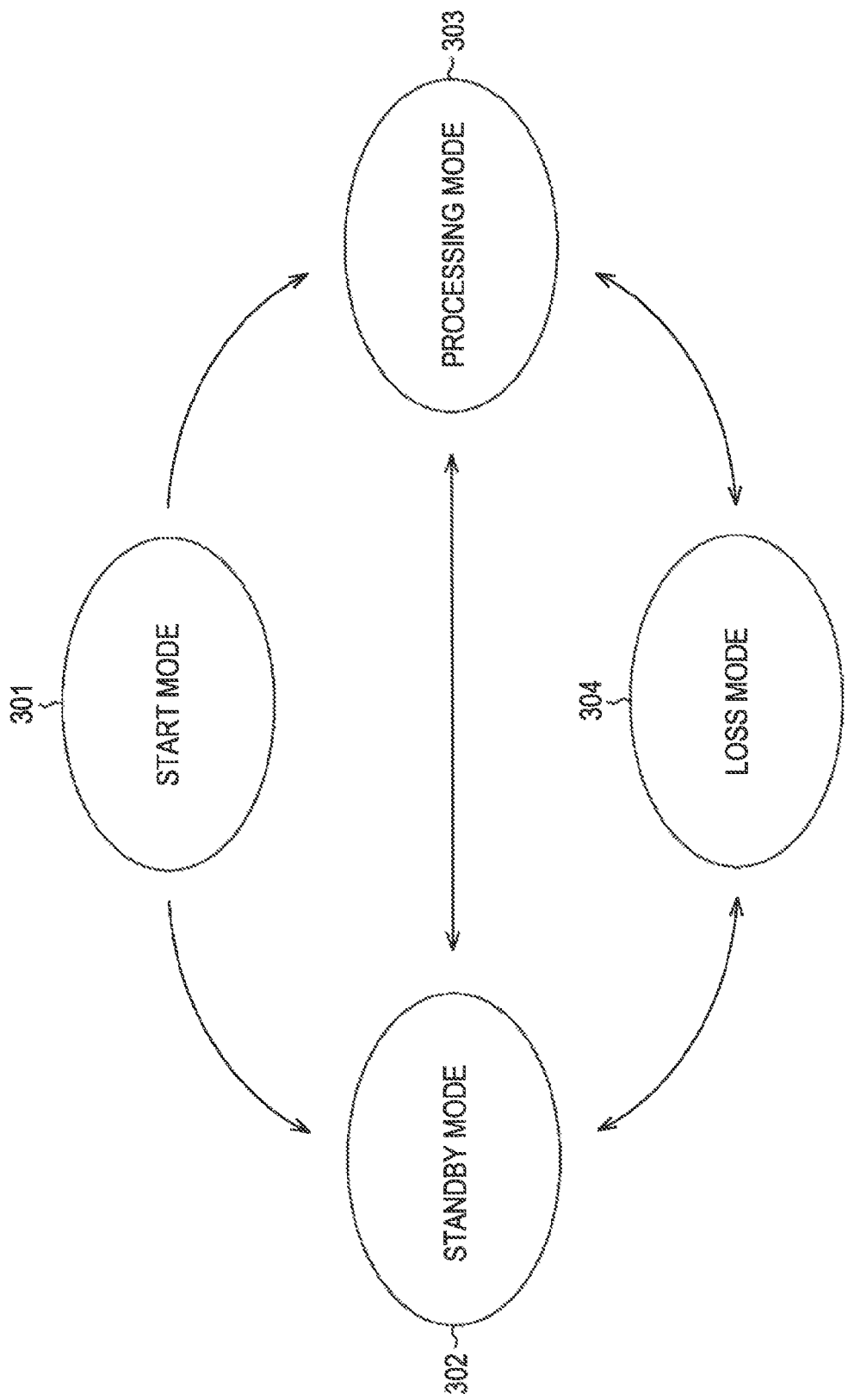
FIG. 22 is a diagram illustrating an example of the way in which control modes transition.

For the control modes of the control unit 254, there are the four modes of the start mode 301, standby mode 302, processing mode 303, and loss mode 304, as shown in FIG. 22. The control mode transition unit 253 comprehends the reception state of RTP packets based on the analysis results of header information by the header information analyzing unit 252, and in accordance with the state, causes the control mode of the control unit 254 to transition to the optimal mode.

The start mode 301 is a mode for processing the first packet of the entire encoded data. At the time of starting depacketizing processing, the control unit 254 is set to this start mode 301. The standby mode 302 is a mode for processing the head packet of a precinct. Following the last packet of a precinct having been processed, the control unit 254 is set to this standby mode 302. The processing mode 303 is a mode for processing each packet other than the head of the precinct in normal times where packet loss has not occurred. When packet loss is not occurring, the control unit 254 is set to this processing mode 303 for each packet other than the head of the precinct. The loss mode 304 is a mode for processing, in a case wherein an error such as a packet loss has occurred, the remaining packets of that precinct. In the event that packet loss has occurred, the control unit 254 is set to this loss mode 304.

Details of the operations of the depacketizing processing unit 132 in each mode will be described later.

Figure 23:
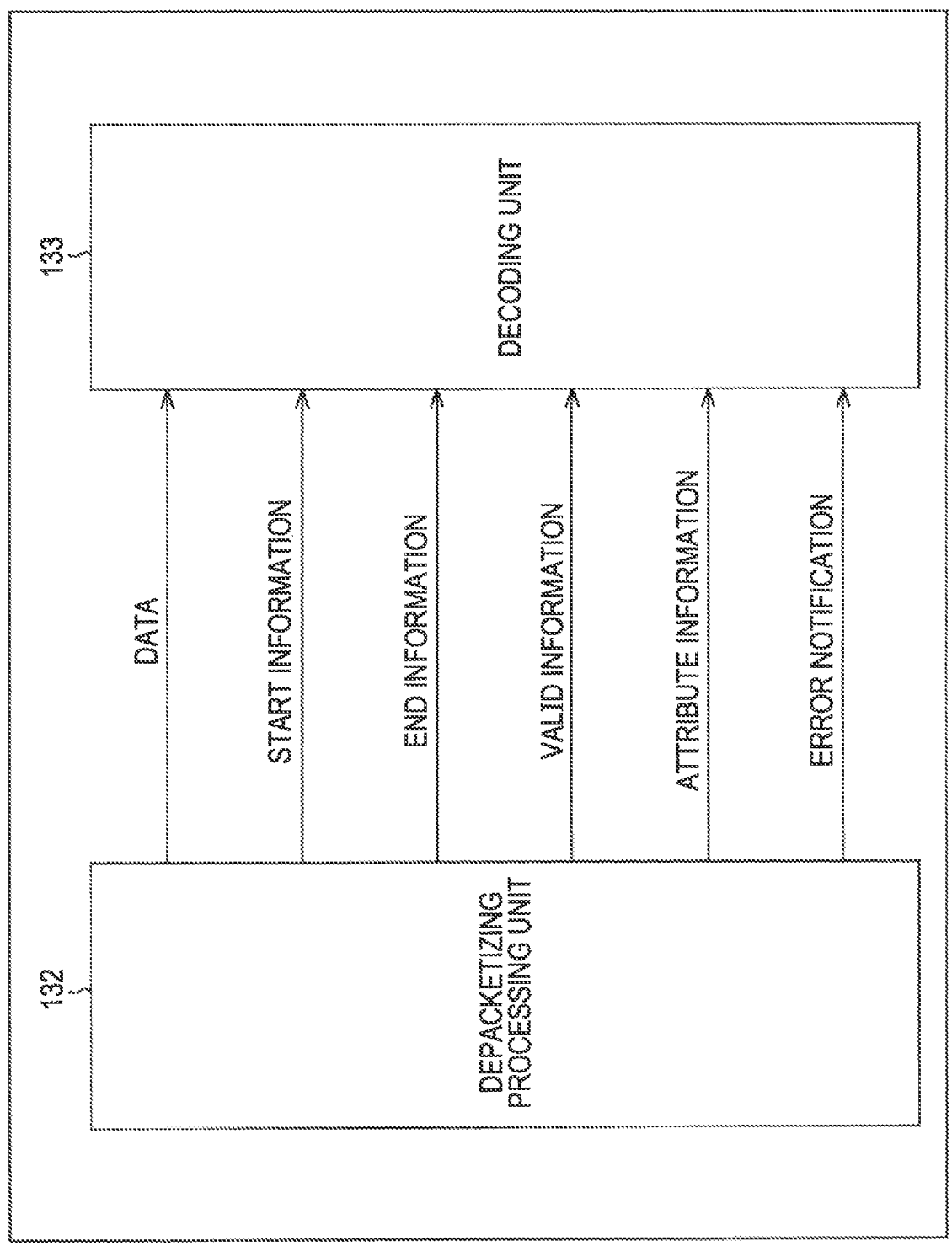
FIG. 23 is a diagram illustrating an example of information exchanged between the depacketizing processing unit and decoding unit.

Note that in reality, start information, end information, VALID information, attribute information, and error notification, and so forth, are also supplied from the depacketizing processing unit 132 to the decoding unit 133, besides data, as shown in FIG. 23.

Start information is information indicating the payload of the head packet of a precinct or align unit, and the value "1" is set to this start information at the time of the depacketizing processing unit 132 supplying the payload of the head packet of a precinct or align unit to the decoding unit 133. End information is information indicating the payload of the final packet of a precinct or align unit, and the value "1" is set to this end information at the time of the depacketizing processing unit 132 supplying the payload of the final packet of a precinct or align unit to the decoding unit 133.

Attribute information is information indicating whether the data to be supplied is header or image data, indicating whether luminance component data or color difference component data, and so forth. VALID information is information for notifying the read timing of data. Error notification is information for notifying occurrence of an error such as a packet loss to the decoding unit 133.

Figure 24:
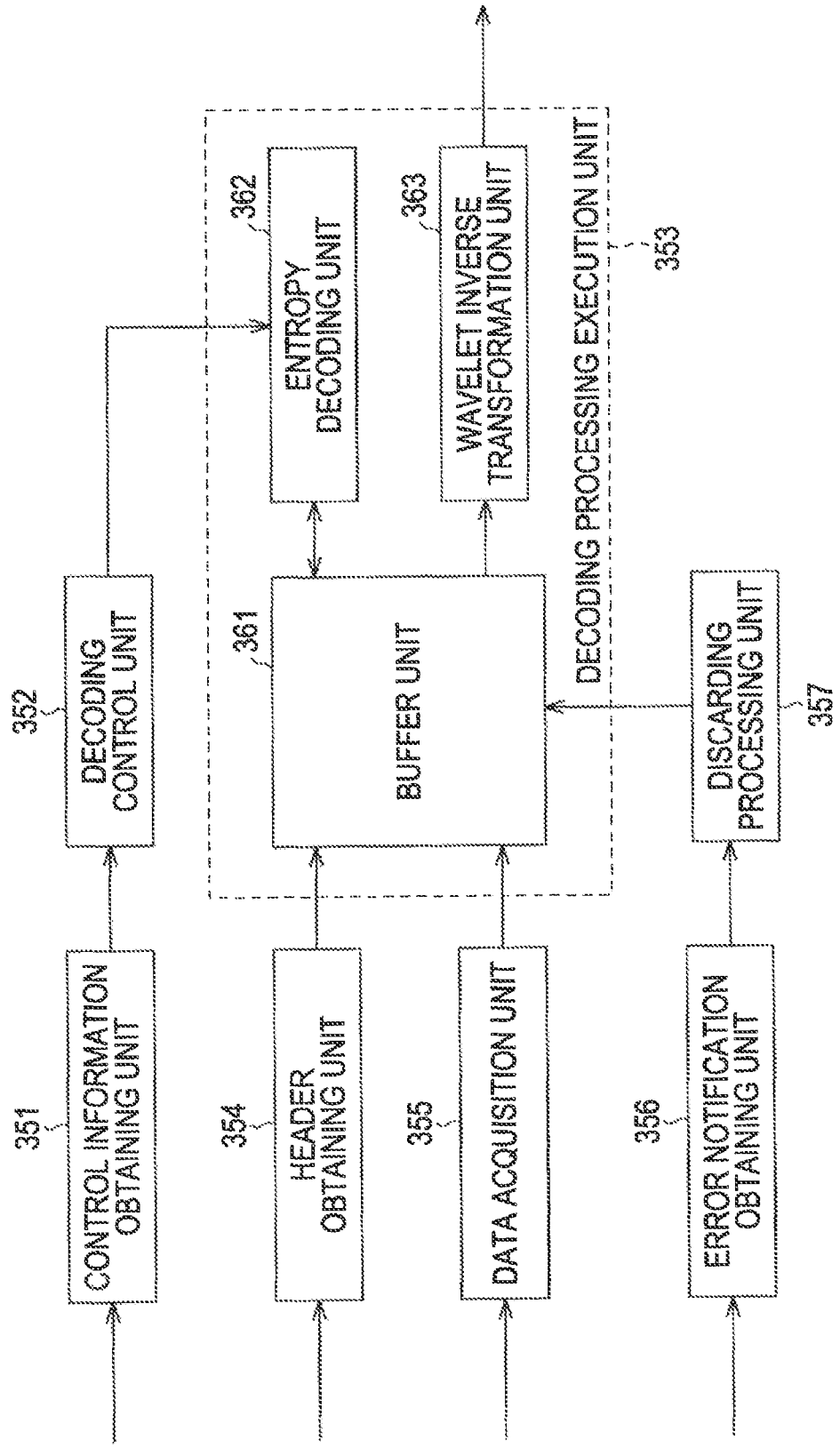
FIG. 24 is a block diagram illustrating a detailed configuration example of the decoding unit shown in FIG. 1.

FIG. 24 is a block diagram illustrating an internal configuration example of the decoding unit 133 in FIG. 1. As shown in FIG. 24, the decoding unit 133 has a control information obtaining unit 351, a decoding control unit 352, a decoding processing execution unit 353, a header obtaining unit 354, a data acquisition unit 355, an error notification obtaining unit 356, and a discarding processing unit 357.

The control information obtaining unit 351 obtains control information from the depacketizing processing unit 132 such as start information, end information, VALID information, and attribute information, and supplies the control information to the decoding control unit 352. The decoding control unit 352 causes the decoding processing execution unit 353 to start decoding processing at a predetermined timing, based on that control information.

The decoding processing execution unit 353 performs decoding processing of the encoded data acquired by the data acquisition unit 355, based on the header information supplied from the depacketizing processing unit 132 and obtained by the header obtaining unit 354. The decoding processing execution unit 353 has a buffer unit 361, an entropy decoding unit 362, and a wavelet inverse transformation unit 363, as shown in FIG. 24. The buffer unit 361 temporarily holds encoded data supplied from the data acquisition unit 355, and supplies the encoded data to the entropy decoding unit 362 as necessary. Also, the buffer unit 361 temporarily holds coefficient data, which is decoded results of the encoded data, supplied from the entropy decoding unit 362, and supplies the coefficient data to the wavelet inverse transformation unit 363 as necessary.

The entropy decoding unit 362 is controlled by the decoding control unit 352 so as to read out the encoded data held in the buffer unit 361, perform entropy decoding with a method corresponding to the entropy encoding unit 155 of the encoding unit 121, and generate coefficient data. Note that in the event of performing quantization at the entropy encoding unit 155, after performing the entropy decoding processing, the entropy decoding unit 362 also performs inverse quantization processing as to the obtained coefficient data. The entropy decoding unit 362 supplies the obtained coefficient data to the buffer unit 361 to be accumulated.

The wavelet inverse transformation unit 363 reads out the coefficient data accumulated at the buffer unit 361 at a predetermined timing, performs wavelet inverse transformation processing with a method corresponding to the wavelet transformation unit 150 of the encoding unit 121, and outputs the obtained baseband image data to the display device 104 as output image data.

The header obtaining unit 354 obtains header information such as precinct headers and picture headers supplied from the depacketizing processing unit 132, and supplies these to the buffer unit 361 to be held. The data acquisition unit 355 acquires the payload data supplied from the depacketizing processing unit 132, and supplies this to the buffer unit 361 to be held.

The error notification obtaining unit 356 obtains error notification notifying that a packet loss has occurred in the reception processing, or the like, which is supplied from the depacketizing processing unit 132, and supplies this to the discarding processing unit 357. Upon obtaining an error notification, the discarding processing unit 357 discards the encoded data accumulated in the buffer unit 361 of the decoding processing execution unit 353. That is to say, in the event that a packet loss has occurred in the reception processing of packets (in the event that occurrence of packet loss has been confirmed based on sequence Nos.), execution of proper entropy decoding processing as to the current precinct regarding which the packet loss has occurred is impossible, so the encoded data of the current precinct regarding which the packet loss has occurred, which is accumulated in the buffer unit 361, is all discarded.

Figure 25:
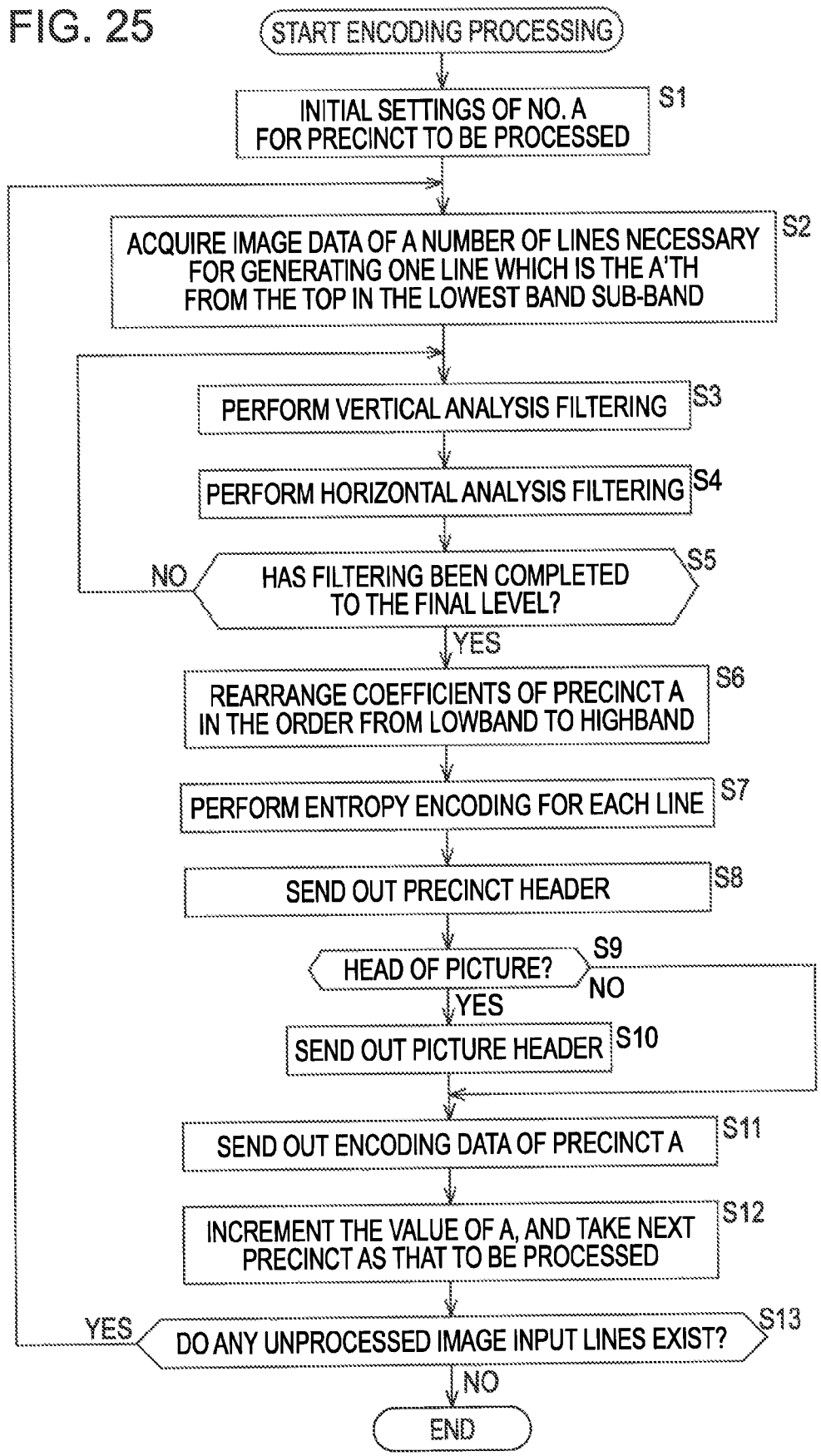
FIG. 25 is a flowchart for explaining an example of the flow of encoding processing.

Next, the flow of processing which each unit executes will be described. First, an example of the flow of encoding processing executed by the encoding unit 121 of the transmission device 102 will be described with reference to the flowchart in FIG. 25.

Upon the encoding processing starting, in step S1, the wavelet transformation unit 150 sets No. A of the precinct to be processed to initial settings. In normal cases, No. A is set to "1". Upon the setting ending, in step S2 the wavelet transformation unit 150 obtains image data for the line numbers necessary (i.e. one precinct) for generating the one line of the A'th line from the top of the lowest band sub-band, in step S3 performs vertical analysis filtering processing for performing analysis filtering as to the image data arrayed in the screen vertical direction as to the image data thereof, and in step S4 performs horizontal analysis filtering processing for performing analysis filtering processing as to the image data arrayed in the screen horizontal direction.

In Step S5 the wavelet transformation unit 150 determines whether or not the analysis filtering processing has been performed to the last level, and in the case of determining the division level has not reached the last level, the processing is returned to Step S3, wherein the analysis filtering processing in step S3 and Step S4 is repeated as to the current division level.

In the event that the analysis filtering processing is determined in step S5 to have been performed to the last level, the wavelet transformation unit 150 proceeds the processing to Step S6.

In Step S6, the coefficient rearranging unit 153 rearranges the coefficients of the precinct A (the A'th precinct from the top of the picture (frame or field)) in the order from lowband to highband. In Step S7, entropy encoding unit 155 subjects the coefficient to entropy encoding in line increments.

Upon the entropy encoding ending, in step S8 the entropy encoding unit 155 first sends out the precinct header 171 (FIG. 7), and in step S9 determines whether or not the precinct currently to be processed is the head precinct of the picture (i.e., A 1). In the event that determination is made that the head of the picture, the processing proceeds to step S10, and the entropy encoding unit 155 sends out the picture header 172 (FIG. 8). Upon the processing of step S10 ending, the processing proceeds to step S11. Also, in the event that determination is made in step S9 that the precinct currently to be processed is not the head precinct of the picture, the processing of step S10 is omitted, and the processing proceeds to step S11.

In step S11, the entropy encoding unit 155 sends the encoded data of the precinct A out externally, following the header information.

The wavelet transformation unit 150 increments the value in No. A by "1" in step S12, takes the next precinct as an object of processing, and in step S13 determines whether or not there are unprocessed image input lines in the picture to be processed. In the event it is determined there are, the processing is returned to Step S2, and the processing thereafter is repeated for the new precinct to be processed.

As described above, the processing in step S2 through Step S13 is repeatedly executed to encode each precinct. In the event determination is made in step S13 that there are no unprocessed image input lines, the wavelet transformation unit 150 ends the encoding processing for that picture. A new encoding processing is started for the next picture.

With a conventional wavelet transformation method, first, horizontal analysis filtering processing is performed as to the entire picture, and next vertical analysis filtering processing is performed as to that entire picture. The obtained entire lowband components are subjected to horizontal analysis filtering processing and vertical analysis filtering processing in the same way in order. As described above, analysis filtering processing is repeated recursively until the division level reaches the final level. Accordingly, there is the need to hold the results of each analysis filtering processing in a buffer. At this time, there is the need for the buffer to hold the filtering results of the entire picture or the entire lowband component of the division level at that point in time, meaning that great memory capacity is needed (the amount of data to be held is great).

Also, in this case, downstream coefficient rearrangement and entropy encoding cannot be performed until all wavelet transformation of the picture ends, thereby increasing delay time.

Conversely, with the wavelet transformation unit 150 of the encoding unit 121, vertical analysis filtering processing and horizontal analysis filtering processing are continuously performed in increments of precincts to the last level as described above, so compared to a conventional method, the amount of data needing to be held (buffered) at one time (during the same time period) is small, whereby the memory capacity of the buffer which needs to be prepared can be greatly reduced. Also, by performing the analysis filtering processing to the last level, the later steps for coefficient rearranging or entropy encoding processing can also be performed (i.e. coefficient rearranging or entropy encoding can be performed in increments of precincts). Accordingly, delay time can be greatly reduced as compared to the conventional method.

Also, the entropy encoding unit 155 supplies the precinct header 171 for each precinct and the picture header 172 for each picture to the packetizing processing unit 122 along with the encoded data, so the packetizing processing unit 122 can easily generate header information. Also, the format of this precinct header 171 and picture header 172 is the same as the format of the payload header which the packetizing processing unit 122 adds to the packets, so the packetizing processing unit 122 can generate header information even easier.

Further, in the event that encoding has failed for some reason, the entropy encoding unit 155 sets the IF of the precinct header 171, indicating that this precinct or align unit is a precinct or align unit regarding which encoding has failed. By referring to this IF, the packetizing processing unit 122 can easily suppress unnecessary data which cannot be decoded from being packetized and transmitted to the reception device 103.

Figure 26:
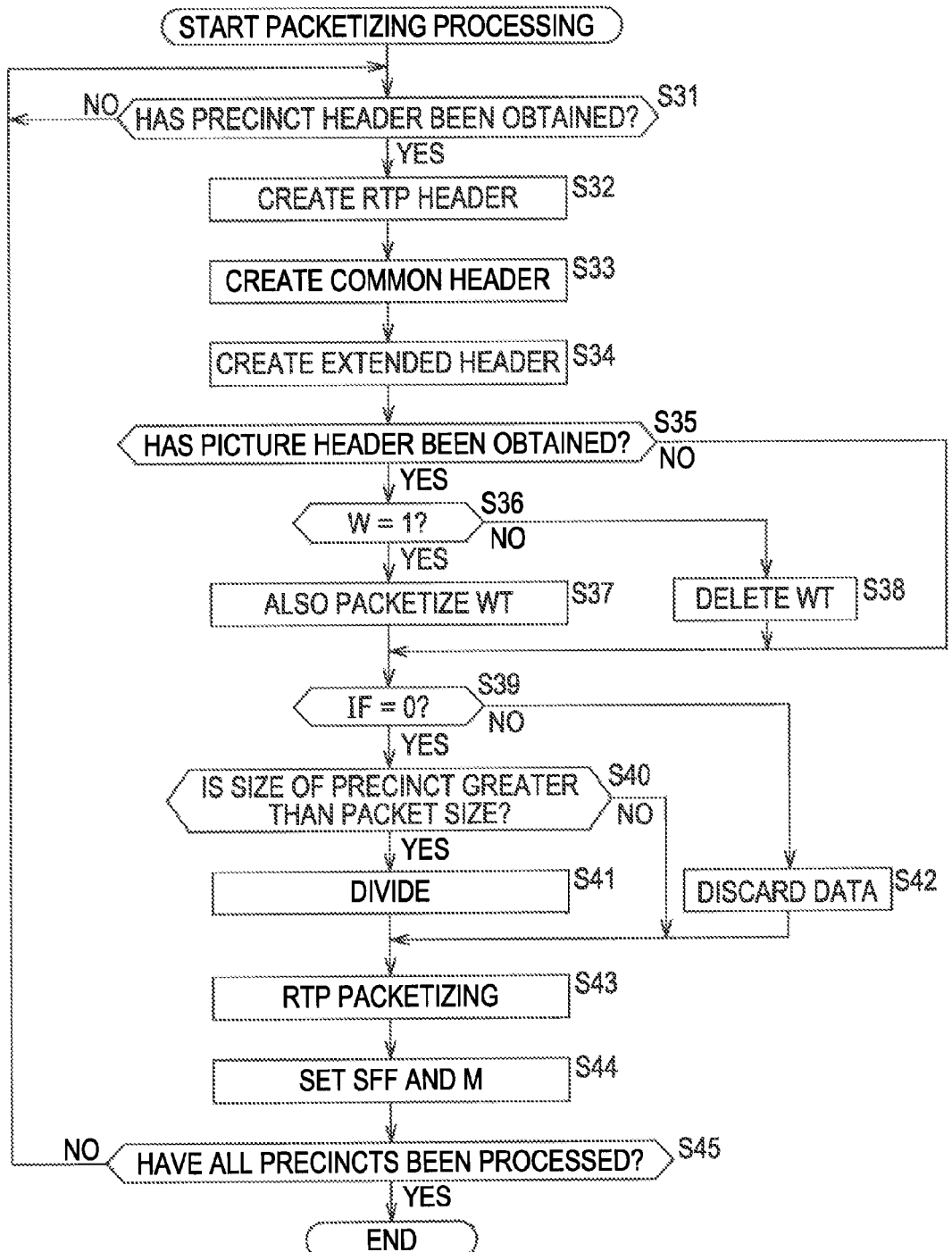
FIG. 26 is a flowchart for explaining an example of the flow of packetizing processing.

Next, an example of the flow of packetizing processing by the packetizing processing unit 122 will be described with reference to the flowchart in FIG. 26.

In step S31, the data acquisition unit 201 of the packetizing processing unit 122 determines whether or not the precinct header 171 has been obtained, and stands by until determination is made that obtained. In the event that determination is made that the precinct header 171 supplied from the encoding unit 121 has been obtained, the processing proceeds to step S32.

In step S32, the RTP header creating unit 202 creates an RTP header 221. In step S33, the common header creating unit 203 creates a common header 231 based on the precinct header 171. At this time, the common header creating unit 203 adds the fields of the SFF, M, TSF, and NF, to the first word (Word 0) of the precinct header 171.

In step S34, the extended header creating unit 204 creates the extended headers of the quantization parameter information 232, size information 233, format information 234, and color information 236, and so forth, based on the precinct header 171.

In step S35, the picture information creating unit 205 determines whether or not the picture header 172 has been obtained. In the event that determination is made that the picture header 172 has been obtained, the processing proceeds to step S36. In step S36, the picture information creating unit 205 refers to the picture header 172 and determines whether or not the value of w is "1", and in the event of determining that the value of w is "1", in step S37 includes the weighting table (WTm) in the picture information so as to be packetized. Upon processing of step S37 ending, the processing proceeds to step S39.

Also, in the event that determination is made in step S36 that the value of w is "0", the picture information creating unit 205 deletes the weighting table (WTm) from the picture information in step S38. Upon the processing of step S38 ending, the processing proceeds to step S39.

Further, in the event that determination is made in step S35 that a picture header has not been obtained, the processing proceeds to step S39.

In step S39, the flag confirmation unit 206 determines whether or not the value of the IF of the precinct header 171 is 0. In the event that determination is made that the value of the IF of the precinct header 171 is 0, the processing proceeds to step S40.

In step S40, the size confirmation unit 207 determines whether or not the data size of the precinct is larger than the maximum size of the payload of the packet (packet size).

In the event that determination is made that the size of the precinct is greater than the packet size, the processing proceeds to step S41. In step S41, the fragment processing unit 208 divides the encoded data of a single precinct into each packet size, so as to be mutually different payloads. Upon the processing of the step S41 ending, the processing proceeds to step S43.

Also, in step S40, in the event that determination is made that the data size of the precinct is not greater than the packet size, the fragment processing unit 208 does not perform division of encoded data. That is to say, in this case, the processing of step S41 is omitted, and the processing proceeds to step S43.

Further, in the event that determination is made that "IF=0" in step S39, the processing proceeds to step S42. In step S42, the data acquisition unit 201 is controlled by the flag confirmation unit 206 so as to discard the supplied encoded data. Upon the processing of step S42 ending, the processing proceeds to step S43.

In step S43, the packetizing unit 209 generates an RTP packet using each payload and header information, and in step S44 sets flag information such as SFF and M for each packet.

Upon each flag information having been set in this way, the output unit 210 outputs the RTP packet to the transmission unit 123.

In step S45, the data acquisition unit 201 determines whether or not all precincts have been processed. In the event that determination is made that an unprocessed precinct exists, the processing returns to step S31, and subsequent processing is repeated. Also, in the event that determination is made in step S45 that all precincts have been processed, the packetizing processing ends.

As described above, the packetizing processing unit 122 can easily generate common headers and extended headers based on the header information supplied from the encoding unit 121.

Also, as described above, in step S36 through step S38, the picture information creating unit 205 can control adding of weighting tables based on the value of w in the precinct header 171, easily and at high speed. That is to say, the picture information creating unit 205 can suitably add the weighting table only when necessary, just by confirming the value of w of the precinct header 171. Accordingly, unnecessary increase of data amount transferred to the reception device 103 by the transmission device 102, and increase in unnecessary load on each portion accordingly, can be suppressed.

Further, as described above, in the event that the value of IF of the precinct header 171 is "1" in step S39, the flag confirmation unit 206 controls the data acquisition unit 201 in step S42 so as to not acquire the encoded data, so as to not add a payload to the packet. That is to say, in this case, only header information is included in the RTP packet output from the packetizing processing unit 122, and no payload is included. Thus, the packetizing processing unit 122 can reduce transmission of unnecessary data which cannot be decoded, easily and at high speed, simply by referring to the precinct header 171 supplied from the encoding unit 121, and can suppress unnecessary increase of load on the transmission unit 123, line 110, and reception device 103 and so forth.

Also, as described above, in step S40 the size confirmation unit 207 can determine whether or not the size of the precinct is greater than the packet size based on the precinct header 171, so the packetizing processing unit 122 can determine whether or not to perform fragmenting of 1 precinct of encoded data, easily and at high speed, without accumulation.

Further, in step S44 the packetizing unit 209 sets the SFF flag of the common header 231 with regard to the head packet of the precinct, and sets the M flag of the common header 231 for the final packet of the precinct. By setting such flags, the depacketizing processing unit 132 of the reception device 103 can easily identify the head of the precinct and end of the precinct just by referring to the header information. Thus, the depacketizing processing unit 132 can perform depacketizing processing at high speed and easily, as described later.

Further, at this time, due to the IF flag of the common header 231 having been set, the depacketizing processing unit 132 of the reception device 103 can easily identify that no payload is included in the packet, just by referring to the header information. Thus, the depacketizing processing unit 132 can perform depacketizing processing at high speed and easily, as described later.

Next, the processing which the depacketizing processing unit 132 of the reception device 103 receiving packets performs will be described. AS described above, the depacketizing processing unit 132 performs depacketizing processing in four control modes. At the time of starting the depacketizing processing, the depacketizing processing unit 132 is set to the start mode 301.

Figure 27:
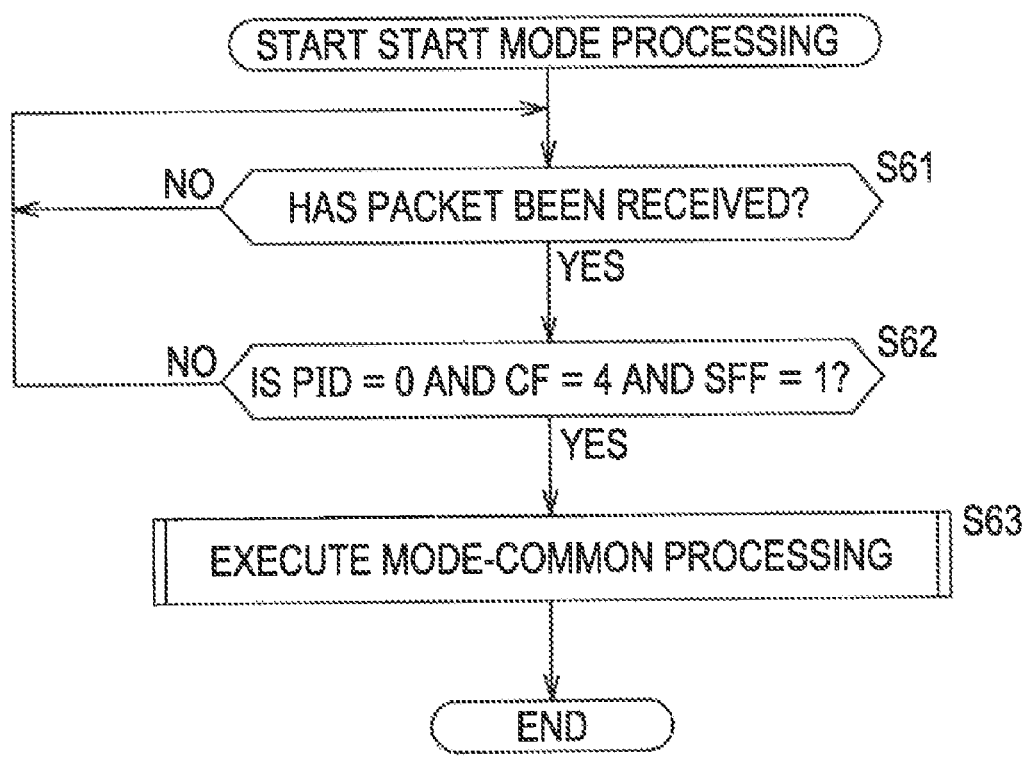
FIG. 27 is a flowchart for explaining an example of the flow of start mode processing.

First, an example of the flow of the start mode executed by the depacketizing processing unit 132 in the start mode 301 will be described with reference to the flowchart in FIG. 27.

In step S61, the packet acquisition unit 251 determines whether or not a packet has been acquired, and stands by until determining that a packet has been obtained via the reception unit 131. In the event that determination is made that a packet has been obtained, the processing proceeds to step S62. In step S62, the header information analyzing unit 252 obtains the header information of the packet, and determines whether or not "PID=0", "CF=4", and "SFF=1". That is to say, the header information analyzing unit 252 determines whether or not a first packet at the head precinct of a picture, wherein multiple components are put together into one. In the event that determination is made that "PID=0", "CF=4", and "SFF=1" does not hold, the processing returns to step S61 and subsequent processing is repeated. That is to say, the processing of step S61 and step S62 is repeated until determination is made that "PID=0", "CF=4", and "SFF=1", and upon determination being made that "PID=0", "CF=4", and "SFF=1", the processing proceeds to step S63.

In step S63, the control unit 254 executes mode-common processing which is depacketizing processing as to the head packet of a precinct executed in each mode as described later. Details of the mode-common processing will be described later. Upon the mode-common processing ending, the control mode transitions to another mode, so the start mode processing ends.

As described above, in the start mode, the control unit 254 can easily detect the head packet of the head precinct of a picture just by referring to the value of the SFF of the common header 231. Also, the control unit 254 can start the mode-common processing at the point in time by detecting the head packet of the head precinct of that picture, and can start extracting of the payload form that precinct. That is to say, the control unit 254 can comprehend a new precinct without confirming the last packet of the precinct, so the start timing of payload extraction can be made even earlier, and delay time can be reduced.

Next, an example of the flow of mode-common processing executed in step S63 in FIG. 27 will be described with reference to the flowchart in FIG. 28. This mode-common processing is processing executed in other modes as well, as will be described later, and is processing which the depacketizing processing unit 132 performs on precincts when the head packet of a new precinct has been confirmed though the final packet of the one-previous precinct has not been confirmed.

Accordingly, this mode-common processing is started in a state in which the packet acquisition unit 251 has already acquired a packet.

Upon the mode-common processing being started, in step S82, the header information analyzing unit 252 makes reference to the common header 231 and determines whether or not "IF=0". In the event that determination is made that "IF=1", the processing proceeds to step S83.

In the event that determination is made that "IF=1", in step S83 the control unit 254 controls the header supplying unit 255 and data supply unit 256 to transfer only the header portion of the packet to the decoding unit 133. In the event that IF=1, no payload is basically included in that packet. Even if included, this is un-decodable, so the control unit 254 controls the data supply unit 256 so as to forbid transfer of that payload.

Upon the processing in step S83 ending, the control mode transition unit 253 makes transition of the control mode to the standby mode in which the head packet of the next precinct is awaited in step S84. Processing of the standby mode will be described later. Upon transition to the control mode, the mode-common processing is ended.

In the event that determination is made in step S82 that "IF=0", the processing proceeds to step S85. In this case, the encoded data of the payload is properly encoded data. In step S85, the header supplying unit 255 is controlled by the control unit 254 so as to transfer 4 words worth of precinct header to the decoding unit 133.

In step S86, the header information analyzing unit 252 makes reference to the common header 231 and determines whether or not "PID=0" and "CF=4" hold. In the event that determination is made that "PID=0" and "CF=4" hold, the processing proceeds to step S87. In step S87, the header information analyzing unit 252 makes reference to the common header 231 and determines whether or not "w=1". In the event that determination is made that "w=1", the processing proceeds to step S88, where the header supplying unit 255 is controlled by the control unit 254 to transfer 26 words worth of the picture header 172 to the decoding unit 133 so as to include the weighting table as well. Upon the processing of step S88 ending, the processing proceeds to step S90.

Also, in the event that determination is made in step S87 that "w=1" does not hold, the processing proceeds to step S89, where the header supplying unit 255 is controlled by the control unit 254 to transfer 6 words worth of the picture header 172 to the decoding unit 133 so as to not include the weighting table as well. Upon the processing of step S89 ending, the processing proceeds to step S90.

Also, in the event that determination is made in step S86 that "PID=0" and "CF=4" hold, this is not the head precinct of a picture, so the header supplying unit 255 is controlled by the control unit 254 so as to not transfer the picture header 172 to the decoding unit 133. Accordingly, in this case, the processing proceeds to step S90.

In step S90, the data supply unit 256 is controlled by the control unit 254 so as to transfer the remaining payload of the packet, i.e., the encoded data, to the decoding unit 133. In step S91, the header information analyzing unit 252 refers to the common header 231, and determines whether or not "M=1". In the event that determination is made that "M=1", and that the packet to be processed is the last packet of the precinct, the processing proceeds to step S92, where the control unit 254 is controlled by the control mode transition unit 253 so as to transition the control mode to the standby mode. That is to say, the processing of the final packet has ended this time, so the control mode transitions to the standby mode where the head packet of the next precinct is awaited. Upon transitioning of the control mode, the mode-common processing ends.

Also, in the event that determination is made in step S91 that "M=1" does not hold, and that the packet to be processed is not the last packet of the precinct, the processing proceeds to step S93, where the control unit 254 is controlled by the control mode transition unit 253 so as to transition the control mode to the processing mode. That is to say, transfer processing of a packet which is not the final packet has successfully ended this time, so the control mode transitions to the processing mode where a subsequent packet of the same precinct is awaited. Upon transitioning of the control mode, the mode-common processing ends. In the event that this mode-common processing is executed in step S63 in FIG. 27, the processing returns to step S63 in FIG. 27 upon ending of the mode-common processing, and the start mode processing ends.

As described above, the depacketizing processing unit 132 can easily identify the head packet and final packet of a precinct, based on the values of SFF and M. Also, the final packet can be identified by M, so the depacketizing processing unit 132 can readily cause mode transition as suitable for each precinct. Accordingly, the depacketizing processing unit 132 can perform suitable depacketizing processing for each precinct. Further, the head packet can be identified by the SFF, so the depacketizing processing unit 132 can comprehend updating of the precinct even without confirming the final packet. That is to say, in the event that a packet loss has occurred for example, i.e., even in the event that sequence No. of the acquired packet is not continuous with the sequence No. of the packet acquired the previous time, if the packet is a head packet of a new precinct, the depacketizing processing unit 132 can start extraction of the payload from the packet of the new precinct without awaiting the next precinct. That is to say, the depacketizing processing unit 132 can reduce unnecessary standby time. Of course, the depacketizing processing unit 132 can shorten standby time in the case of executing the mode-common processing in the processing mode and loss mode as well, not just in the start mode, so shortening of delay time can be realized.

Also, as shown in step S83, the depacketizing processing unit 132 can easily suppress supply of unnecessary un-decodable payload to the decoding unit 133 just by referencing the common header 231. Thus, the load of decoding processing on the decoding unit 133 can be alleviated. Note that header information can be used for decoding processing, so the control unit 254 transfers only the header information.

Figure 29:
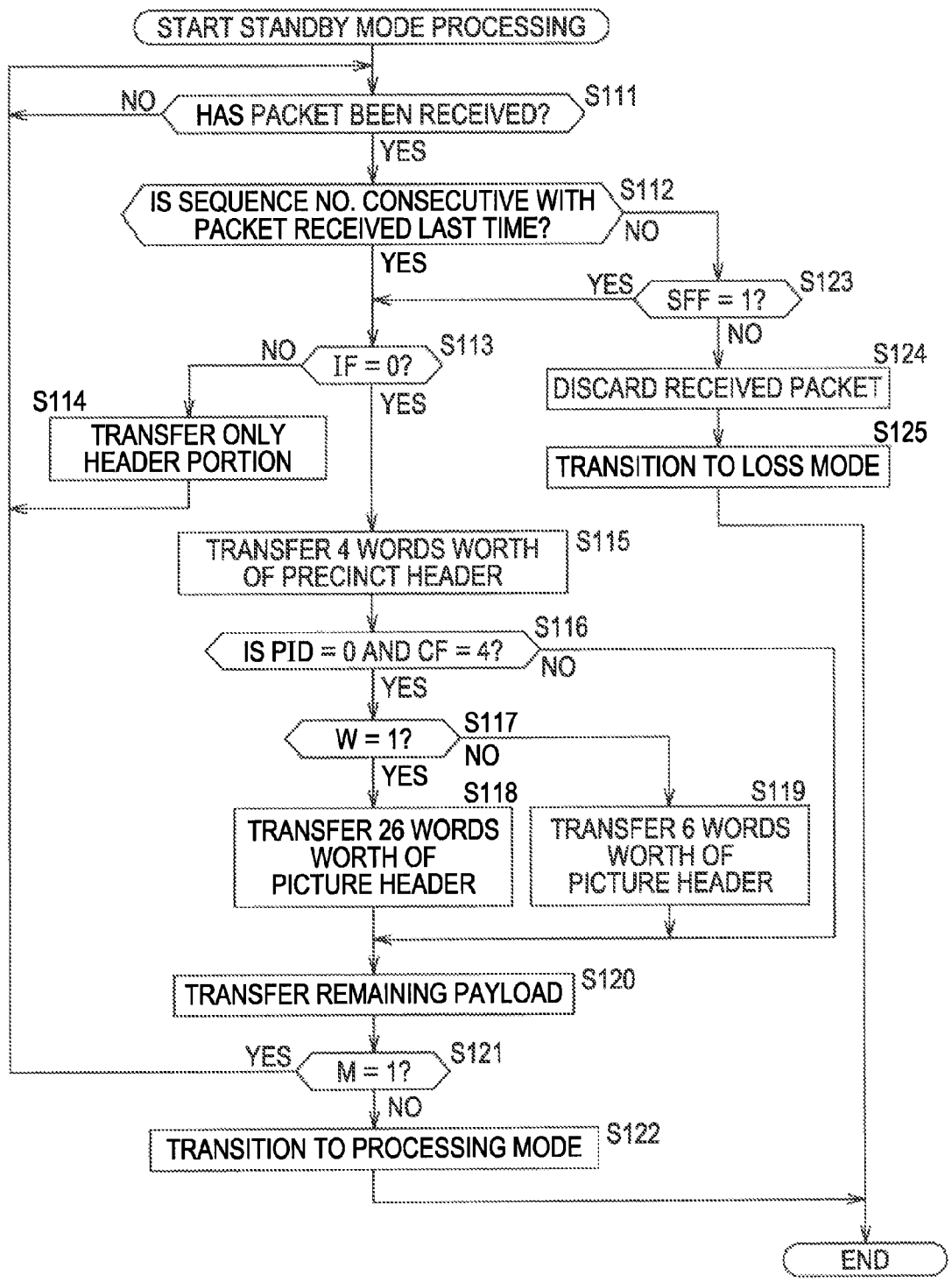
FIG. 29 is a flowchart for explaining an example of the flow of standby mode processing.

Next, an example of the flow of standby mode processing will be described with reference to the flowchart in FIG. 29. This standby mode processing is processing of a mode in which the head packet of the next precinct is awaited, and is started upon the control mode being transitioned to the standby mode by the control mode transition unit 253.

Upon the standby mode processing being started, the packet acquisition unit 251 determines whether or not a packet has been received, and stands by until reception is determined in step S111. In the event that a packet is supplied from the reception unit 131 and determination is made that a packet has been received, the processing proceeds to step S112.

In step S112, the header information analyzing unit 252 makes reference to the RTP header 221, and determines whether or not the sequence No. is continuous with the packet received the previous time. In the event that the sequence No. is not continuous with the packet received the previous time, this indicates that packet reception has failed (packet loss has occurred). In the event that the sequence No. is continuous with the packet received the previous time, and determination is made that packet loss has not occurred, the processing proceeds to step S113.

Each processing of step S113 through S122 is executed in the same way as each processing of step S82 and step S83, step S85 through step S91, and step S93, in the mode-common processing described with reference to FIG. 28.

That is to say, the processing in step S113 corresponds to step S82, and the processing in step S114 corresponds to step S83. Note however, that in the case of the standby mode processing, this is already in the standby mode, so processing corresponding to step S84 in FIG. 28 is omitted, and the processing proceeds to step S111 (equivalent to transitioning to the standby mode in FIG. 28, and standby mode processing being started).

Figure 28:
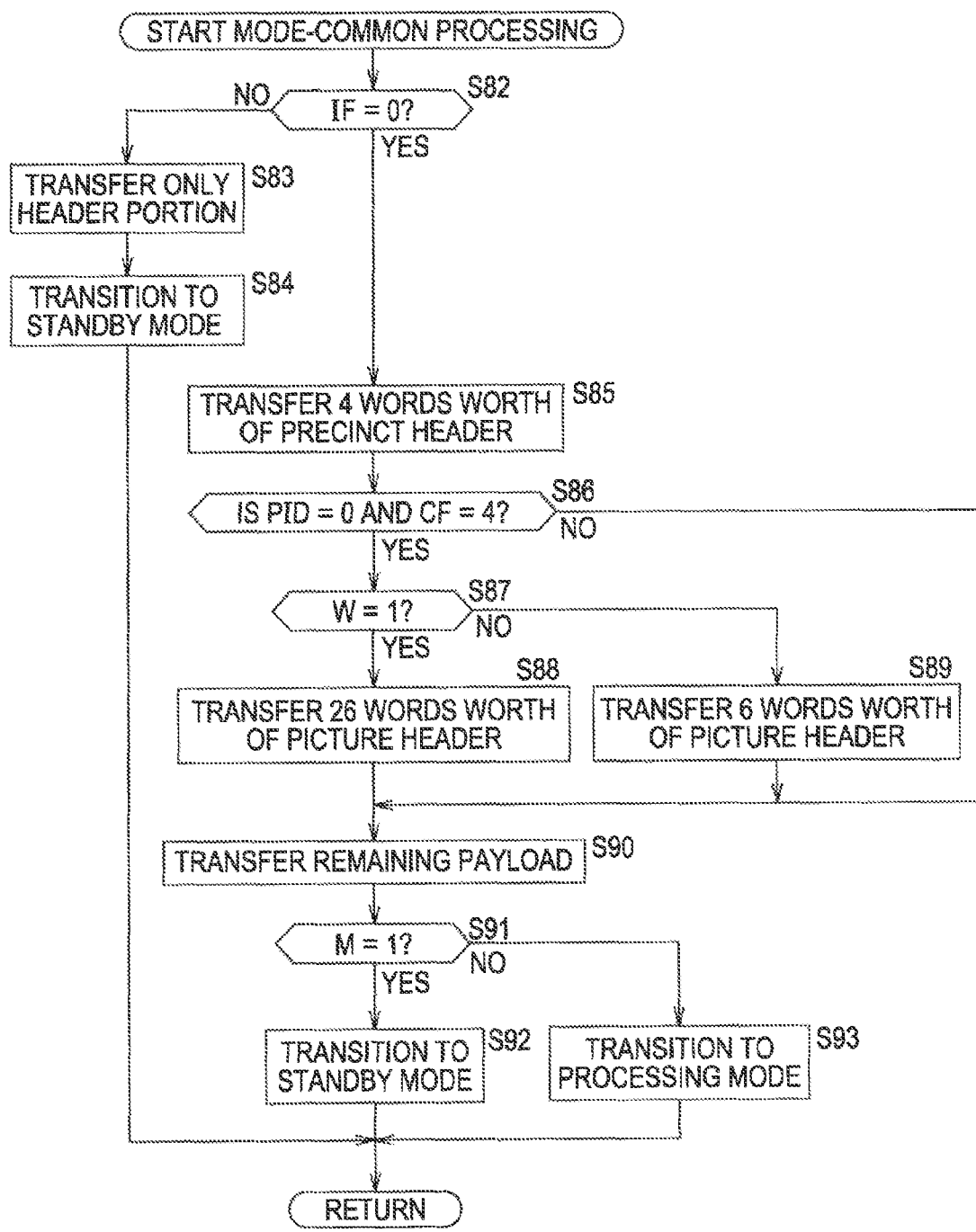
FIG. 28 is a flowchart for explaining an example of the flow of mode-common processing.

Also, the processing in step S115 through step S121 correspond to step S85 through step S91 in FIG. 28, respectively. Note however, that in the case of the standby mode processing, this is already in the standby mode, so processing corresponding to step S92 in FIG. 28 is omitted in the event that determination of "M=1" is made in step S121, and the processing proceeds to step S111 (equivalent to transitioning to the standby mode in FIG. 28, and standby mode processing being started).

Note that in the event that determination is made in step S121 that "M=1" does not hold, the processing proceeds to step S122. The processing in step S122 corresponds to the processing in step S93 in FIG. 28, and upon the control mode transition unit 253 causing transition of the control mode to the processing mode, the standby mode processing ends.

Also, in step S112, in the event that the sequence No. is not continuous with the packet received the previous time, and determination is made that packet loss has occurred, the processing proceeds to step S123.

In step S123, the header information analyzing unit 252 refers to the common header 231, and determines whether or not "SFF=1". In the event that determination is made that "SFF=1", the processing returns to step S113, and subsequent processing is repeated. Decoding processing is performed in increments of precincts, so if there is no occurrence of packet loss within the precinct, that precinct can be decoded. That is to say, in the event of "SFF=1", this indicates that a packet loss has occurred not in the precinct to which the packet currently to be processed belongs to, but in a past precinct. Moreover, in the event of the standby mode, accumulation of encoded data of that past precinct by the decoding unit 133 has ended. Accordingly, even if there is occurrence of packet loss, of the newly-obtained packet is the head packet of a new precinct, that packet loss is ignored, and the processing returns to step S113.

In the event that determination is made in step S123 that "SFF=1" does not hold, the processing proceeds to step S124. In this case, the packet loss has occurred within the same precinct as the packet to be processed. Accordingly, that precinct cannot be decoded, so transfer of the payload is cancelled. That is to say, in step S124, the data supply unit 256 is controlled by the control unit 254 so as to not transfer the received packet to the decoding unit 133 but to discard.

As described above, this is standby mode, so accumulation of encoded data of past precincts by the decoding unit 133 has ended, and encoded data of a new precinct has not yet been accumulated. Accordingly, in this case, the decoding unit 133 does not need to discard data, so the depacketizing processing unit 132 has no need to notify the decoding unit 133 of the error.

In step S125, the control unit 254 is controlled by the control mode transition unit 253 so as to transition the control mode to the loss mode, which is a mode to stand by in the precinct where an error has occurred, until a packet of the next precinct is acquired. Upon the control mode being transitioned to the loss mode, the standby mode processing ends.

As described above, in the standby mode the depacketizing processing unit 132 can easily identify the head packet and final packet of a precinct, based on the values of SFF and M. Also, the final packet can be identified by M, so the depacketizing processing unit 132 can readily cause mode transition as suitable for each precinct. Accordingly, the depacketizing processing unit can perform suitable depacketizing processing for each precinct. Further, the head packet can be identified by the SFF, so the depacketizing processing unit 132 can comprehend updating of the precinct even without confirming the final packet. That is to say, in the event that a packet loss has occurred for example, i.e., even in the event that sequence No. of the acquired packet is not continuous with the sequence No. of the packet acquired the previous time, if the packet is a head packet of a new precinct, the depacketizing processing unit 132 can start extraction of the payload from the packet of the new precinct without awaiting the next precinct. That is to say, the depacketizing processing unit 132 can reduce unnecessary standby time.

Figure 30:
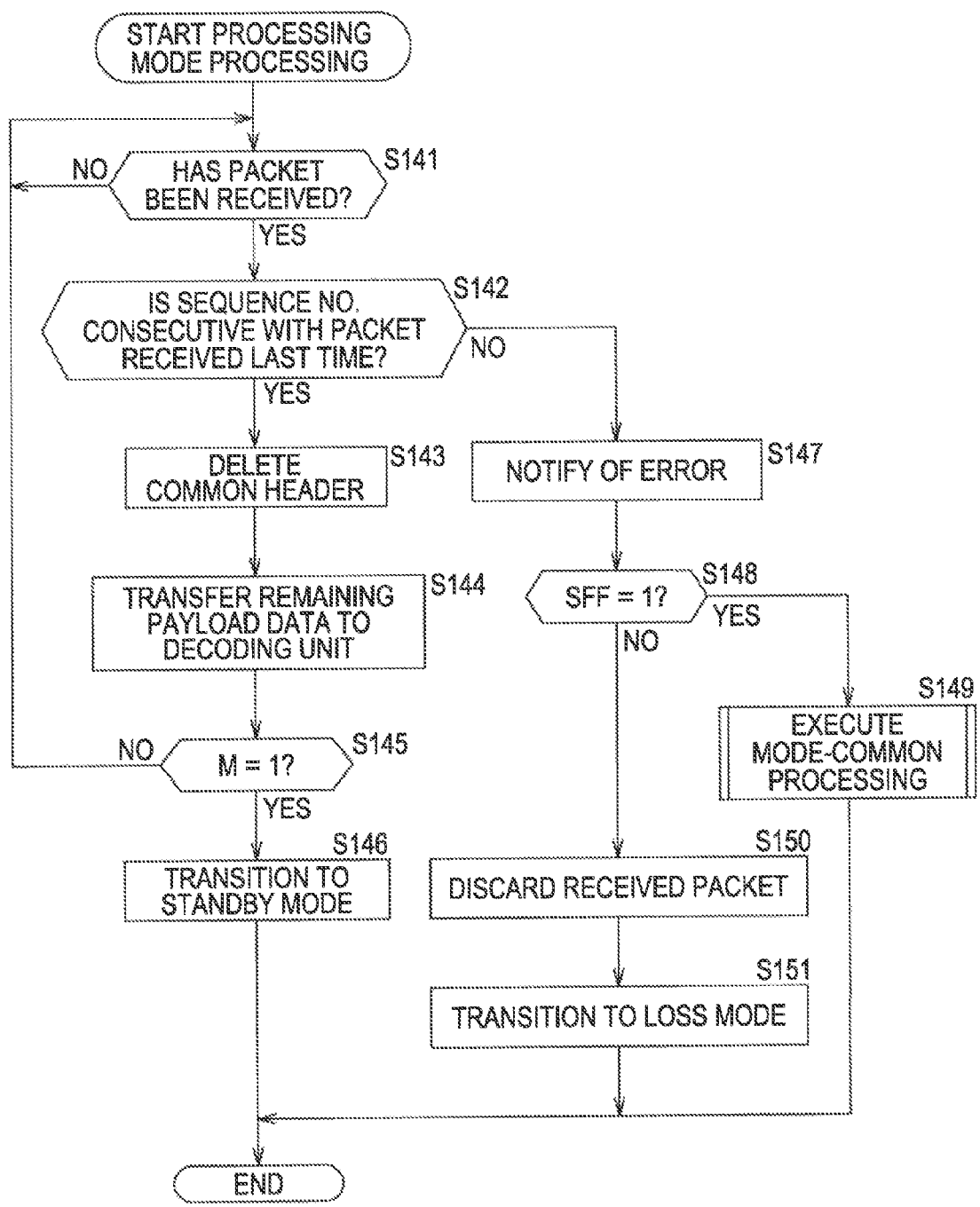
FIG. 30 is a flowchart for explaining an example of the flow of processing mode processing.

Next, an example of the flow of processing mode processing will be described with reference to the flowchart in FIG. 30. This processing mode processing is processing of a mode for awaiting for subsequent packets in the same precinct, and is started upon the control mode being transitioned to the processing mode by the control mode transition unit 253.

Upon the processing mode processing being started, the packet acquisition unit 251 determines whether or not a packet has been received in step S141, and stands by until reception is determined. In the event that a packet is supplied from the reception unit 131 and determination is made that a packet has been received, the processing proceeds to step S142.

In step S142, the header information analyzing unit 252 makes reference to the RTP header 221, and determines whether or not the sequence No. is continuous with the packet received the previous time. In the event that the sequence No. is continuous with the packet received the previous time, and determination is made that packet loss has not occurred, the processing proceeds to step S143.

In step S143, the header supplying unit 255 is controlled by the control unit 254 to delete the common header 231 from the packet. In step S144, the data supply unit 256 is controlled by the control unit 254 so as to transfer the remaining payload data to the decoding unit 133. In step S145, the header information analyzing unit 252 makes reference to the common header 231 and determines whether or not "M=1", and in the event determination is made that "M=1" does not hold and is not the final packet of the precinct, a subsequent packet exists in the same precinct, so the processing returns to step S141, and the subsequent processing is repeated.

That is to say, the processing of step S141 through step S145 is repeated, with the payload being extracted from each packet in the precinct, and transferred to the decoding unit 133.

In the event that determination is made in step S145 that "M=1" and the packet to be processed is the final packet of the precinct, the processing proceeds to step S146, where the control unit 254 is controlled by the control mode transition unit 253 so as to transition the control mode to the standby mode. Upon the control mode being transitioned to the standby mode, the processing mode processing ends.

Also, in the event that determination is made in step S142 that the sequence No. is not continuous with the packet received the previous time, and that a packet loss has occurred, the processing proceeds to step S147.

In this case, the data of the precinct is being accumulated in the decoding unit 133, so in step S147, the error notification unit 257 is controlled by the control unit 254 so as to notify a transfer error to the decoding unit 133.

Upon the error notification ending the header information analyzing unit 252 makes reference to the common header 231 in step S148, and determines whether or not "SFF=1". In the event that determination is made that "SFF=1", the processing proceeds to step S149. In step S149, the control unit 254 executes the mode-common processing described with reference to the flowchart in FIG. 28. In this case, upon the mode-common processing ending, the processing returns to step S149 in FIG. 30, and the processing mode processing ends.

Also, in the event that determination is made in step S148 that "SFF=1" does not hold, the processing proceeds to step S150, where the data supply unit 256 is controlled by the control unit 254 so as to discard the received packet. In step S151, the control unit 254 is controlled by the control mode transition unit 253 so as to transition the control mode to the loss mode. Upon the control mode being transitioned to the loss mode, the processing mode processing ends.

As described above, in the processing mode the depacketizing processing unit 132 can easily identify the head packet and final packet of a precinct, based on the values of SFF and M. Also, the final packet can be identified by M, so the depacketizing processing unit 132 can readily cause mode transition as suitable for each precinct. Accordingly, the depacketizing processing unit 132 can perform suitable depacketizing processing for each precinct. Further, the head packet can be identified by the SFF, so the depacketizing processing unit 132 can comprehend updating of the precinct even without confirming the final packet.

For example, in the event that a packet loss has not occurred, the depacketizing processing unit 132 extracts the payloads from each of the sequentially supplied packets, confirms the final packet based on the value of M, and in the event that determination is made that processing for that precinct has ended, transitions to the standby mode. In the event that a packet loss occurs, the depacketizing processing unit 132 notifies the decoding unit 133 of an error, discards that packet if not a head packet, and transitions to the loss mode to standby until a packet of the next precinct is confirmed. Note however, that in the event that "SFF=1", i.e., in the event that the packet obtained at the time of confirming a packet loss is the head packet of a new precinct, the depacketizing processing unit 132 executes mode-common processing, whereby, extracting the payload from that precinct can be started without transitioning to the standby mode or loss mode, i.e., without awaiting a packet of a new precinct, so the starting time of payload extraction can be made earlier, and delay time can be reduced.

Figure 31:
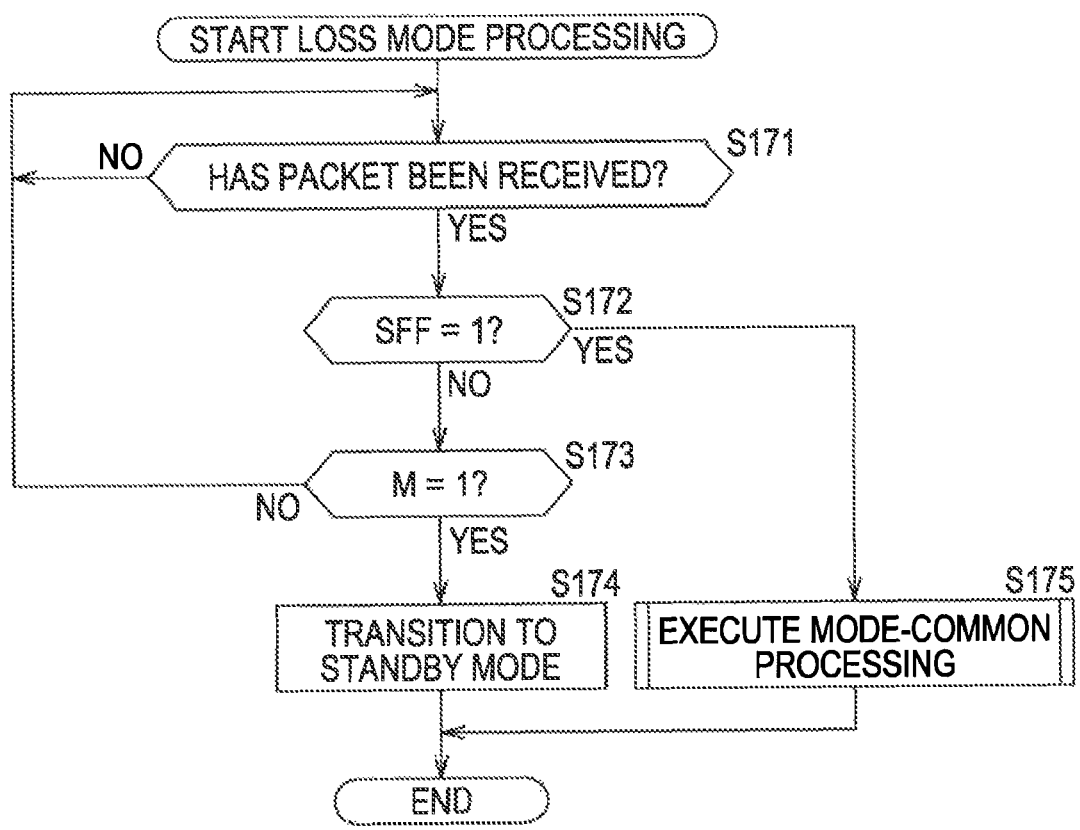
FIG. 31 is a flowchart for explaining an example of the flow of loss mode processing.

Next, an example of the flow of loss mode processing will be described with reference to the flowchart in FIG. 31. This loss mode processing is processing of a mode for awaiting until a packet of the next precinct is received in the event that a packet loss has occurred in the same precinct, and is started upon the control mode being transitioned to the loss mode by the control mode transition unit 253.

Upon the loss mode processing being started, in step S171 the packet acquisition unit 251 determines whether or not a packet has been received, and stands by until reception is determined. In the event that a packet is supplied from the reception unit 131 and determination is made that a packet has been received, the processing proceeds to step S172.

In step S172, the header information analyzing unit 252 makes reference to the common header 231 and determines whether or not "SFF=1". In the event that determination is made that "SFF=1" does not hold and not the head packet of the precinct, the processing proceeds to step S173, where the header information analyzing unit 252 determines whether or not "M=1" this time. In the event that determination is made that "M=1" does not hold, i.e., not the final packet of the precinct, the processing returns to step S171, and subsequent processing is repeated.

In the event that determination is made that "M=1" in step S173, the processing proceeds to step S174, where the control unit 254 is controlled by the control mode transition unit 253 so as to transition the control mode to the standby mode. Upon the control mode being transitioned to the standby mode, the loss mode processing ends.

Also, in the event that determination is made in step S172 that "SFF=1", the control unit 254 executes the mode-common processing described with reference to the flowchart in FIG. 28. In this case, upon the mode-common processing ending, the processing returns to step S175 in FIG. 31, and the loss mode processing ends.

As described above, in the loss mode as well, the depacketizing processing unit 132 can easily identify the head packet and final packet of a precinct, based on the values of SFF and M. Also, the final packet can be identified by M, so the depacketizing processing unit 132 can readily cause mode transition as suitable for each precinct. Accordingly, the depacketizing processing unit 132 can perform suitable depacketizing processing for each precinct. Further, the head packet can be identified by the SFF, so the depacketizing processing unit 132 can comprehend updating of the precinct even without confirming the final packet.

In the case of the loss mode, the depacketizing processing unit 132 basically stands by while acquiring packets, and in the event of detecting a final packet based on the value of M, transitions to the standby mode, and prepares for acquisition of the head packet of the next precinct. Also, in the case of detecting the head packet based on the value of the SFF, the depacketizing processing unit 132 executes the mode-common processing, thereby starting extracting of the payload from that precinct.

Thus, the depacketizing processing unit 132 can make the start timing of payload extraction even earlier, and delay time can be reduced.

As described above, by performing depacketizing processing while switching the control mode according to the situation, the depacketizing processing unit 132 can perform suitable performing processing in sequence based on header information of supplied packets, even without providing a depacketizing buffer and accumulating packets for each precinct, and can perform depacketizing processing easily and at high speed. Also, in the event of a packet loss occurrence, the depacketizing processing unit 132 performs error notification as necessary, so the decoding unit 133 can suppress execution of unnecessary decoding processing, and alleviate the load of decoding processing.

Further, with the value of the IF, the depacketizing processing unit 132 can easily suppress unnecessary un-decodable payloads from being supplied to the decoding unit 133. This allows the load of decoding processing of the decoding unit 133 to be alleviated.

The decoding unit 133 performs decoding processing of encoded data supplied from the depacketizing processing unit 132, in accordance with processing of the depacketizing processing unit 132 such as described above. To this end, the decoding unit 133 performs decoding control processing where execution of decoding processing is controlled. An example of the flow of decoding control processing will be described with reference to the flowchart in FIG. 32. This encoding control processing is executed from the time of supply of encoded data being started to ending.

In step S191, the data acquisition unit 355 acquires the encoded data supplied from the depacketizing processing unit 132. In step S192, the buffer unit 361 accumulates the encoded data. In step S193, the control information obtaining unit 351 obtains control information. In step S194, the decoding control unit 352 determines whether or not the data which the data acquisition unit 355 has acquired is the payload of the head packet of the precinct, based on the control information which the control information obtaining unit 351 has obtained. In the event that determination is made that this is the payload of the head packet of the precinct, the processing proceeds to step S195. In step S195, the decoding control unit 352 determines whether or not the data obtained by the data acquisition unit 355 and accumulated in the buffer unit 361 is continuous, based on the control information obtained by the control information obtaining unit 351. In the event that determination is made that there is no occurrence of packet loss and that the data obtained by the data acquisition unit 355 and accumulated in the buffer unit 361 is continuous, the processing returns to step S191, and the processing of step S191 and on is repeated as to the next encoded data.

Also, in step S195, in the event that determination is made that there is occurrence of packet loss and that the data is not continuous, the processing proceeds to step S196. In step S196, the decoding control unit 352 controls the entropy decoding unit 362 to start supplementation processing. The entropy decoding unit 362 performs decoding processing in increments of precincts, but in the event that data of a precinct has dropped out, performs supplementation processing using data of another precinct, or the like.

Accordingly, in the event of acquiring a head packet which is not continuous with a packet acquired the previous time, the decoding control unit 352 controls the entropy decoding unit 362 to execute supplementation processing as to the precinct one before. Upon the supplementation processing ending, the processing proceeds to step S197.

In step S197, the decoding control unit 352 determines whether or not to end the decoding control processing, and in the event of determining to not end, the processing returns to step S191, and subsequent processing thereof is repeated. Also, in the event that determination is made that the decoding control processing is to end in step S197, the decoding control processing is ended.

Also, in the event that determination is made in step S194 that the data which the data acquisition unit 355 has acquired is not the payload of the head packet of the precinct, the processing proceeds to step S198, and the decoding control unit 352 determines whether or not the data which the data acquisition unit 355 has acquired is the payload of the final packet of the precinct. In the event that determination is made that the data is the payload of the final packet of the precinct, the processing proceeds to step S199, where the decoding control unit 352 controls the entropy decoding unit 362 to start decoding processing of the encoded data accumulated in the buffer unit 361. Upon the processing of step S199 ending, the processing returns to step S197.

Also, in the event that determination is made in step S198 that the data which the data acquisition unit 355 has acquired is not the payload of the final packet of the precinct, the processing returns to step S197.

Figure 33:
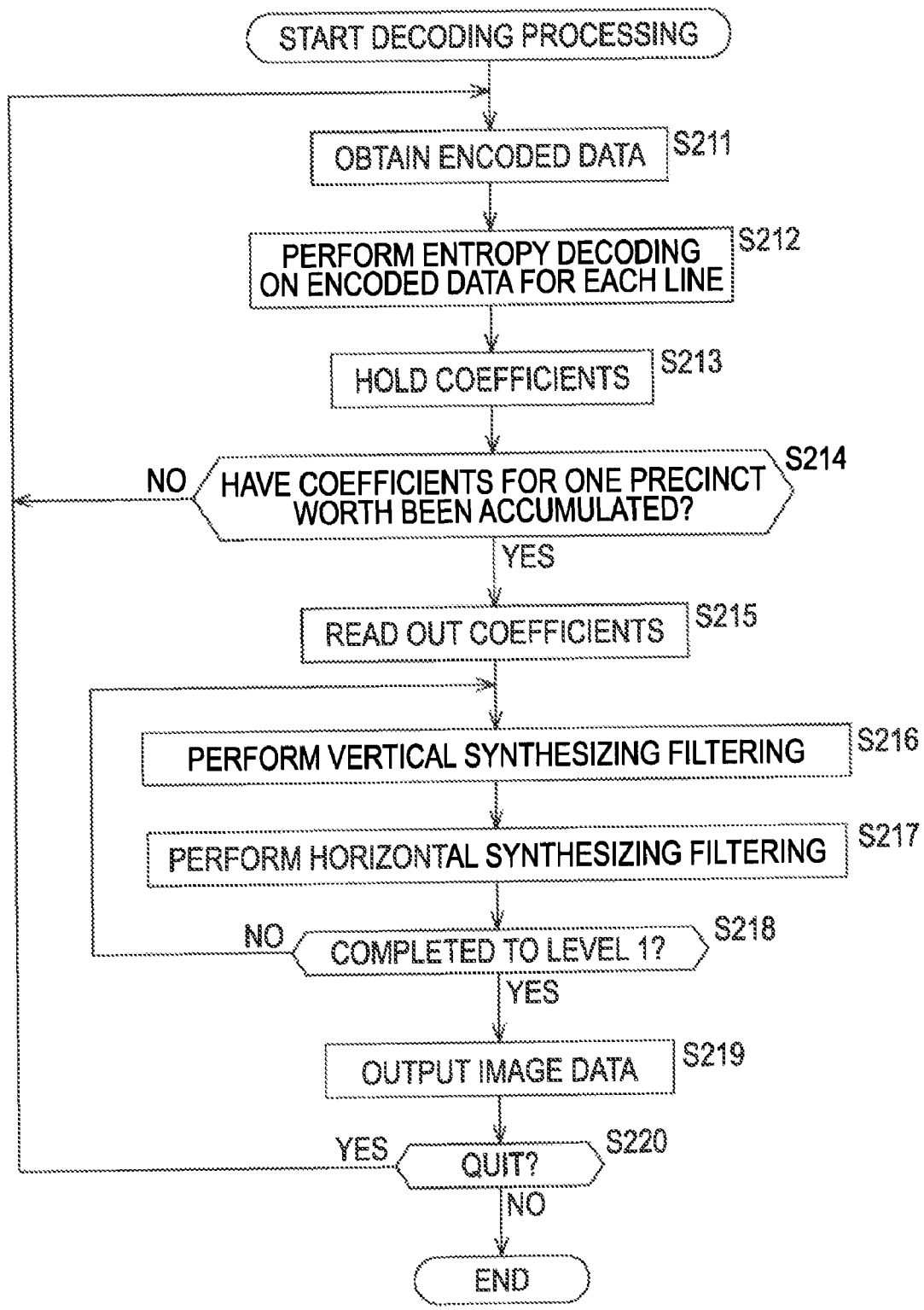
FIG. 33 is a flowchart for explaining an example of the flow of decoding processing.

Next, an example of the flow of the decoding processing started in step S199 in FIG. 33 will be described with reference to the flowchart in FIG. 35. This decoding processing is controlled by the decoding control processing in FIG. 34, and is executed in increments of precincts.

Upon the decoding processing starting, in step S211 the entropy decoding unit 362 acquires the encoded data accumulated in the buffer unit 361, and in Step S212, subjects the encoded data to entropy decoding for each line. In Step S213, the buffer unit 361 holds the coefficient data obtained by the decoding. In Step S214, the wavelet inverse transformation unit 363 determines whether or not coefficient data worth one precinct have accumulated in the buffer unit 361, and if it is determined not to be accumulated, the processing is returned to Step S211, the processing thereafter is executed, and stands by until coefficient data worth one precinct have accumulated in the buffer unit 361.

In the event it is determined in step S214 that coefficient data worth one precinct have been accumulated in the buffer unit 361, the wavelet inverse transformation unit 363 proceeds the processing to Step S215, and reads out coefficient data worth one precinct, held in the buffer unit 361.

The wavelet inverse transformation unit 363 in step S216 then subjects the read out coefficient data to vertical synthesis filtering processing which performs synthesis filtering processing as to the coefficient data arrayed in the screen vertical direction, and in step S217, performs horizontal synthesis filtering processing which performs synthesis filtering processing as to the coefficient data arrayed in the screen horizontal direction, and in step S218 determines whether or not the synthesis filtering processing has ended through level one (the level wherein the value of the division level is "1"), i.e. determines whether or not inverse transformation has been performed to the state prior to wavelet transformation, and if it is determined not to have reached level 1, the processing is returned to Step S216, whereby the filtering processing in step S216 and Step S217 is repeated.

In Step S218, if the inverse transformation processing is determined to have ended through level 1, the wavelet inverse transformation unit 363 proceeds the processing to Step S219, and outputs the image data obtained by inverse transformation processing externally.

In Step S220, the entropy decoding unit 362 determines whether or not to end the decoding processing, and in the case of determining that the decoding processing will not be ended, the processing returns to Step S211, and the processing thereafter is repeated. Also, in step S220, in the case that determination is made that the decoding processing is to be ended, such as the precinct ending, the entropy decoding unit 362 ends the decoding processing.

With a conventional wavelet inverse transformation method, first, horizontal synthesis filtering processing is performed in the horizontal direction of the screen, and next vertical synthesis filtering processing is performed in the vertical direction of the screen, as to all coefficients of the division level to be processed. That is to say, there is the need to hold the results of synthesis filtering processing in a buffer each time synthesis filtering processing is performed, and at this time, there is the need for the buffer to hold the synthesis filtering results of the division level at that point in time, and all coefficients of the next division level, meaning that great memory capacity is needed (the amount of data to be held is great).

Also, in this case, image data output is not performed until all wavelet inverse transformation within the picture (field, in the case of interlaced method) ends, thereby increasing delay time from input to output.

Conversely, in the case of the wavelet inverse transformation unit 363 of the decoding unit 133, as described above, the vertical synthesis filtering processing and horizontal synthesis filtering processing are continuously performed in increments of precincts up to the level 1, therefore compared to a conventional method, the amount of data needing to be buffered at one time (during the same time period) is small, thus facilitating marked reduction in memory capacity to be prepared in the buffer. Also, by performing synthesis filtering processing (wavelet inverse transformation processing) up to level 1, the image data can be output sequentially before all of the image data within a picture is obtained (in increments of precincts), thus compared to a conventional method, the delay time can be greatly reduced.

Figure 32:
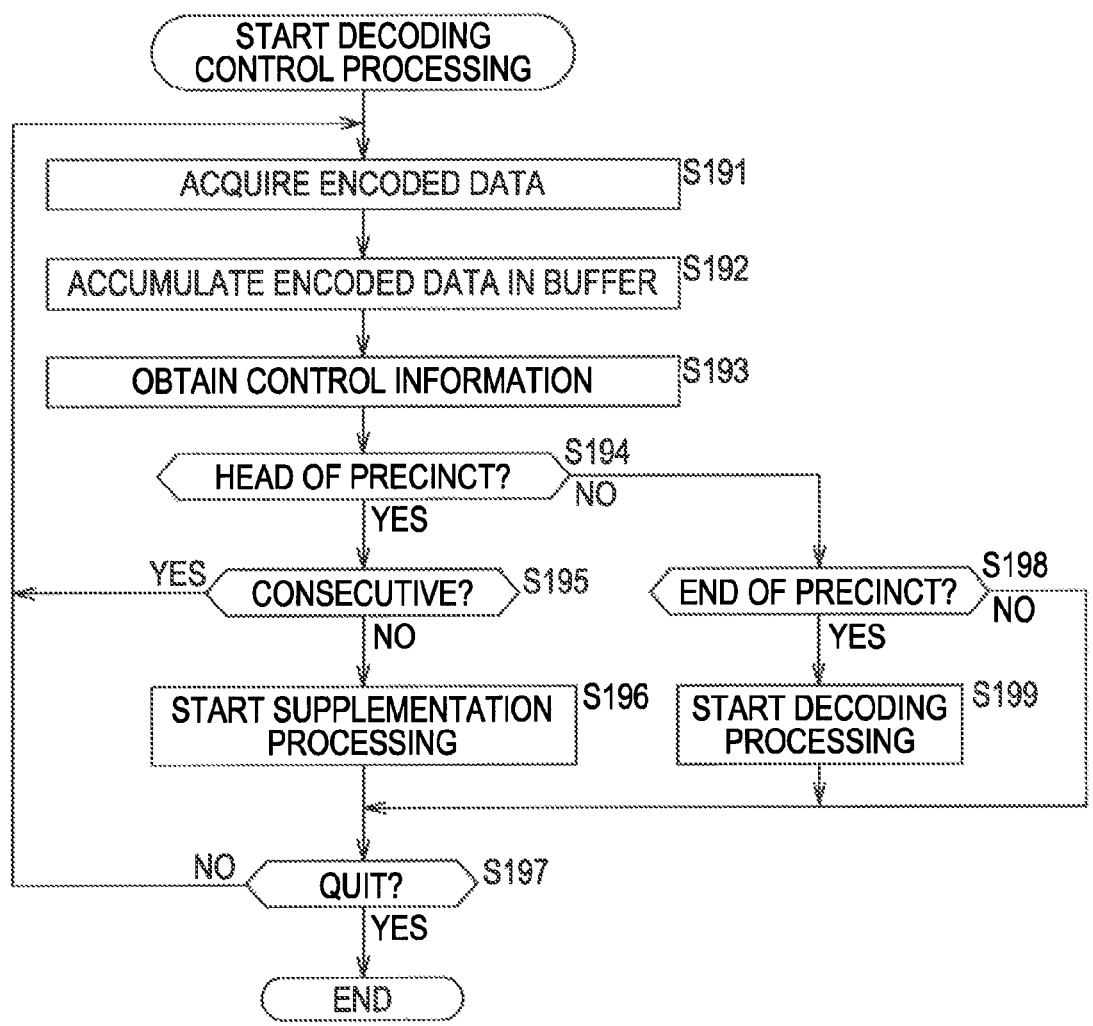
FIG. 32 is a flowchart for explaining an example of the flow of decoding control processing.

Next, an example of the flow of error notification handling processing which is processing as to an error notification from the depacketizing processing unit 132 at the decoding unit 133, performed in parallel with the decoding control processing in FIG. 32, will be described with reference to the flowchart in FIG. 34.

Figure 34:
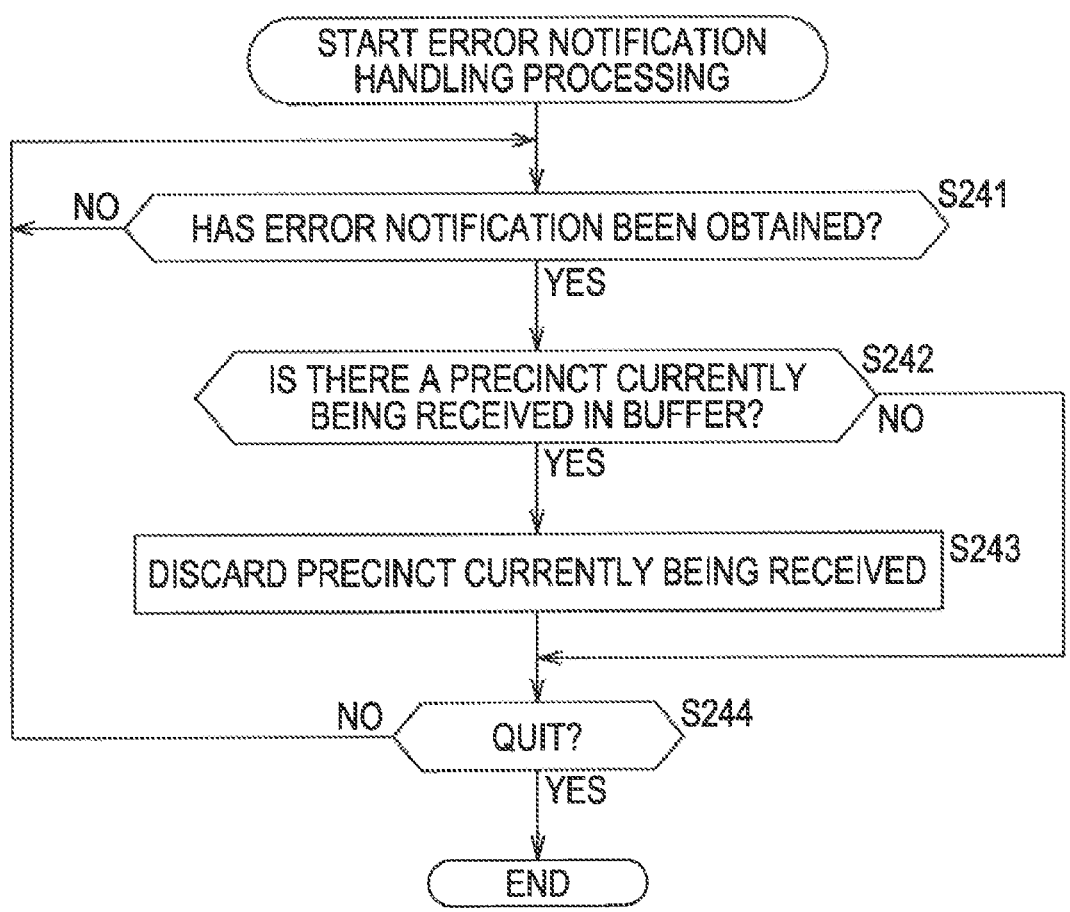
FIG. 34 is a flowchart for explaining an example of the flow of error notification handling processing.

Upon error notification processing being started in FIG. 34, the error notification obtaining unit 356 determines in step S241 whether or not an error notification has been obtained from the depacketizing processing unit 132. The processing stands by until determination is made that an error notification has been obtained. In the event that determination is made in step S241 that an error notification has been obtained, the processing proceeds to step S242. In step S242, the discarding processing unit 357 determines whether or not a precinct currently being received (encoded data belonging to the newest precinct regarding which a packet loss has occurred) is present in the buffer unit 361.

In the event that determination is made that a precinct currently being received is present in the buffer unit 361, the processing proceeds to step S243. In step S243, the discarding processing unit 357 discards the slice being received that is accumulated in the buffer unit 361. Upon the processing in step S243 ending, the processing proceeds to step S244. Also, in the event that determination is made in step S242 that a slice currently being received is not present in the buffer unit 361, the processing of step S243, is omitted, and the processing proceeds to step S244.

In step S244, the discarding processing unit 357 determines whether or not to end the error notification handling processing. In the event that determination is made that depacketizing processing is continuing, and that error notification handling processing is not to be ended either, the processing returns to step S241, and subsequent processing thereafter is repeated. Also, in the event that determination is made in step S244 that the error notification handling processing is to be ended, the error notification handling processing is ended.

In this way, the decoding unit 133 discards encoded data of a slice where a packet loss has occurred, in accordance with an error notification from the depacketizing processing unit 132, so unnecessary decoding processing can be kept from being performed. Such appropriate decoding processing can be performed, so the decoding unit 133 can perform the decoding processing easily and at high speed, and the load of decoding processing can be reduced and the circuit scale and cost reduced.

Figure 35:
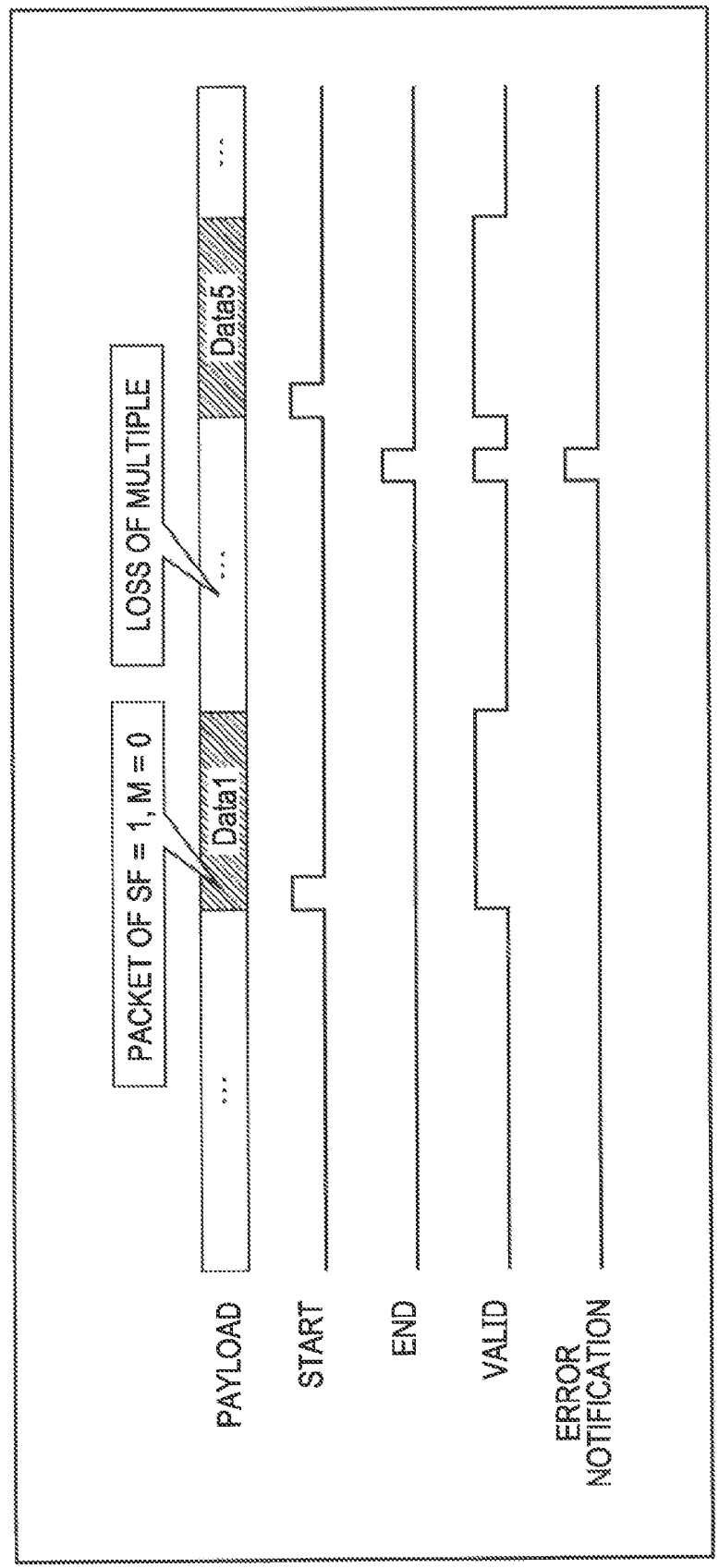
FIG. 35 is a schematic diagram for explaining an example of the way of handling error notification.

An example of the way in which error notification is performed by the depacketizing processing unit 132 is shown in FIG. 35.

We will say that in FIG. 35, the depacketizing processing unit 132 and the decoding unit 133 are connected with 6 signal lines. The depacketizing processing unit 132 supplies to the decoding unit 133 encoded data (Data 1) extracted from a received packet 1 by deleting the RTP header and so forth. At this time, in the event that the encoded data (Data 1) is the head of a new slice, the control signal supplying unit 258 of the depacketizing processing unit 132 is controlled by the control unit 254 so as to notify start information (START).

In the event that the next packet which arrives is packet 5, determination is made that there has been a packet loss. At this time, Data 1 which is part of the precinct has already been transmitted to the decoding unit 133, so the error notification unit 257 of the depacketizing processing unit 132 is controlled by the control unit 254 to perform error notification. Also, since the packet 5 was "SFF=1", the control signal supplying unit 258 of the depacketizing processing unit 132 is controlled by the control unit 254 so as to notify start information (START).

Note that description has been made above that in the event that the data size of a precinct is greater than the packet size, the packetizing processing unit 122 divides the data and generates multiple packets, and in a case otherwise, generates a single packet, but an arrangement may be made wherein, in the event that the data size of a precinct is small as compared to the packet size, data of multiple precincts may be made into a single packet.

Figure 36:
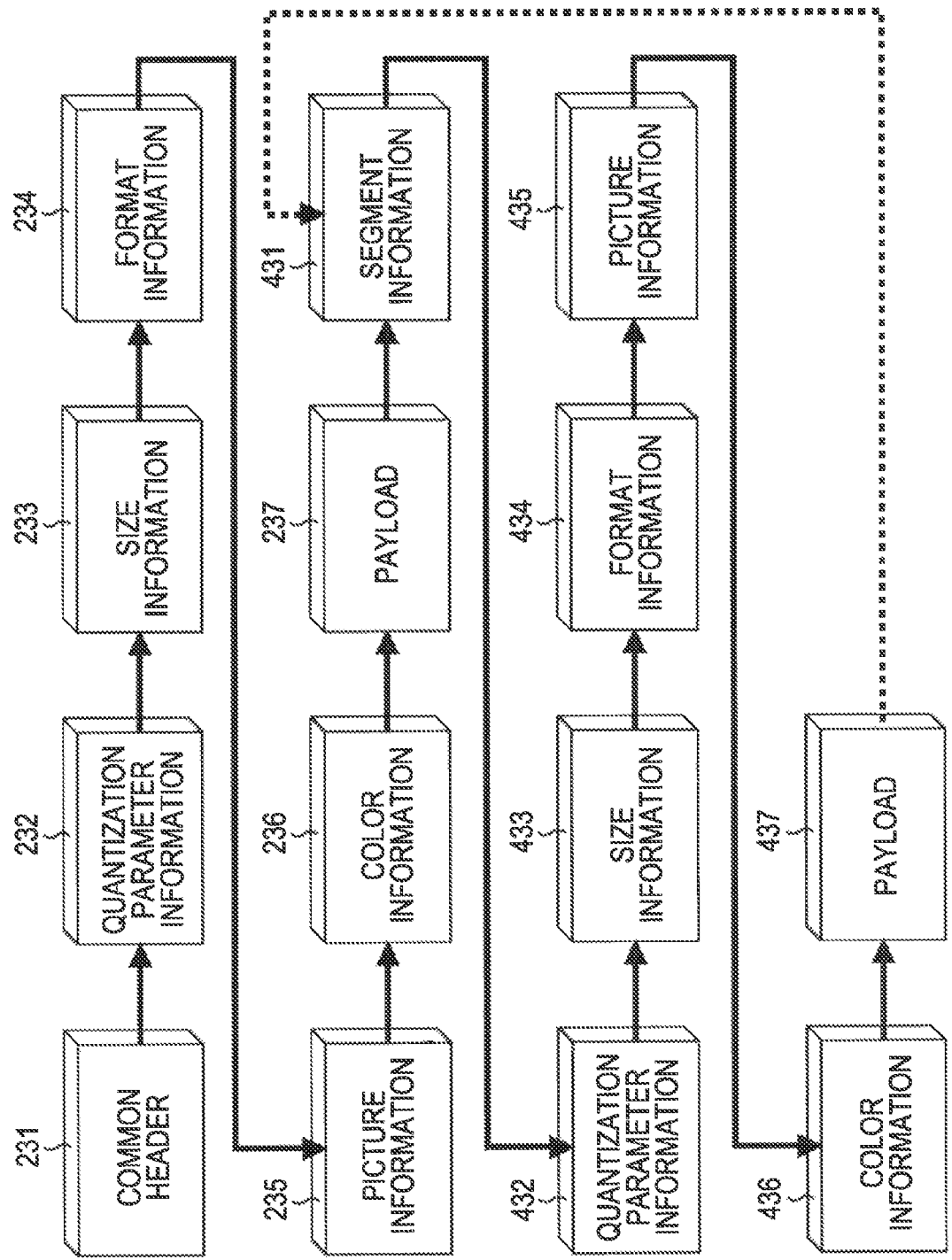
FIG. 36 is a diagram illustrating another configuration example of an RTP payload header.

At this time, the configuration of the payload header has the header information and payload arrayed in order as shown in FIG. 36, for example. In the case of the example in FIG. 36, following the common header 231 through payload 237 which are data of the first precinct, segment information 431, quantization parameter information 432, size information 433, format information 434, picture information 435, color information 436, and payload 437 are configured, which are data of the second precinct, and following this is data of the third and subsequent precincts.

The segment information 431 is a common header as to the second precinct, and as shown in FIG. 37, information basically the same as the common header 231 is included. That is to say, the segment information 431 is created based on the precinct header 171. Note that in the event that there is data of another precinct after itself, the value of NF is set to "1" in the common header 231 (the same as with segment information 431).

An example of the flow of packetizing processing at this time will be described with reference to the flowchart in FIG. 38.

Figure 38:
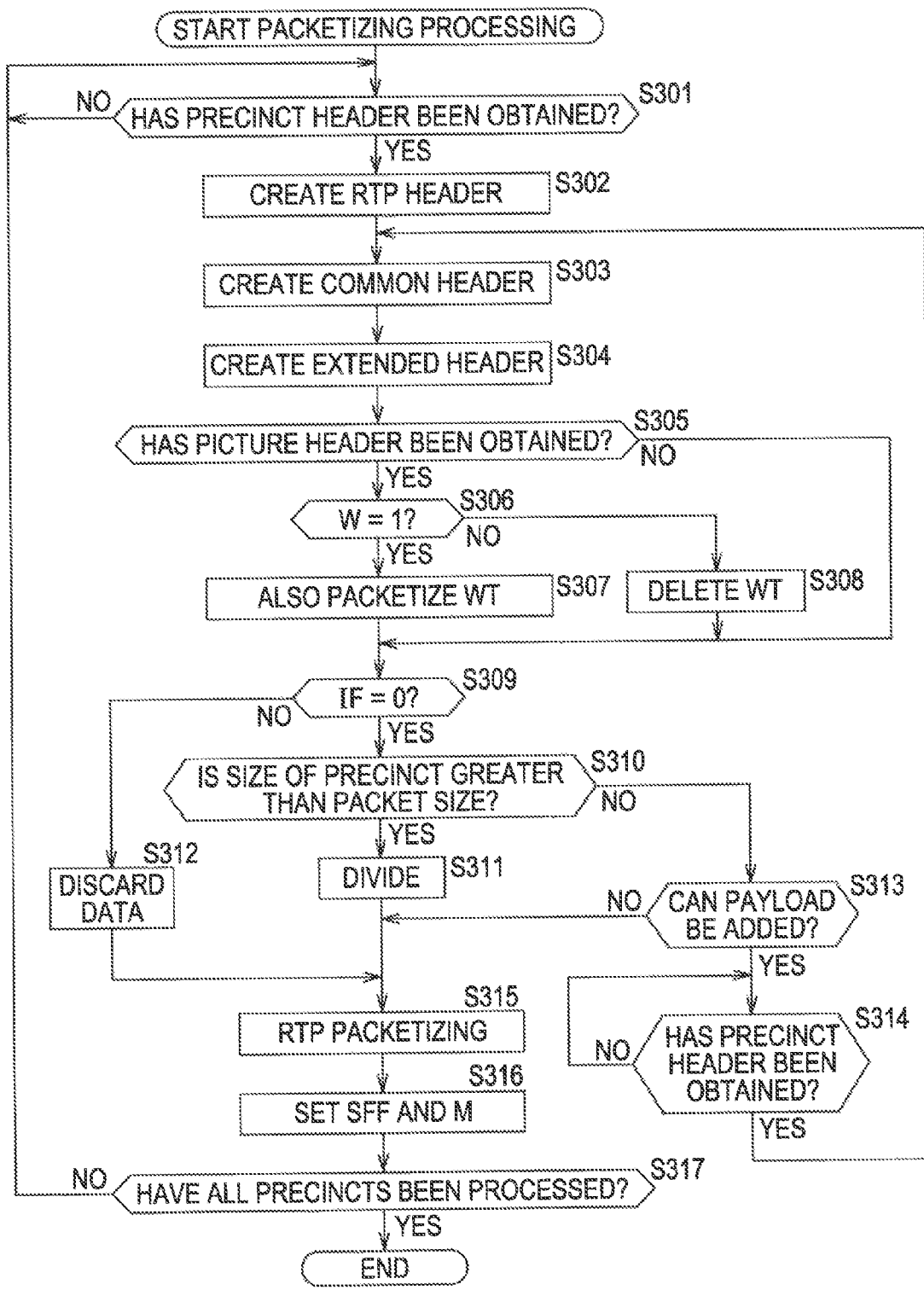
FIG. 38 is a flowchart for explaining another example of the flow of packetizing processing.

As shown in FIG. 38, the packetizing processing in this case is also executed basically in the same way as the case described with reference to FIG. 26. Each processing of step S301 through step S312 is executed in the same way as each processing of step S31 through step S42 in FIG. 26, and each processing of step S315 through step S317 is executed in the same way as each processing of step S43 through step S45 in FIG. 26.

Note however, in step S310, in the event that determination is made that the size of the precinct is not greater than the packet size, the size confirmation unit 207 of the packetizing processing unit 122 determines whether or not a new payload can be added to the same packet. In the event that determination is made that there is leeway in the packet size and the payload can be added, the processing proceeds to step S314, where the data acquisition unit 201 determines whether or not a precinct header has been obtained, and stands by until determined that acquired. In the event that determination is made that a precinct header has been obtained, the processing returns to step S303, and the subsequent processing is repeated for the precinct to be added to the packet. That is to say, by repeating looping processing of step S303 through step S310 and step S313 and step S314, precincts are sequentially added to the same packet until the total data size of the encoded data is greater than the packet size.

Note that in step S313, in the event that determination is made that it is impossible to add a payload to the packet, the processing returns to step S313, and subsequent processing is executed. That is to say, in this case, a single packet is generated with encoded data of a single precinct.

By performing packetizing processing as above, data of multiple precincts can be included in a single packet.

Figure 39:
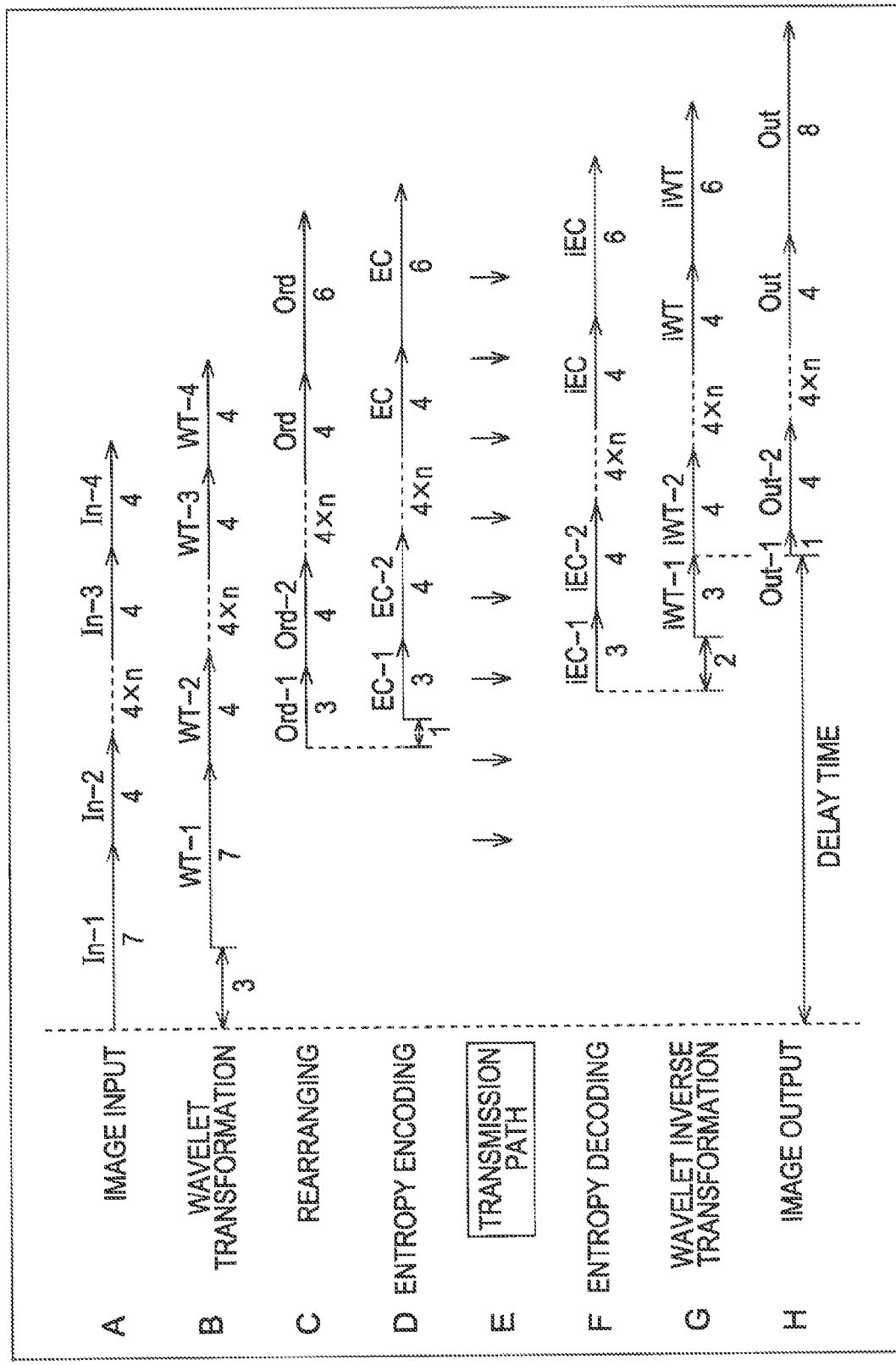
FIG. 39 is an outlined line drawing schematically illustrating an example of the way in which each of the components of the transmission device and reception device perform parallel operations.

The various processing executed by each unit of the transmission system 100 shown in FIG. 1 as above are executed in parallel as appropriate, as shown in FIG. 39 for example.

FIG. 39 is a drawing schematically showing an example of parallel operations for various elements of the processing executed by each unit of the transmission system 100 shown in FIG. 1. This FIG. 39 corresponds to the above-described FIG. 6. Wavelet transformation WT-1 at the first time is performed (B in FIG. 39) with the wavelet transformation unit 150 (FIG. 2) as to the input In-1 (A in FIG. 39) of the image data. As described with reference to FIG. 5, the wavelet transformation WT-1 at the first time is started at the point-in-time that the first three lines are input, and the coefficient C1 is generated. That is to say, a delay of three lines worth occurs from the input of the image data In-1 to the start of the wavelet transformation WT-1.

The generated coefficient data is stored in the coefficient rearranging buffer unit 152 (FIG. 2). Thereafter, wavelet transformation is performed as to the input image data and the processing at the first time is finished, whereby the processing is transferred without change to the wavelet transformation WT-2 at the second time.

Rearranging Ord-1 of three, coefficient C1, coefficient C4, and coefficient C5 is executed (C in FIG. 39) with the coefficient rearranging unit 153 (FIG. 2) in parallel with the input of image data In-2 for the purpose of wavelet transformation WT-2 at the second time and the processing of the wavelet transformation WT-2 at the second time.

Note that a delay from the end of the wavelet transformation WT-1 until the rearranging Ord-1 starts is a delay based on a device or system configuration, and for example is a delay associated with the transmission of a control signal to instruct rearranging processing to the coefficient rearranging unit 153, a delay needed for processing starting of the coefficient rearranging unit 153 as to the control signal, or a delay needed for program processing, and is not an substantive delay associated with encoding processing.

The coefficient data is read from the coefficient rearranging buffer unit 152 in the order that rearranging is finished, is supplied to the entropy encoding unit 155 (FIG. 2), and is subjected to entropy encoding EC-1 (D in FIG. 39). The entropy encoding EC-1 can be started without waiting for the end of all rearranging of the three coefficient C1, coefficient C4, and coefficient C5. For example, at the point-in-time that the rearranging of one line by the coefficient C5 output at first is ended, entropy encoding as to the coefficient C5 can be started. In this case, the delay from the processing start of the rearranging Ord-1 to the processing start of the entropy encoding EC-1 is one line worth.

The encoded data regarding which entropy encoding EC-1 by the entropy encoding unit 155 has ended is subjected to predetermined signal processing, and then transmitted to the reception device 103 via the line 110 (E in FIG. 39). At this time, the encoded data is packetized and transmitted.

Image data is sequentially input to the encoding unit 121 of the transmission device 102, from the seven lines worth at the first processing, on to the end line of the screen. At the encoding unit 121, every four lines are subjected to wavelet transformation WT-n, rearranging Ord-n, and entropy encoding EC-n, as described above, in accordance with image data input In-n (where n is 2 or greater). Rearranging Ord and entropy encoding EC performed in the processing of the last time at the encoding unit 121 is performed on six lines. These processing are performed at the encoding unit 121 in parallel, as illustrated exemplarily in A through D in FIG. 39.

Packets of encoded data encoded by the entropy encoding EC-1 by the encoding unit 121 are transmitted to the reception device 103, subjected to depacketizing processing and so forth, and then supplied to the decoding unit 133. The entropy decoding unit 362 of the decoding unit 133 sequentially performs decoding iEC-1 of entropy encoding as to the encoded data which is encoded with the entropy encoding EC-1 supplied, and restores the coefficient data (F in FIG. 39). The restored coefficient data is sequentially stored in the buffer unit 361. Upon as much coefficient data as can be subjected to wavelet inverse transformation being stored in the buffer unit 361, the wavelet inverse transformation unit 363 reads the coefficient data from the buffer unit 361, and performs wavelet inverse transformation iWT-1 using the read coefficient data (G in FIG. 39).

As described with reference to FIG. 5, the wavelet inverse transformation iWT-1 at the wavelet inverse transformation unit 363 can be started at the point-in-time of the coefficient C4 and coefficient C5 being stored in the buffer unit 361. Accordingly, the delay from the start of decoding iEC-1 with the entropy decoding unit 362 to the start of the wavelet inverse transformation iWT-1 with the wavelet inverse transformation unit 363 is two lines worth.

With the wavelet inverse transformation unit 363, upon the wavelet inverse transformation iWT-1 of three lines worth with the wavelet transformation at the first time ending, output Out-1 of the image data generated with the wavelet inverse transformation iWT-1 is performed (H in FIG. 39). With the output Out-1, as described with reference to FIG. 5 and FIG. 6, the image data of the first line is output.

Following the input of the encoded coefficient data worth three lines with the processing at the first time by the encoding unit 121 to the decoding unit 133, the coefficient data encoded with the entropy encoding EC-n (n is 2 or greater) is sequentially input. With the decoding unit 133, the input coefficient data is subjected to entropy decoding iEC-n and wavelet inverse transformation iWT-n for every four lines, as described above, and output Out-n of the image data restored with the wavelet inverse transformation iWT-n is sequentially performed. The entropy decoding iEC and wavelet inverse transformation iWT corresponding to the last time with the encoding unit 121 is performed as to six lines, and eight lines of output Out are output. These processing are performed in parallel as exemplified in F in FIG. 39 through H in FIG. 39 at the decoding unit 133.

As described above, by performing each processing in parallel at the encoding unit 121 and the decoding unit 133, in order from the top of the screen toward the bottom thereof, image compression processing and image decoding processing can be performed with little delay.

With reference to FIG. 39, the delay time from the image input to the image output in the case of performing wavelet transformation to division level=2 using a 5×3 filter will be calculated. The delay time from inputting the image data of the first line into the encoding unit 121 until the image data of the first line is output from the decoding unit 133 becomes the sum of the various elements described below. Note that delays differing based on the system configuration, such as delay in the transmission path and delay associated with actual processing timing of the various portions of the device, are excluded.

(1) Delay D_WT from the first line input until the wavelet transformation WT-1 worth seven lines ends (2) Time D_Ord associated with three lines worth of coefficient rearranging Ord-1

(3) Time D_EC associated with three lines worth of entropy encoding EC-1

(4) Time D_EC associated with three lines worth of entropy decoding EC-1

(5) Time D_iWT associated with three lines worth of wavelet inverse transformation iWT-1

Delay due to the various elements described above will be calculated with reference to FIG. 39. The delay D_WT in (1) is ten lines worth of time. The time D_Ord in (2), time D_EC in (3), time D_iEC in (4), and time D_iWT in (5) are each three lines worth of time. Also, with the encoding unit 121, the entropy encoding EC-1 can be started after one line from the start of the rearranging Ord-1. Similarly, with the decoding unit 133, the wavelet inverse transformation iWT-1 can be started after two lines from the start of entropy decoding iEC-1. Also, the entropy decoding iEC-1 can start processing at the point-in-time of one line worth of encoding with the entropy encoding EC-1 being finished.

Accordingly, with the example in FIG. 39, the delay time from the image data of the first line input into the encoding unit 121 until the image data of the first line output from the decoding unit 133 becomes 10+1+1+2+3=17 lines worth.

The delay time will be considered with a more specific example. In the case that the input image data is an interlace video signal of an HDTV (High Definition Television), for example one frame is made up of a resolution of 1920 pixels× 1080 lines, and one field is 1920 pixels×540 lines. Accordingly, in the case that the frame frequency is 30 Hz, the 540 lines of one field are input to the encoding unit 121 in the time of 16.67 msec (=1 sec/60 fields).

Accordingly, the delay time associated with the input of seven lines worth of image data is 0.216 msec (=16.67 msec× 7/540 lines), and becomes a very short time as to the updating time of one field, for example. Also, delay time of the sum total of the above-described delay D_WT in (1), time D_Ord in (2), time D_EC in (3), time D_iEC in (4), and time D_iWT in (5) is significantly shortened, since the number of lines to be processed is small. Hardware-izing the components for performing each processing will enable the processing time to be shortened even further.

Now, the flag information of SFF and M will be described.

As described above, with the transmission system 100, the tolerance for increased delay time is low, so transmitting data more efficiently and performing necessary processing more efficiently, even in the slightest, is required.

There are systems which perform encoding and decoding in predetermined data increments, with the conventional, as well. There are those wherein, in the case of packetizing encoded data and transmitting, as with the transmission system 100 in FIG. 1, the encoded data in the data increments is divided into a plurality and each are packetized and transmitted. However, in the case of a conventional system, the tolerance as to delay time is great, so in the depacketizing processing, packets of the data increment worth are accumulated, and depacketizing processing is performed each data increment. Thus, only encoded data of which the data increments are all present can be supplied to the decoding unit and decoded.

However, with this method, there rises the necessity to buffer at both the depacketizing processing unit and the encoding unit, which is undesirable with the transmission system 100 regarding which reduction in delay time is required.

Accordingly, as described above, the depacketizing processing unit 132 uses the fact that the transmitted encoded data can be processed in the order of supply at each unit, and sequentially extracts the payload data from the received packets and supplies to the decoding unit 133 without accumulating. The decoding unit 133 starts decoding processing each time a precinct worth of encoded data that is sequentially supplied is accumulated. Thus, the number of times of buffering of the encoded data can be reduced, so the transmission system 100 can further reduce the delay time.

The SFF and M are flag information indicating the head or end of a precinct, and the depacketizing processing unit 132 can detect the head and end of a precinct based on this flag information, and can make notification to the decoding unit 133 to that effect. The decoding unit 133 can comprehend a break in precincts based on the notification from the depacketizing processing unit 132, and start the decoding processing in increments of precincts.

If this were everything, the M which indicates the end of a precinct alone would be sufficient. If we say that there are packets where a precinct has been divided into a plurality and packets not divided, present together, these packets could be identified as long as there is flag information indicating having been divided.

However, in reality, there can be conceived failure by the reception unit 131 to receive a packet (to lose). In the event that such packet loss occurs, the depacketizing processing unit 132 needs to change the processing with that of normal operation, so as to not perform buffering of a packet. For example, in the case of packet loss occurring, with the transmission system 100, time for the transmission device 102 to re-send that packet cannot be secured, so the encoded data of that precinct will not all be present. That is to say, the decoding unit 133 will not be able to execute decoding processing as to that precinct, due to occurrence of packet loss.

Accordingly, in the event that a packet loss has occurred partway through a precinct for example, it may be conceived that encoded data for that precinct so far is accumulated at the decoding unit 133. In such a case, the depacketizing processing unit 132 makes notification of occurrence of the packet loss to the decoding unit 133, and causes the encoded data of the same precinct of the encoded data of the lost packet, that is accumulated, to be discarded. Accordingly, the decoding unit 133 can avoid execution of unnecessary decoding processing on that precinct (decoding processing which will fail), thereby alleviating the load.

Also, once a packet loss occurs, subsequent encoding data of that precinct becomes unnecessary. Accordingly, even if the depacketizing processing unit 132 acquires packets, it does not supply the encoded data to the decoding unit 133 until the next subsequent precincts. Upon acquiring a packet of a new precinct, the depacketizing processing unit 132 resumes supply of encoded data.

Thus, the depacketizing processing unit 132 performs suitable processing as appropriate by changing the control mode in accordance with the state. To this end, the depacketizing processing unit 132 refers to the SFF and M and detects the head and end of the precinct. At this time, if there is only M indicating the end, the depacketizing processing unit 132 will not be able to determine that the precinct has changed until detecting the end of the precinct. For example, in the case of loosing the final packet of the precinct, the depacketizing processing unit 132 will need to await for a further next new precinct, so not only will delay time increase, but also decoding processing cannot be performed at the decoding unit 133, and there is concern that the image quality of the restored image may deteriorate.

Conversely, by making reference to the value of the SFF and detecting the head packet, the depacketizing processing unit 132 can not only reduce unnecessary standby time, such as resuming data to the decoding unit 133, but also can perform exceptional processing only as to the head packet, such as supplying not only encoded data but also header information to the decoding unit 133, omitting error notification for notifying occurrence of packet loss to the decoding unit 133, continuing supply of encoded data to the decoding unit 133 even if a packet loss occurs, and so forth, for example.

Thus, the depacketizing processing unit 132 can perform processing appropriately with the SFF and M flag information, and can further reduce delay time.

Also, the depacketizing processing unit 132 notifies the decoding unit 133 that the encoded data being supplied is the head or the end of the precinct, based on this SFF and M. Accordingly, the decoding unit 133 can readily comprehend the head and end of precincts, so in the event that the end of a precinct has been supplied for example, decoding processing can be started, and in the event that the head of a new precinct which is not continuous has been supplied, supplementation processing can be performed as to the previous lost precinct. That is to say, the decoding unit 133 can perform such control easily and at high speed, based on notification from the depacketizing processing unit 132.

As described above, the SFF and M are not simply flag information for notifying the start timing of depacketizing processing and decoding processing, and are flag information for causing suitable processing to be selected and executed at a suitable timing by the depacketizing processing unit 132 and decoding unit 133, so as to further reduce the delay time up to decoding encoded data and outputting.

Now, while coefficient rearranging has been described as being performed immediately following the wavelet transformation (before entropy encoding) in FIG. 2, it is sufficient for encoded data to be supplied to the wavelet inverse transformation unit 363 of the decoding unit 133 in order from lowband to highband (i.e., it is sufficient to be supplied in the order of encoded data obtained by encoding coefficient data belonging to the lowband sub-bands, to encoded data obtained by encoding coefficient data belonging to the highband sub-bands), and the timing for rearranging may be other than immediately following wavelet transformation.

Figure 40:
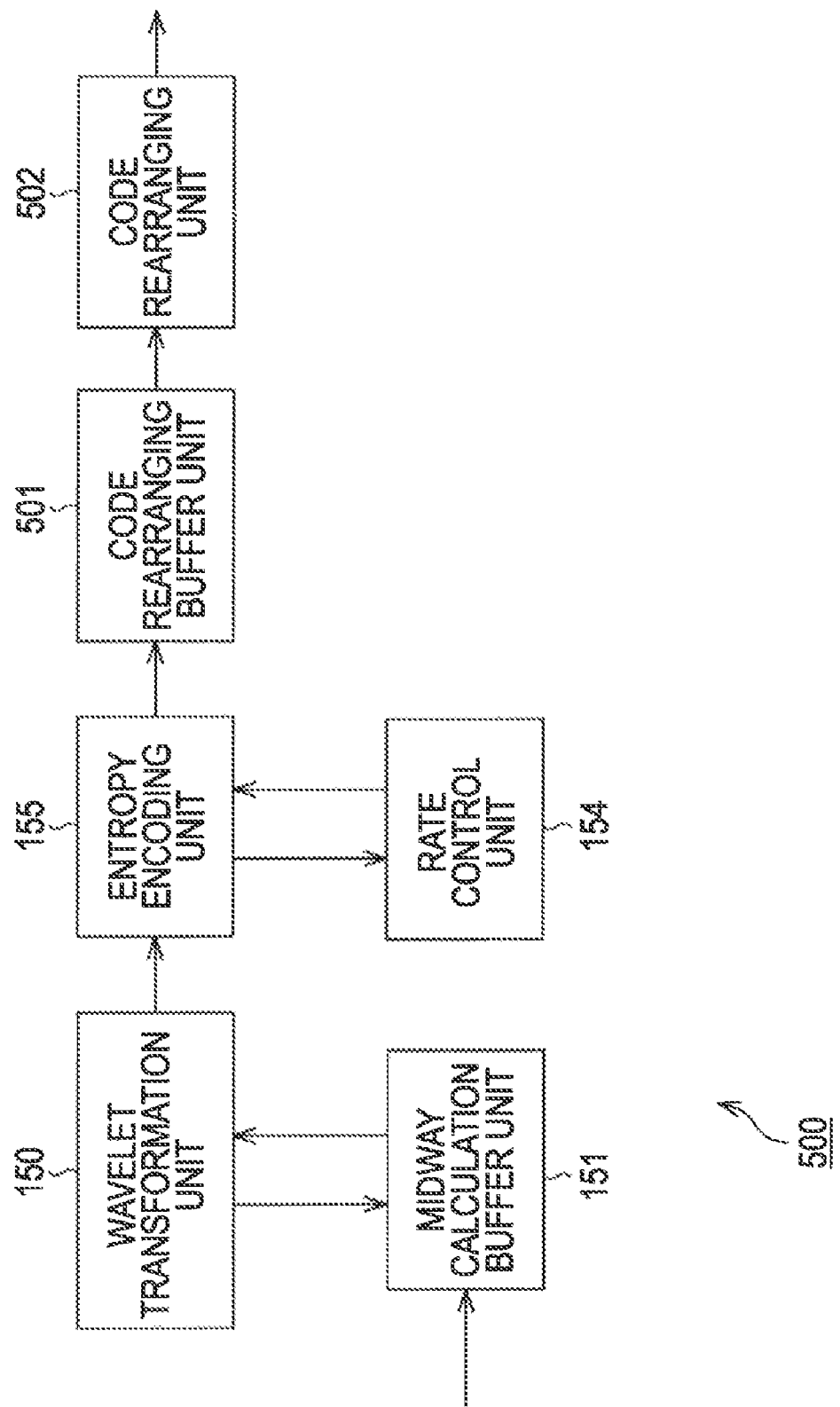
FIG. 40 is a block diagram illustrating another configuration example of the encoding unit shown in FIG. 1.

For example, the order of encoded data obtained by entropy encoding may be rearranged. FIG. 40 is a block diagram illustrating a configuration example of the encoding unit in this case.

In the case in FIG. 40, the encoding unit 500 includes a wavelet transformation unit 150, midway calculation buffer unit 151, entropy encoding unit 155, and rate control unit 154, in the same way as with the case of the encoding unit 121 in FIG. 2, but has a code rearranging buffer unit 501 and code rearranging unit 502 instead of the coefficient rearranging buffer unit 152 and coefficient rearranging unit 153 in FIG. 2.

The code rearranging buffer unit 501 is a buffer for rearranging the output order of encoded data encoded at the entropy encoding unit 155, and the code rearranging unit 502 rearranges the output order of the encoded data by reading out the encoded data accumulated in the code rearranging buffer unit 501 in a predetermined order.

That is to say, in the case in FIG. 40, the wavelet coefficients output from the wavelet transformation unit 150 are supplied to the entropy encoding unit 155 and encoded. Each encoded data obtained by that encoding is sequentially supplied to the code rearranging buffer unit 501, and temporarily accumulated for rearranging.

The code rearranging unit 502 reads out the encoded data written in the code rearranging buffer unit 501 in a predetermined order, and outputs externally from the encoding unit 500.

In the case in FIG. 40, the entropy encoding unit 155 performs encoding of each coefficient data in the output order by the wavelet transformation unit 150, and writes the obtained encoded data to the code rearranging buffer unit 501. That is to say, the code rearranging buffer unit 501 stores encoded data in an order corresponding to the output order of wavelet coefficients by the wavelet transformation unit 150. In a normal case, comparing coefficient data belonging to one precinct one with another, the wavelet transformation unit 150 outputs the coefficient data earlier that belongs to a higher band sub-band, and outputs the coefficient data later that belongs to a lower band sub-band. That is to say, each encoded data is stored in the code rearranging buffer unit 501 in an order heading from the encoded data obtained by performing entropy encoding of coefficient data belonging to highband sub-bands toward the encoded data obtained by performing entropy encoding of coefficient data belonging to lowband sub-bands.

Conversely, the code rearranging unit 502 performs rearranging of encoded data by reading out each encoded data accumulated in the code rearranging buffer unit 501 thereof in an arbitrary order independent from this order.

For example, the code rearranging unit 502 reads out with greater priority encoded data obtained by encoding coefficient data belonging to lowband sub-bands, and finally reads out encoded data obtained by encoding coefficient data belonging to the highest band sub-band. Thus, by reading out encoded data from lowband to highband, the code rearranging unit 502 enables the decoding unit 133 to decode each encoded data in the obtained order, thereby reducing delay time occurring at the decoding processing by the decoding unit 133.

The code rearranging unit 502 reads out the encoded data accumulated in the code rearranging buffer unit 501, and outputs externally from the encoding unit 500.

Note that the data encoded and output at the encoding unit 500 shown in FIG. 40 can be decoded in the same way as with the case of the encoded data output from the encoding unit 121 in FIG. 2, by the decoding unit 133 already described with reference to FIG. 24.

Figure 41:
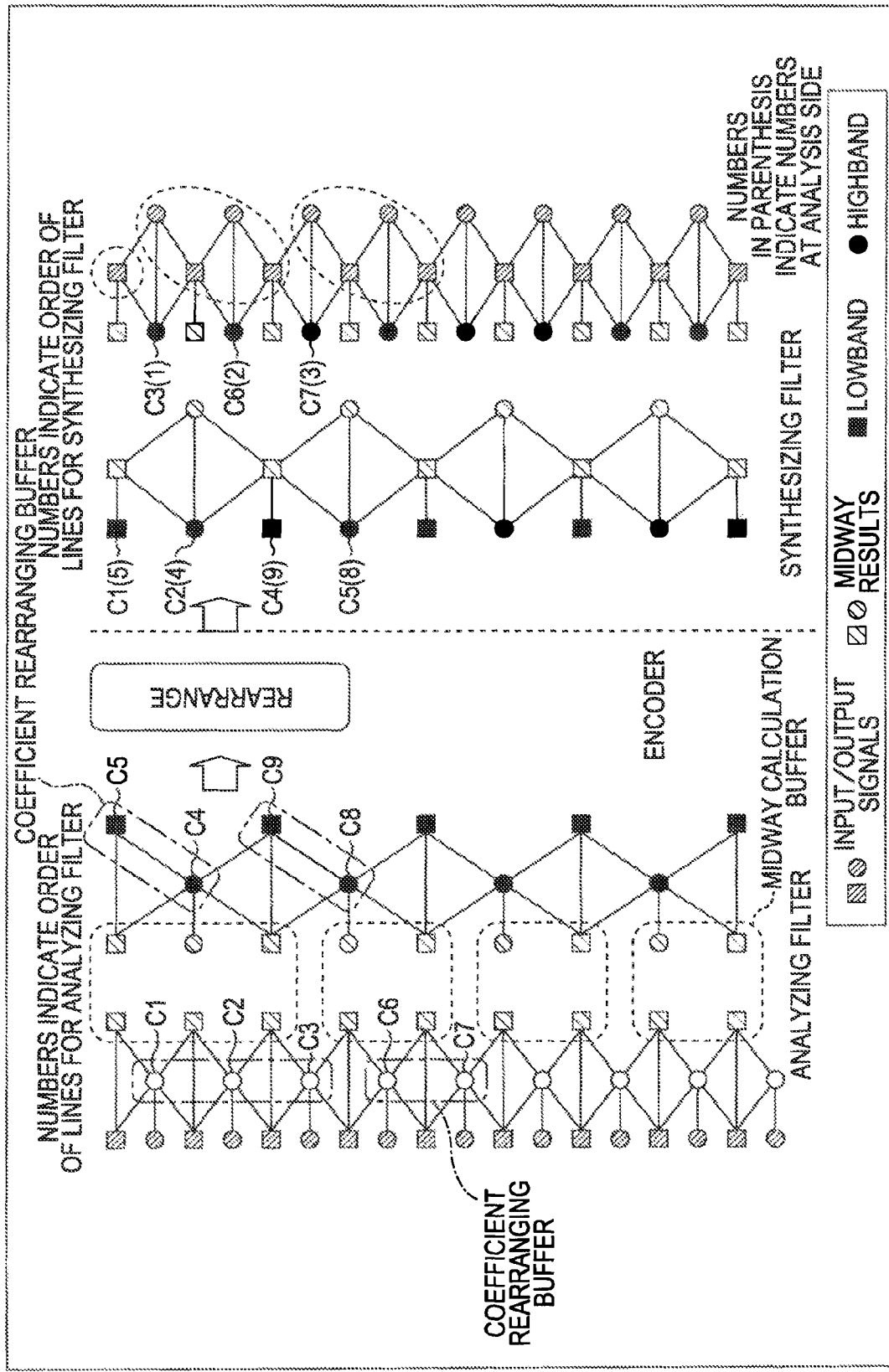
FIG. 41 is an outlined line drawing for explaining the flow of processing in the case of performing wavelet coefficient rearranging processing at the encoding unit side.
Figure 42:
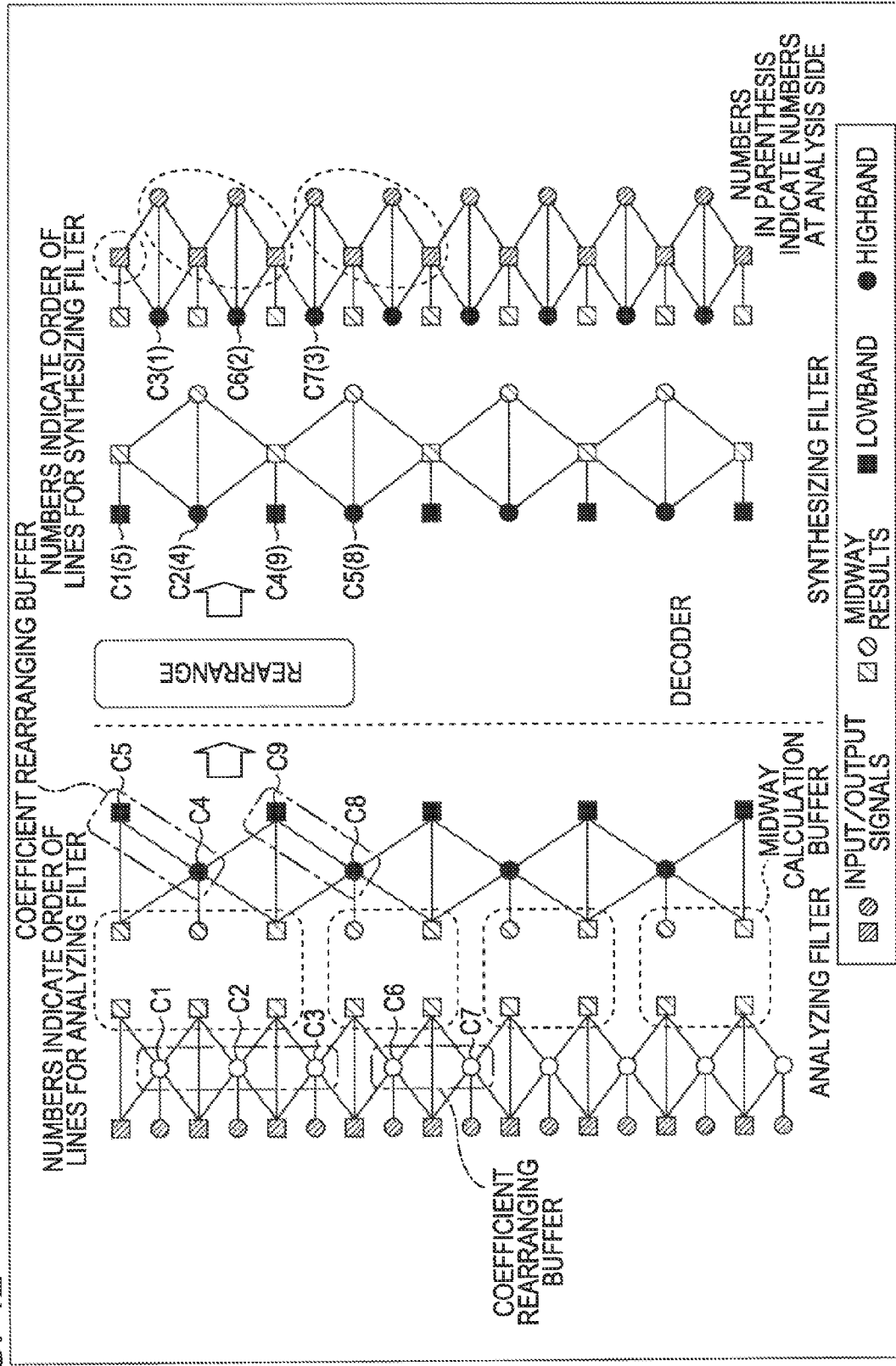
FIG. 42 is an outlined line drawing for explaining the flow of processing in the case of performing wavelet coefficient rearranging processing at the decoding unit side.

Also, the timing for performing rearranging may be other than the above-described. For example, as an example is shown in FIG. 41, this may be performed at the encoding unit, or as an example is shown in FIG. 42, this may be performed at the decoding unit.

In processing for rearranging coefficient data generated by wavelet transformation, a relatively large capacity is necessary as storage capacity for the coefficient rearranging buffer, and also, high processing capability is required for coefficient rearranging processing itself. In this case as well, there is no problem whatsoever in a case wherein the processing capability of the encoding device is at or above a certain level.

Now, let us consider situations in which the encoding device is installed in a device with relatively low processing capability, such as mobile terminals such as a cellular telephone terminal or PDA (Personal Digital Assistant). For example, in recent years, products wherein imaging functions have been added to cellular telephone terminals have come into widespread use (called cellular telephone terminal with camera function). A situation may be considered wherein the image data imaged by a cellular telephone terminal with such a camera function is subjected to compression encoding by wavelet transformation and entropy encoding, and transmitted via wireless or cable communication.

Such mobile terminals for example, are restricted in the CPU (Central Processing Unit) processing capabilities, and also have a certain upper limit to memory capacity. Therefore, the load and so forth for processing with the above-described coefficient rearranging is a problem which cannot be ignored.

Thus, as with one example shown in FIG. 42, by building the rearranging processing into the decoding unit, the load on the encoding unit can be alleviated, thus enabling the encoding unit to be installed in a device with relatively low processing ability such as a mobile terminal.

Figure 43:
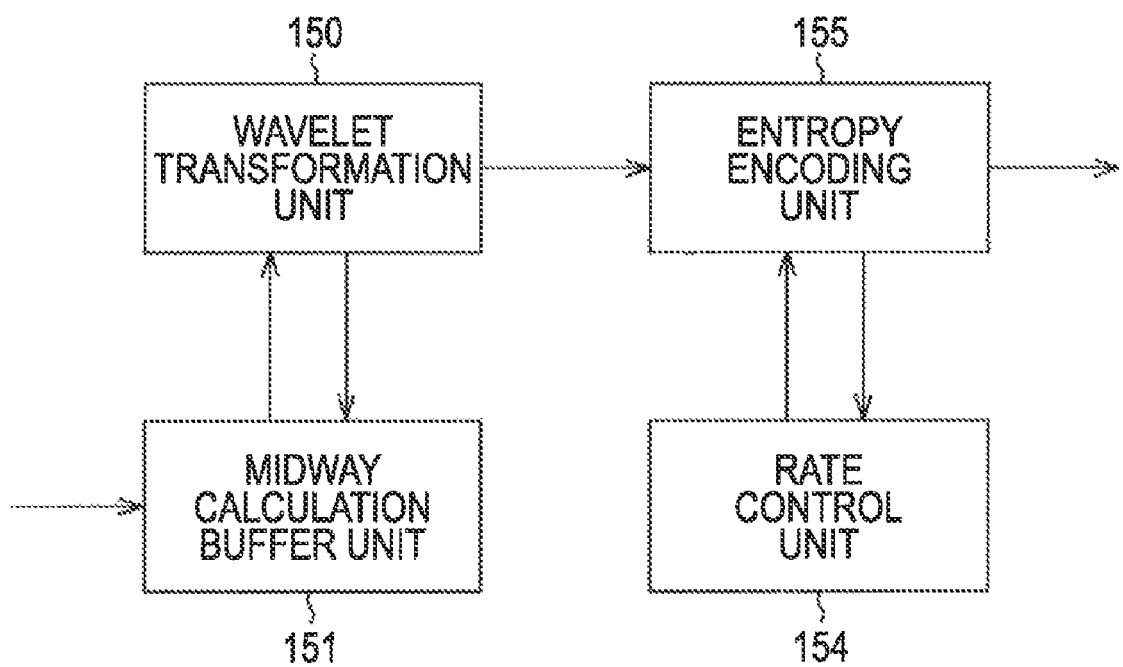
FIG. 43 is a block diagram illustrating yet another configuration example of the encoding unit shown in FIG. 1.

FIG. 43 is a block diagram illustrating the configuration of an example of the encoding unit in this case. Note that in FIG. 43, portions common to the above-described FIG. 2 are denoted with the same reference numerals, and detailed description will be omitted.

The configuration of the encoding unit 510 shown in this FIG. 43 is a configuration wherein the coefficient rearranging unit 153 and the coefficient rearranging buffer unit 152 have been removed as to the configuration of the encoding unit 121 shown in the above-described FIG. 2. That is to say, the encoding unit 510 has the wavelet transformation unit 150, midway calculation buffer unit 151, rate control unit 154, and entropy encoding unit 155, in the same way as with the case of the encoding unit 121.

The input image data is temporarily accumulated in the midway calculation buffer unit 151. The wavelet transformation unit 150 subjects the image data accumulated in the midway calculation buffer unit 151 to wavelet transformation, and sequentially supplies the generated coefficient data to the entropy encoding unit 155 in the order of coefficient data generation. That is to say, the generated coefficient data is supplied to the entropy encoding unit 155 in order from highband components to lowband components, following the order of wavelet transformation. The entropy encoding unit 155 subjects the supplied coefficients to entropy encoding, with the bit rate of output data being controlled by the rate control unit 154. The encoded data of the coefficient data generated by wavelet transformation having been subjected to entropy encoding is output from the entropy encoding unit 155.

Figure 44:
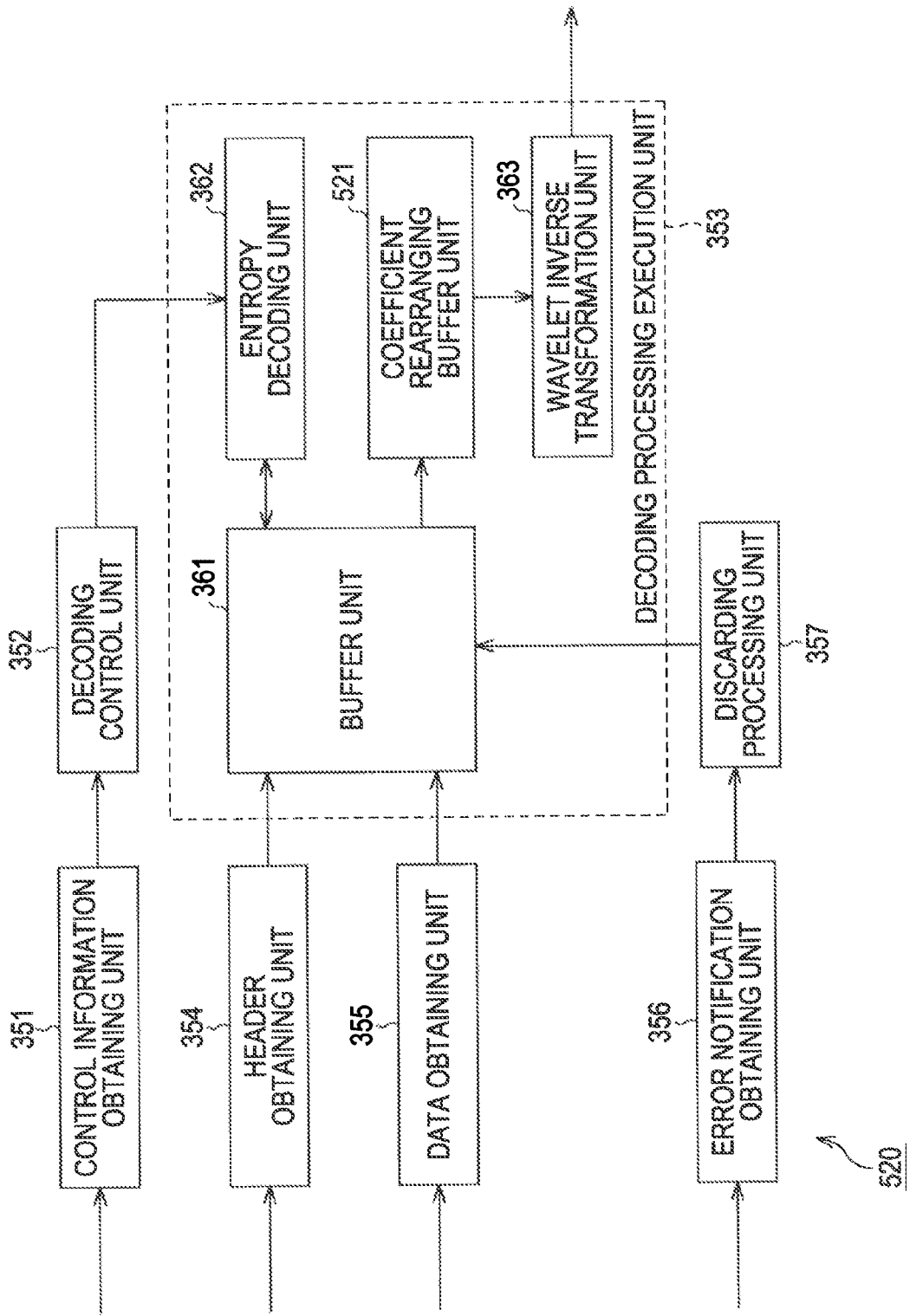
FIG. 44 is a block diagram illustrating a configuration example a decoding unit corresponding to the encoding unit in FIG. 43.

FIG. 44 is a block diagram illustrating the configuration of an example of a decoding device corresponding to this encoding unit 510. Note that in this FIG. 44, portions common to the above-described FIG. 24 are denoted with the same reference numerals, and detailed description will be omitted.

As shown in FIG. 44, the decoding unit 520 in this case has the control information obtaining unit 351, decoding control unit 352, decoding processing execution unit 353, header obtaining unit 354, data acquisition unit 355, an error notification obtaining unit 356, and discarding processing unit 357, in the same way as with the decoding unit 133 in FIG. 24, with the decoding processing execution unit 353 further having a coefficient rearranging buffer unit 521.

The encoded data output from the entropy encoding unit 155 of the encoding unit 510 described with FIG. 43 is supplied to the entropy decoding unit 362 via the buffer unit 361 in the decoding unit 520 in FIG. 44, where the entropy encoding is decoded and made to be coefficient data. This coefficient data is stored in the coefficient rearranging buffer unit 521 via the buffer unit 361. Upon coefficient data being accumulated in the coefficient rearranging buffer unit 521 to where rearranging of coefficient data becomes possible, the wavelet inverse transformation unit 363 reads out the coefficient data stored in the coefficient rearranging buffer unit 521 rearranged in the order from lowband components to highband components, and performs wavelet inverse transformation processing using the coefficient data in the order read out. In the event of using a 5×3 filter, this is as shown in the above-described FIG. 42.

That is to say, in the event of processing from the head of 1 frame for example, at the point that the coefficient C1, coefficient C4, and coefficient C5, of which the entropy encoding has been decoded are stored in the coefficient rearranging buffer unit 521, the wavelet inverse transformation unit 363 reads out the coefficient data from the coefficient rearranging buffer unit 521, and performs wavelet inverse transformation processing. The data subjected to wavelet inverse transformation at the wavelet inverse transformation unit 363 is sequentially output as output image data.

Note that in this case as well, the processing of each component in the encoding unit 510, the transmission of encoded data as to the transmission path, and the processing of each component in the decoding unit 520, are executed in parallel, as already described with FIG. 39.

As described above, the present invention can be applied to various embodiments, and can be easily applied to various applications (i.e., has high versatility), which also is a great advantage thereof.

The above-described series of processing may be executed by hardware, or may be executed by software. In the event of executing the series of processing by software, a program configuring the software is installed into a computer assembled into dedicated hardware, or a general-use personal computer for example which is capable of executing various types of functions by having various types of programs installed, or an information processing device of an information processing system made up of multiple devices, and so forth, from a program recording medium.

Figure 45:
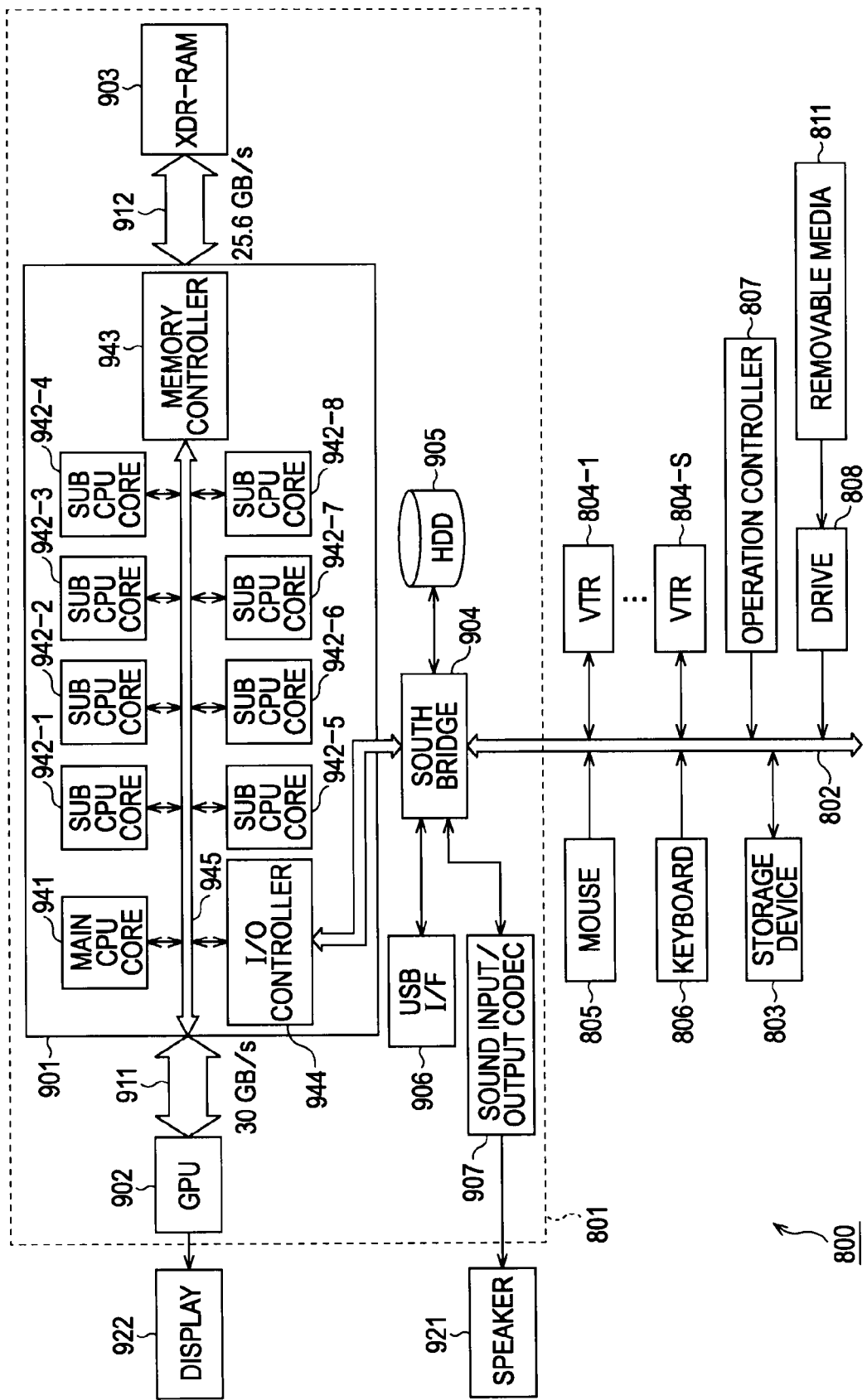
FIG. 45 is a diagram illustrating a configuration example of an information processing system to which the present invention has been applied.

FIG. 45 is a block diagram illustrating the configuration of an example of an information processing system for executing the above-described series of processing by a program.

As shown in FIG. 45, an information processing system 800 is a system configured of an information processing device 801, and a storage device 803, VTR 804-1 through VTR 804-S which are multiple video tape recorders (VTR), a mouse 805, keyboard 806, and operation controller 807 for a user to perform operating input to these, which are connected to the information processing device 801 by a PCI bus 802, and is a system for performing image encoding processing and image decoding processing and the like such as described above by an installed program.

For example, the information processing device 801 of the information processing system 800 can store, in the storage device 803, encoded data obtained by encoding moving image contents stored in the large-capacity storage device 803 made up of a RAID (Redundant Arrays of Independent Disks), store in the storage device 803 decoded image data (moving image contents) obtained by decoding encoded data stored in the storage device 803, record encoded data and decoded image data on videotape by way of the VTR 804-1 through VTR 804-S, and so forth. Also, the information processing device 801 is also arranged such that moving image contents recorded in videotapes mounted to the VTR 804-1 through VTR 804-S can be taken into the storage device 803. At this time, the information processing device 801 may encode the moving image contents.

The information processing device 801 has a microprocessor 901, GPU (Graphics Processing Unit) 902, XDR (Extreme Data Rate)-RAM 903, south bridge 904, HDD (Hard Disk Drive) 905, USB (Universal Serial Bus) interface (USB I/F (interface)) 906, and sound input/output codec 907.

The GPU 902 is connected to the microprocessor 901 via a dedicated bus 911. The XDR-RAM 903 is connected to the microprocessor 901 via a dedicated bus 912. The south bridge 904 is connected to an I/O (In/Out) controller 944 of the microprocessor 901 via a dedicated bus. The south bridge 904 is also connected to the HDD 905, USB interface 906, and sound input/output codec 907. The sound input/output codec 907 is connected to a speaker 921. Also, the GPU 902 is connected to a display 922.

Also, the south bridge 904 is further connected to a mouse 805, keyboard 806, VTR 804-1 through VTR 804-S, storage device 803, and operation controller 807 via the PCI bus 802.

The mouse 805 and keyboard 806 receive user operation input, and supply a signal indicating content of the user operation input to the microprocessor 901 via the PCI bus 802 and south bridge 904. The storage device 803 and VTR 804-1 through VTR 804-S are configured to be able to record or play back predetermined data.

The PCI bus 802 is further connected to a drive 808 as necessary, and removable media 811 such as a magnetic disk, optical disc, magneto-optical disc, or semiconductor memory is mounted thereupon as appropriate, and the computer program read out therefrom is installed in the HDD 905 as needed.

The microprocessor 901 is configured with a multi-core configuration integrated on a single chip, having a general-use main CPU core 941 which executes basic programs such as an OS (Operating System), sub-CPU core 942-1 through sub-CPU core 942-8 which are multiple (eight in this case) signal processing processors of a RISC (Reduced Instruction Set Computer) type connected to the main CPU core 941 via an internal bus 945, a memory controller 943 to perform memory control as to the XDR-RAM 903 having a capacity of 256 [MByte] for example, and an I/O (Input/Output) controller 944 to manage the input/output of data between the south bridge 904, and for example realizes an operational frequency of 4 [GHz].

At time of startup, the microprocessor 901 reads the necessary application program stored in the HDD 905 and expands this in the XDR-RAM 903, based on the control program stored in the HDD 905, and executes necessary control processing thereafter based on the application program and operator operations.

Also, by executing the software, the microprocessor 901 realizes, for example, the above-described encoding processing and decoding processing, and can supply the encoded stream obtained as a result of the encoding via the south bridge 904, and store in the HDD 905, or transfer the data of the playback picture of the moving image content obtained as a result of decoding to the GPU 902, and display on a display 922.

The usage method for each CPU core within the microprocessor 901 is optional, but an arrangement may be made wherein, for example, the main CPU core 941 performs processing relating to control of the image encoding processing and image decoding processing, and causes the eight sub-CPU core 942-1 through sub-CPU core 942-8 to execute the processing of wavelet transformation, coefficient rearranging, entropy encoding, entropy decoding, wavelet inverse conversion, quantization, and inverse quantization, and so forth, concurrently in parallel, in the same way as with the case described with reference to FIG. 39, for example. At this time, an arrangement wherein the main CPU core 941 appropriates processing to each of the eight sub-CPU core 942-1 through sub-CPU core 942-8 in increments of precincts causes execution of encoding processing and decoding processing concurrently in parallel in increments of precincts, as described with reference to FIG. 39. That is to say, this enables the efficiency of encoding processing and decoding processing to be improved, the delay time of the overall processing to be reduced, and further the load, processing time, and memory capacity necessary for processing to be reduced. Of course, an arrangement may be made to perform each processing with a method other than this.

For example, an arrangement may be made wherein a part of the eight sub-CPU core 942-1 through sub-CPU core 942-8 of the microprocessor 901 execute encoding processing, and another part decoding processing, concurrently in parallel.

Also, in the event that an independent encoder or decoder, or codec processing device is connected to the PCI bus 802 for example, the eight sub CPU core 942-1 through sub CPU core 942-8 of the microprocessor 901 may be arranged so as to control processing executed by these devices via the south bridge 904 and PCI bus 802. Further, in the event that a plurality of these devices are connected, or in the event that these devices include multiple decoders or encoders, the eight sub CPU core 942-1 through sub CPU core 942-8 of the microprocessor 901 may be arranged so as to each take partial charge and control the processing executed by the multiple decoders or encoders.

At this time, the main CPU core 941 manages the operations of the eight sub CPU core 942-1 through sub CPU core 942-8, and assigns processing to each sub CPU core and retrieves processing results and so forth. Further, the main CPU core 941 performs processing other than performed by these sub CPU cores. For example, the main CPU core 941 accepts commands supplied from the mouse 805, key board 806, or operation controller 807, via the south bridge 904, and executes various types of processing in accordance with the commands.

In addition to a final rendering processing relating to waiting for texture when the playback picture of the moving image contents displayed on the display 922 is moved, the GPU 902 can control the functions performing coordinate transformation calculating processing for displaying multiple playback pictures of moving image content and still images of still image content on a display 922 at one time, expanding/reducing processing as to the playback picture of the moving image content and still images of the still image content, and lighten the processing load on the microprocessor 901.

The GPU 902 performs, under control of the microprocessor 901, predetermined signal processing as to the supplied picture data of the moving image content or image data of the still image content, and consequently sends the obtained picture data and image data to the display 922, and displays the image signal on the display 922.

Incidentally, the playback images with multiple moving image contents wherein the eight sub CPU core 942-1 through sub CPU core 942-8 of the microprocessor 901 are decoded simultaneously and in parallel are subjected to data transfer to the GPU 902 via the bus 911, but the transfer speed at this time is for example a maximum of 30 [Gbyte/sec], and is arranged such that a display can be made quickly and smoothly, even if the playback picture is complex and has been subjected to special effects.

Also, of the picture data and audio data of the moving image content, the microprocessor 901 subjects the audio data to audio mixing processing, and sends the edited audio data obtained as a result thereof to the speaker 921 via the south bridge 904 and sound input/output codec 907, whereby audio based on the audio signal can be output from the speaker 921.

In the event of executing the above-described series of processing by software, a program making up that software is installed from a network or recording medium.

As shown in FIG. 45 for example, this recording medium is not only configured of removable media 811 such as a magnetic disk (including flexible disks), optical disc (including CD-ROM, DVD), magneto-optical disk (including MD), or semiconductor memory, in which the program is recorded, distributed separately from the device main unit to distribute the program to the user, but also is configured of the HDD 905 or storage device 803 or the like storing the program and distributed to the user in a state of having been assembled into the device main unit beforehand. Of course, the recording medium may be semiconductor memory such as ROM or flash memory, as well.

In the above, description has been made with the microprocessor 901 being configured with eight sub CPU cores therein, but is not restricted to this, and the number of sub CPU cores is optional. Also, the microprocessor 901 does not have to be configured of multiple cores such as the main CPU core and sub CPU cores, and a CPU configured of a single core (1 core) may be used. Also, multiple CPUs may be used instead of the microprocessor 901, or multiple information processing devices may be used (i.e., the program for executing the processing of the present invention may be executed at multiple devices operating in cooperation with each other).

Note that the steps describing the program recorded in the recording medium with the present specification include processing performed in time-series in the order described of course, but even if not necessarily processed in time-series, also include processing executed in parallel or individually.

Also, according to the present specification, system represents the entirety of devices configured of multiple devices (devices).

Note that with the above-described, a configuration described as one device may be divided and configured as multiple devices. Conversely, a configuration described above as multiple devices may be configured together as one device. Also, a configuration other than the device configurations described above may be added, as a matter of course. Further, as long as the configuration and operation as an entire system are substantially the same, a portion of the configuration of a certain device may be included in the configuration of another device.

INDUSTRIAL APPLICABILITY

The present invention described above is for performing packetizing processing and depacketizing processing easily and at high speed, and can be applied variously as long as a device or system where images are compression-encoded and transmitted, and the compressed code is decoded and output at the transmission destination. The present invention is particularly suitably used with devices or systems wherein short delay from compression-encoding of images to decoding and output is required.

For example, the present invention is suitably used with medical remote medical diagnosis applications, such as performing treatment by operating a manipulator while watching a picture taken with a video camera. Also, the present invention is suitably used with a system wherein images are encoded and transmitted, and decoded and displayed or recorded, in a broadcast station or the like.

Further, the preset invention can be applied to systems for distributing pictures of a live relay, systems enabling interactive communication between students and teachers in the field of education, and so forth.

Moreover, the present invention can be applied to transmission of image data taken with mobile terminals having imaging functions such as cellular telephone terminals with camera functions, videoconferencing systems, systems made up of surveillance cameras and recorders for recording pictures taken with the surveillance cameras, and so forth.

The invention claimed is:

1. An information processing device comprising:
a processor that acquires image data encoded in increments of precincts that are groups of lines including sub-bands that generate one line worth of lowest band components of the image data;
creating means for creating header information;
dividing means for dividing precincts of encoded image data into a plurality of payloads for a corresponding plurality of packets, at every predetermined data amount determined beforehand;
packetizing means for forming the plurality of packets by adding said header information created by said creating means to each of said plurality of payloads obtained by said precincts of encoded image data having been divided by said dividing means; and flag setting means for setting, as to a head packet of the packets generated by said packetizing means of which a payload is a head of a precinct of the encoded image data, a head flag indicating said head packet, included in the header information, and setting, as to a final packet of which a payload is an end of the precinct of the encoded image data, an end flag indicating said final packet, included in the header information, wherein said head flag has only one of two fixed values, and the end flag has only one of two fixed values.

2. The information processing device according to claim 1, wherein said encoded data is encoded data which has been wavelet-transformed and entropy-encoded, in increments of the precincts.

3. The information processing device according to claim 1, wherein said encoded data is supplied in an order of decoding.

4. The information processing device according to claim 1, further comprising encoding means for encoding said image data and generating said encoded image data, wherein said dividing means divide said encoded image data generated by said encoding means.

5. The information processing device according to claim 4, wherein said encoding means supplies added information of a same format as with said header information, and wherein said creating means creates said header information using said added information supplied by said encoding means.

6. The information processing device according to claim 4, wherein said encoding means supplies flag information indicating success or failure of said encoding, and said packetizing means performs packetizing using only said header information created by said creating means in an event that determination is made that said encoding has failed, based on said flag information.

7. An information processing method comprising:
  acquiring image data encoded in increments of precincts that are groups of lines including sub-bands that generate one line worth of lowest band components of the image data;
  creating header information;
  dividing precincts of encoded image data into a plurality of payloads for a corresponding plurality of packets, at every predetermined data amount determined beforehand;
  forming the plurality of packets by adding said header information to each of said payloads obtained by said precincts of encoded data having been divided; and
  setting, as to a head packet of the packets generated of which a payload is a head of a precinct of the encoded image data, a head flag indicating said head packet, included in the header information, and setting, as to a final packet of which a payload is an end of said precinct of the encoded image data, an end flag indicating said final packet, included in the header information, wherein said head flag has only one of two fixed values, and the end flag has only one of two fixed values.

8. An information processing device comprising:
  acquisition means for acquiring packets supplied externally, wherein payload data in the packets is image data encoded in increments of precincts that are groups of lines including sub-bands that generate one line worth of lowest band components of the image data;
  head determining means for determining whether or not a packet acquired by said acquisition means is a head packet of a precinct of the encoded image data, said head packet including a payload that is a head portion of the precinct of the encoded image data by determining whether header information of said packet includes a head flag indicating said head packet, wherein said head flag has only one of two fixed values;
  loss determining means for determining whether or not packet loss has occurred in the acquisition by said acquisition means, based on the header information of said packets acquired by said acquisition means; and
  supplying means for extracting the payload data from said packets acquired by said acquisition means and supplying to a downstream processing unit in an event that determination has been made by said loss determining means that loss of said packets has not occurred, and discarding said packets acquired by said acquisition means in an event that determination has been made by said loss determining means that loss of said packets has occurred,
  wherein, in the event that said loss determining means determines that packet loss has occurred, said supplying means discard said packets until determination is made by said head determining means that a head packet of a new precinct has been acquired by said acquisition means.

9. The information processing device according to claim 8, wherein said loss determining means determine that packet loss has occurred in the event that a sequence number which is information indicating the order of packets, included in said header information, is not continuous with a sequence number of an earlier packet.

10. The information processing device according to claim 8, further comprising notification means for notifying said downstream processing unit in the event that said loss determining means has determined that packet loss has occurred.

11. The information processing device according to claim 8, wherein, in the event that said loss determining means determine that packet loss has not occurred, and also in the event that determination is made by said head determining means to that the packet is the head packet of said precinct of the encoded image data, said supplying means further supplies said header information of the packet to the downstream processing unit.

12. The information processing device according to claim 8, wherein said payload data is encoded data which has been wavelet-transformed and entropy-encoded, in increments of the precincts.

13. The information processing device according to claim 12, wherein said encoded data is supplied in the order of decoding.

14. The information processing device according to claim 12, further comprising, at said downstream processing unit, decoding processing execution means for performing decoding processing for decoding said encoded data, which is said payload data supplied by said supplying means.

15. The information processing device according to claim 14, said decoding processing execution means comprising:
  holding means for temporarily holding said encoded data supplied from said supplying means;
  decoding means for decoding said encoded data, held by said holding means, in said precinct increments; and
  wavelet inverse transformation means for performing wavelet inverse transformation as to coefficient data obtained by decoding by said decoding means.

16. The information processing device according to claim 12, further comprising encoding success/failure determining means for determining whether said entropy encoding has succeeded or failed, based on header information of said packets acquired by said acquisition means;

wherein said supplying means supplies only said header information in the event that determination is made by said encoding success/failure determining means that said encoding has failed.

17. An information processing method comprising:

acquiring packets supplied externally, wherein payload data in the packets is image data encoded in increments of precincts that are groups of lines including sub-bands that generate one line worth of lowest band components of the image data;

determining whether or not a packet acquired by said acquiring is a head packet of a precinct of the encoded image data, said head packet including a payload that is a head portion of the precinct of the encoded image data by determining whether header information of said packet includes a head flag indicating said head packet, wherein said head flag has only one of two fixed values;

determining whether or not packet loss has occurred, based on header information of said packets acquired; and extracting the payload data from said packets acquired and supplying to a downstream processing unit in an event that determination has been made that loss of said packets has not occurred, and discarding said packets acquired in an event that determination has been made that loss of said packets has occurred, wherein, in the event that said determining determine that packet loss has occurred, discarding said packets until determination is made that a head packet of a new precinct has been acquired.

18. A non-transitory computer readable storage medium encoded with instructions, which when executed by a computer cause the computer to implement a method comprising:

acquiring image data encoded in increments of precincts that are groups of lines including sub-bands that generate one line worth of lowest band components of the image data;

creating header information;

dividing precincts of encoded image data into a plurality of payloads for a corresponding plurality of packets, at every predetermined data amount determined beforehand;

forming the plurality of packets by adding said header information to each of said payloads obtained by said precincts of encoded data having been divided; and setting, as to a head packet of the packets generated of which a payload is a head of a precinct of the encoded image data, a head flag indicating said head packet, included in the header information, and setting, as to a final packet of which a payload is an end of said precinct of the encoded image data, an end flag indicating said final packet, included in the header information, wherein said head flag has only one of two fixed values, and the end flag has only one of two fixed values.

19. A non-transitory computer readable storage medium encoded with instructions, which when executed by a computer cause the computer to implement a method comprising:

acquiring packets supplied externally, wherein payload data in the packets is image data encoded in increments of precincts that are groups of lines including sub-bands that generate one line worth of lowest band components of the image data;

determining whether or not a packet acquired by said acquiring is a head packet of a precinct of the encoded image data, said head packet including a payload that is a head portion of the precinct of the encoded image data by determining whether header information of said packet includes a head flag indicating said head packet, wherein said head flag has only one of two fixed values;

determining whether or not packet loss has occurred, based on header information of said packets acquired; and extracting the payload data from said packets acquired and supplying to a downstream processing unit in an event that determination has been made that loss of said packets has not occurred, and discarding said packets acquired in an event that determination has been made that loss of said packets has occurred, wherein, in the event that said determining determine that packet loss has occurred, discarding said packets until determination is made that a head packet of a new precinct has been acquired.

* * * * *